United States Patent

Tanaka

(10) Patent No.: US 8,372,975 B2
(45) Date of Patent: *Feb. 12, 2013

(54) LIQUID CRYSTAL COMPOUND HAVING DIFLUOROPROPENYLENEOXY BONDING GROUP

(75) Inventor: Hiroyuki Tanaka, Chiba (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/260,916

(22) PCT Filed: Mar. 15, 2010

(86) PCT No.: PCT/JP2010/054349
§ 371 (c)(1),
(2), (4) Date: Sep. 28, 2011

(87) PCT Pub. No.: WO2010/116863
PCT Pub. Date: Oct. 14, 2010

(65) Prior Publication Data
US 2012/0029194 A1    Feb. 2, 2012

(30) Foreign Application Priority Data
Mar. 30, 2009    (JP) .................. 2009-081299

(51) Int. Cl.
C07D 239/26 (2006.01)
C07D 213/04 (2006.01)
C07D 319/06 (2006.01)
C07D 309/04 (2006.01)
C07C 43/205 (2006.01)

(52) U.S. Cl. ........ 544/335; 546/339; 549/374; 549/427; 568/642

(58) Field of Classification Search .............. None
See application file for complete search history.

(56) References Cited

U.S. PATENT DOCUMENTS
8,057,866 B2 * 11/2011 Saito .................. 428/1.1

FOREIGN PATENT DOCUMENTS

| DE | 4023106 | 1/1992 |
|---|---|---|
| GB | 2229438 | 9/1990 |
| JP | 10-204016 | 8/1998 |
| JP | 10-251186 | 9/1998 |
| JP | 2002-053513 | 2/2002 |
| JP | 2004-269432 | 9/2004 |
| WO | 96/11897 | 4/1996 |

OTHER PUBLICATIONS

Saito, caplus an 2010:1228495.*

* cited by examiner

*Primary Examiner* — Sun Jae Loewe
(74) *Attorney, Agent, or Firm* — Jianq Chyun IP Office

(57) ABSTRACT

The invention provides a liquid crystal compound having general physical properties necessary for the compound, namely stability to heat, light and so forth, a wide temperature range of a liquid crystal phase, a high clearing point, a good compatibility with other compounds, a large optical anisotropy and a large dielectric anisotropy; a compound represented by formula (1):

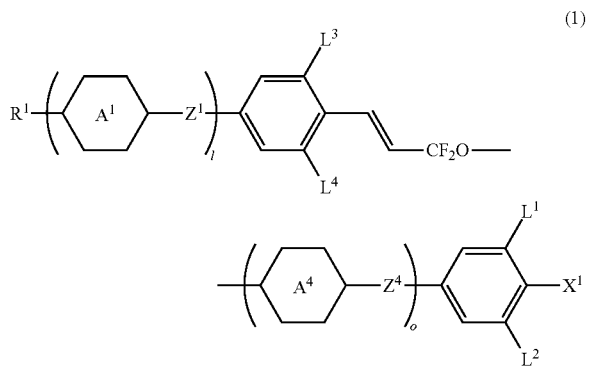

wherein, for example, $R^1$ is alkyl having 1 to 20 carbons; ring $A^1$ and ring $A^4$ each are 1,4-cyclohexylene, 1,4-phenylene, or 1,4-phenylene in which arbitrary hydrogen is replaced by halogen; $Z^1$ and $Z^4$ each are a single bond; $L^1$, $L^2$, $L^3$ and $L^4$ each are hydrogen or fluorine; and $X^1$ is fluorine, chlorine, —$CF_3$ or —$OCF_3$.

7 Claims, No Drawings

LIQUID CRYSTAL COMPOUND HAVING DIFLUOROPROPENYLENEOXY BONDING GROUP

CROSS-REFERENCE TO RELATED APPLICATION

This application is a 371 of international application of PCT application serial no. PCT/JP2010/054349, filed on Mar. 15, 2010, which claims the priority benefit of Japan application no. 2009-081299, filed on Mar. 30, 2009. The entirety of each of the above-mentioned patent applications is hereby incorporated by reference herein and made a part of this specification.

TECHNICAL FIELD

The invention relates to a new liquid crystal compound useful as a material for a display device. More specifically, the invention relates to a new liquid crystal compound having a wide temperature range of a liquid crystal phase, a high clearing point, a good compatibility with other liquid crystal compounds, a large optical anisotropy and a large dielectric anisotropy, and additionally, when used for a liquid crystal display device, being usable in a wide temperature range, drivable at a low voltage and capable of obtaining steep electrooptical characteristics.

BACKGROUND ART

A display device using a liquid crystal compound (in the application, a term "liquid crystal compound" is used as a generic term for a compound having a liquid crystal phase and a compound having no liquid crystal phase but being useful as a constituent of a liquid crystal composition) has been widely used for a display for a watch, a calculator, a word processor and so forth. The display devices utilize an optical anisotropy, a dielectric anisotropy and so forth of the liquid crystal compound.

In a liquid crystal display device, a classification based on an operating mode for liquid crystals includes phase change (PC), twisted nematic (TN), super twisted nematic (STN), bistable twisted nematic (BTN), electrically controlled birefringence (ECB), optically compensated bend (OCB), in-plane switching (IPS), vertical alignment (VA) and polymer sustained alignment (PSA). A classification based on a driving mode of a device includes passive matrix (PM) and active matrix (AM). The passive matrix (PM) is classified into static, multiplex and so forth, and the AM is classified into thin film transistor (TFT), metal insulator metal (MIM) and so forth.

The liquid crystal display devices include a liquid crystal composition having suitable physical properties. In order to improve characteristics of the liquid crystal display device, the liquid crystal composition is preferred to have suitable physical properties. General physical properties necessary for the liquid crystal compound being a component of the liquid crystal composition are as follows:
(1) being chemically stable and physically stable;
(2) having a high clearing point (a phase transition temperature between the liquid crystal phase and an isotropic phase);
(3) having a low minimum temperature of the liquid crystal phase (a nematic phase, a smectic phase or the like), in particular, a low minimum temperature of the nematic phase;
(4) having an excellent compatibility with other liquid crystal compounds;
(5) having a large dielectric anisotropy; and
(6) having a large optical anisotropy.

If a composition containing the liquid crystal compound being chemically and physically stable as described in (1) is used for the display device, a voltage holding ratio can be increased.

Moreover, according to a composition containing the liquid crystal compound having the high clearing point or the low minimum temperature of the liquid crystal phase as described in (2) and (3), a temperature range of the nematic phase can be extended. Consequently, the compound can be used in a wide temperature range in the form of the display device.

In order to develop characteristics that are difficult to be output by a single compound, the liquid crystal compound is generally used in the form of a composition prepared by mixing the compound with a number of other liquid crystal compounds. Accordingly, the liquid crystal compound to be used for the display device is preferred to have a good compatibility with other liquid crystal compounds and so forth as described in (4).

In particular, the liquid crystal display device having a higher display performance in contrast, display capacity and response time characteristics and so forth has been required in these days. Furthermore, for a liquid crystal material to be used, a material having a low driving voltage, more specifically, a liquid crystal compound allowing to decrease threshold voltage, and a liquid crystal composition containing the liquid crystal compound and having a low driving voltage have been required.

As is well known, threshold voltage ($V_{th}$) is represented according to the following equation (H. J. Deuling et al., Mol. Cryst. Liq. Cryst., 27 (1975) 81):

$$V_{th} = \pi(K/\epsilon_0 \Delta \epsilon)^{1/2}$$

wherein, in the above equation, K represents an elastic constant and $\epsilon_0$ represents a dielectric constant in vacuum. As is known from the equation, two ways are conceivable in order to decrease $V_{th}$: either increasing values of dielectric anisotropy ($\Delta \epsilon$) or decreasing K. However, according to the present technology, it is still difficult to control K as a practical matter. Therefore, under the present situation, a liquid crystal material having a large $\Delta \epsilon$ is usually used to respond to the requirement. Under the circumstances, the liquid crystal compound having the large dielectric anisotropy as described in (5) has been actively developed.

Furthermore, in order to perform a good liquid crystal display, a thickness of a cell of the liquid crystal display device forming thereof and values of optical anisotropy ($\Delta n$) of the liquid crystal material to be used are preferred to be constant (E. Jakeman et al., Phys. Lett., 39A. 69 (1972)). Moreover, a response speed of the liquid crystal display device is inversely proportional to a square of the thickness of the cell to be used. Therefore, the liquid crystal compound having the large optical anisotropy has to be used for producing the liquid crystal display device being responsive at a high speed and also applicable to displaying moving images and so forth. Accordingly, the liquid crystal compound having the large optical anisotropy as described in (6) has been required.

So far, a variety of liquid crystal compounds having the large dielectric anisotropy and the large optical anisotropy have been prepared, and some of the liquid crystal compounds have been practically used. According to patent literatures No. 1 to No. 5, a compound having a —$CF_2O$— bonding group, for example, three-ring compound (S-1) or four-ring compound (S-2) is disclosed. Because the compounds have a narrow temperature range of the liquid crystal phase and a low clearing point, a temperature range usable in the form of the display device is not sufficiently wide when the compounds are formed into the liquid crystal composition.

Furthermore, according to patent literatures No. 6 and No. 7, three-ring compound (S-3) having a —CH═CH—CF$_2$O— bonding group is disclosed. The compound has the large dielectric anisotropy and the large optical anisotropy. However, the temperature range of the liquid crystal phase is not sufficiently wide.

(S-1)

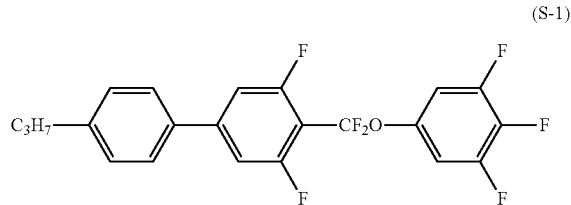

-continued (S-2)

(S-3)

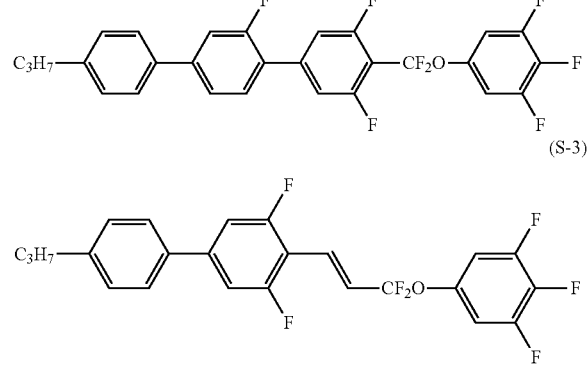

CITATION LIST

Patent Literature

Patent literature No. 1: WO 96/11897 A (1996).
Patent literature No. 2: JP H10-204016 A (1998).
Patent literature No. 3: GB 2229438 B.
Patent literature No. 4: DE 4023106 A.
Patent literature No. 5: JP H10-251186 A (1998).
Patent literature No. 6: JP 2002-53513 A (2002).
Patent literature No. 7: JP 2004-269432 A (2004).

SUMMARY OF INVENTION

Technical Problem

An aim of the invention is to provide a liquid crystal compound having general physical properties necessary for the compound, namely, stability to heat, light and so forth, a wide temperature range of a liquid crystal phase, a high clearing point, a good compatibility with other liquid crystal compounds, a large optical anisotropy and a large dielectric anisotropy.

Solution to Problem

The invention provides a liquid crystal compound as described below, a liquid crystal display device including the liquid crystal compound and so forth. Moreover, examples of preferred terminal groups, rings, bonding groups and so forth in a compound represented by formula (1) are also described.

Item 1. A compound represented by formula (1):

(1)

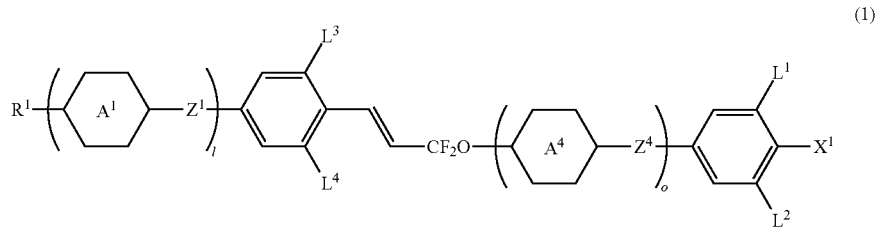

wherein, in formula (1), $R^1$ is alkyl having 1 to 20 carbons, and in the alkyl, arbitrary —CH$_2$— may be replaced by —O—, —S— or —CH═CH—; ring $A^1$ and ring $A^4$ are independently 1,4-cyclohexylene, 1,3-dioxane-2,5-diyl, pyrimidine-2,5-diyl, pyridine-2,5-diyl, tetrahydropyran-2,5-diyl, 1,4-phenylene, or 1,4-phenylene in which arbitrary hydrogen is replaced by halogen; $Z^1$ and $Z^4$ are independently a single bond, —CH$_2$CH$_2$—, —CH═CH—, —C≡C—, —COO—, —OCO—, —CF$_2$O—, —OCF$_2$—, —CH$_2$O—, —OCH$_2$—, —CF═CF—, —(CH$_2$)$_4$—, —(CH$_2$)$_2$CF$_2$O—, —(CH$_2$)$_2$OCF$_2$—, —CF$_2$O(CH$_2$)$_2$—, —OCF$_2$(CH$_2$)$_2$—, —CH═CH—(CH$_2$)$_2$— or —(CH$_2$)$_2$—CH═CH—; $L^1$, $L^2$, $L^3$ and $L^4$ are independently hydrogen, fluorine or chlorine; $X^1$ is hydrogen, halogen, —C≡N, —N═C═S, —SF$_5$ or alkyl having 1 to 10 carbons, and in the alkyl, arbitrary —CH$_2$— may be replaced by —O—, —S— or —CH═CH—, and arbitrary hydrogen may be replaced by halogen; l and o are independently an integer from 0 to 3, and a sum of l and o is 3 or less; and when l is 1, o is 0, ring $A^1$ is 1,4-phenylene and $X^1$ is fluorine, at least one of $L^1$, $L^2$, $L^3$ and $L^4$ is hydrogen.

Item 2. The compound according to item 1, wherein, in formula (1), $R^1$ is alkyl having 1 to 20 carbons, alkenyl having 2 to 21 carbons, alkoxy having 1 to 19 carbons, alkenyloxy having 2 to 20 carbons or alkylthio having 1 to 19 carbons; $X^1$ is hydrogen, halogen, —C≡N, —N═C═S, —SF$_5$, alkyl having 1 to 10 carbons, alkenyl having 2 to 11 carbons, alkoxy having 1 to 9 carbons, alkenyloxy having 2 to 10 carbons, thioalkyl having 1 to 9 carbons, —CH$_2$F, —CHF$_2$, —CF$_3$, —(CH$_2$)$_2$—F, —CF$_2$CH$_2$F, —CF$_2$CHF$_2$, —CH$_2$CF$_3$, —CF$_2$CF$_3$, —(CH$_2$)$_3$—F, —(CF$_2$)$_3$—F, —CF$_2$CHFCF$_3$, —CHFCF$_2$CF$_3$, —(CH$_2$)$_4$—F, —(CF$_2$)$_4$—F, —(CH$_2$)$_5$—F, —(CF$_2$)$_5$—F, —OCH$_2$F, —OCHF$_2$, —OCF$_3$, —O—(CH$_2$)$_2$—F, —OCF$_2$CH$_2$F, —OCF$_2$CHF$_2$, —OCH$_2$CF$_3$, —O—(CH$_2$)$_3$—F, —O—(CF$_2$)$_3$—F, —OCF$_2$CHFCF$_3$, —OCHFCF$_2$CF$_3$, —O(CH$_2$)$_4$—F, —O—(CF$_2$)$_4$—F, —O—(CH$_2$)$_5$—F, —O—(CF$_2$)$_5$—F, —CH=CHF, —CH=CF$_2$, —CF=CHF, —CH=CHCH$_2$F, —CH=CHCF$_3$, —(CH$_2$)$_2$—CH=CF$_2$, —CH$_2$CH=CHCF$_3$ or —CH=CHCF$_2$CF$_3$.

Item 3. The compound according to item 1, wherein, in formula (1), R$^1$ is alkyl having 1 to 12 carbons, alkenyl having 2 to 12 carbons, alkoxy having 1 to 12 carbons or alkenyloxy having 2 to 12 carbons; Z$^1$ and Z$^4$ are independently a single bond, —CH$_2$CH$_2$—, —CH=CH—, —C≡C—, —COO—, —CF$_2$O—, —CH$_2$O— or —OCH$_2$—, and X$^1$ is fluorine, chlorine, —C≡N, —CF$_3$, —CHF$_2$, —CH$_2$F, —OCF$_3$, —OCHF$_2$ or —OCH$_2$F.

Item 4. The compound according to item 1, wherein, in formula (1), R$^1$ is alkyl having 1 to 12 carbons, alkenyl having 2 to 12 carbons or alkoxy having 1 to 12 carbons, Z$^1$ and Z$^4$ are independently a single bond, —CH$_2$CH$_2$—, —CH=CH—, and X$^1$ is fluorine, chlorine, —CF$_3$ or —OCF$_3$.

Item 5. The compound according to item 1, wherein the compound is represented by any one of formula (1-1) to formula (1-5):

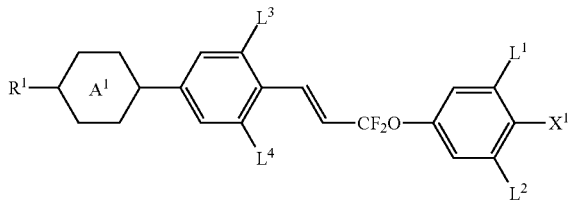 (1-1)

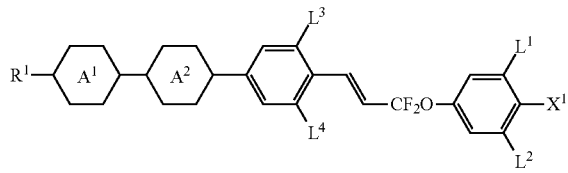 (1-2)

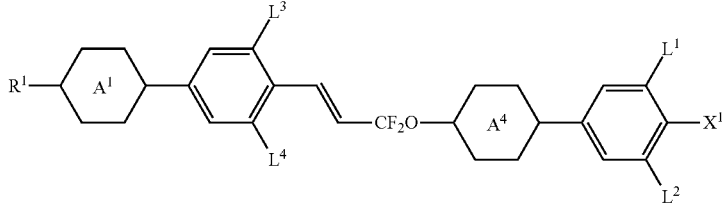 (1-3)

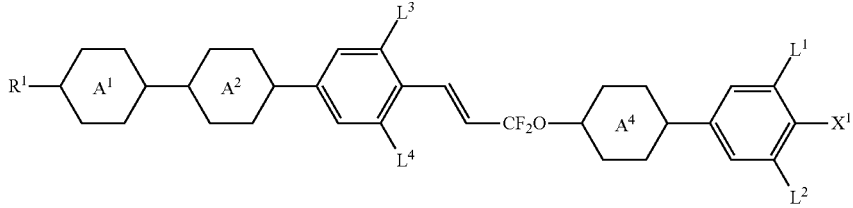 (1-4)

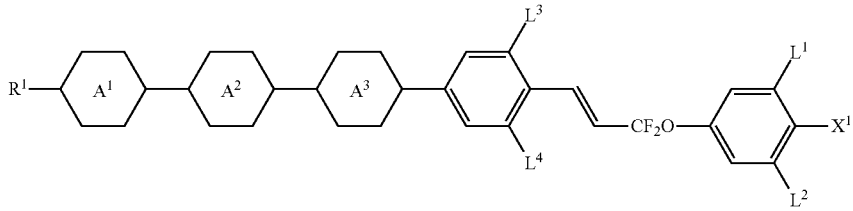 (1-5)

wherein, in the formulas, R$^1$ is alkyl having 1 to 12 carbons or alkenyl having 2 to 12 carbons; ring A$^1$, ring A$^2$, ring A$^3$ and ring A$^4$ are independently 1,4-cyclohexylene, 1,3-dioxane-2,5-diyl, pyrimidine-2,5-diyl, pyridine-2,5-diyl, tetrahydropyran-2,5-diyl, 1,4-phenylene, or 1,4-phenylene in which arbitrary hydrogen is replaced by halogen; L$^1$, L$^2$, L$^3$ and L$^4$ are independently hydrogen, chlorine or fluorine; X$^1$ is fluorine, chlorine, —CF$_3$ or —OCF$_3$. Then, when ring A$^1$ is 1,4-phenylene and X$^1$ is fluorine in formula (1-1), at least one of L$^1$, L$^2$, L$^3$ and L$^4$ is hydrogen.

Item 6. The compound according to item 1, wherein the compound is represented by any one of formula (1-6) to formula (1-38):

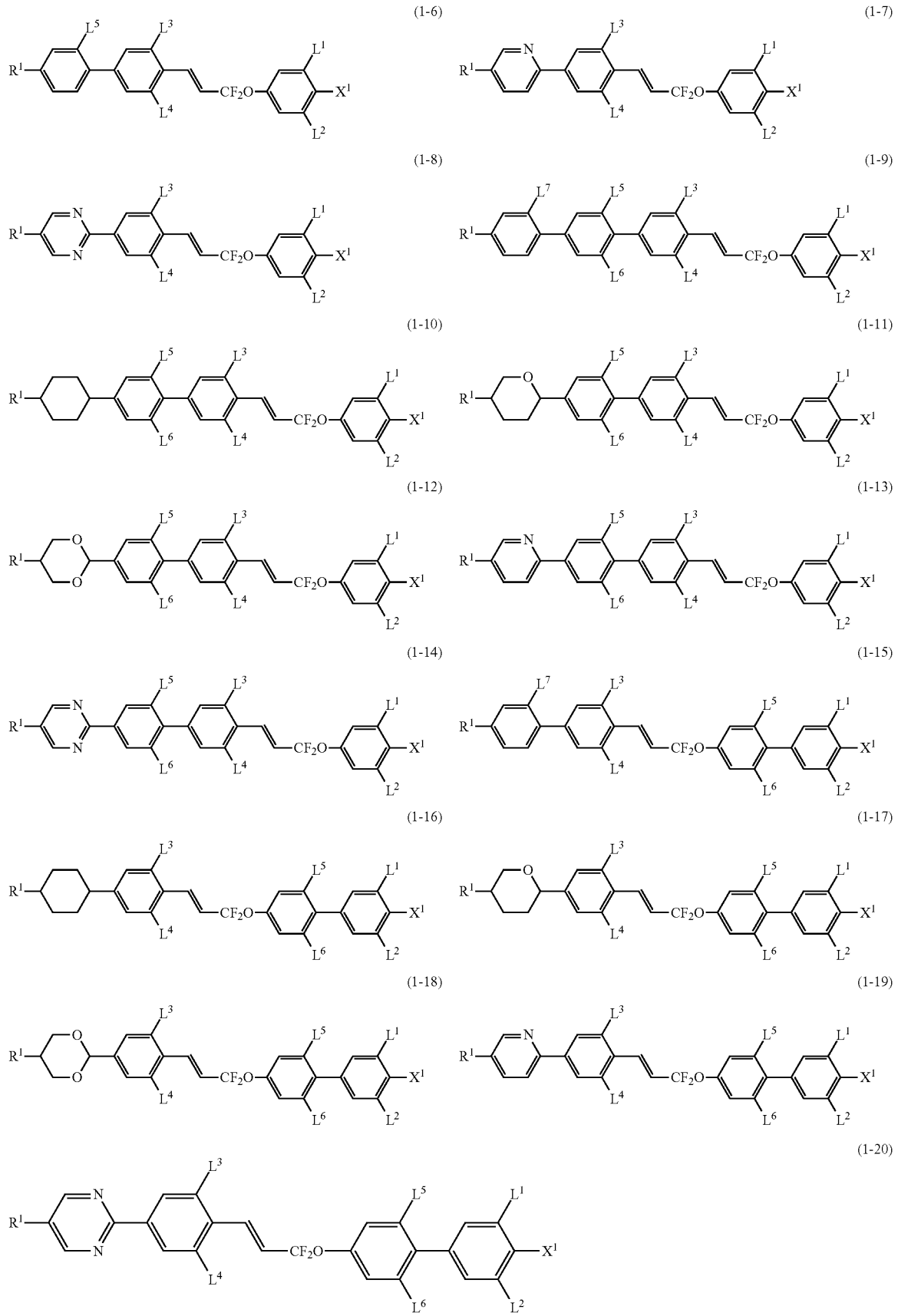

(1-21)
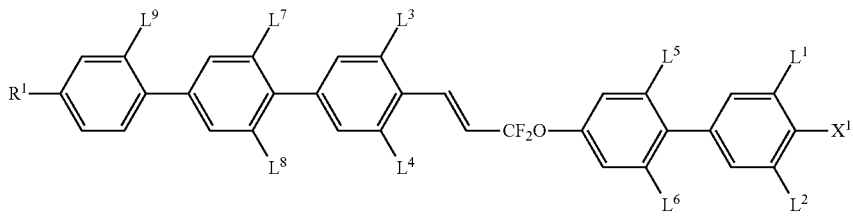
(1-22)
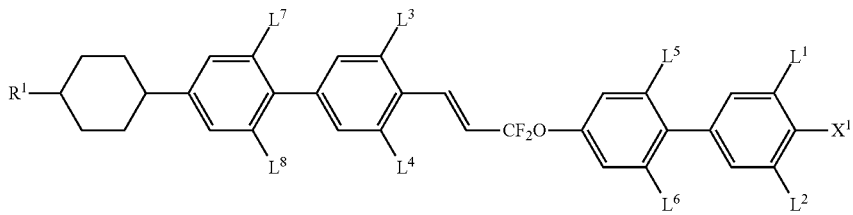
(1-23)
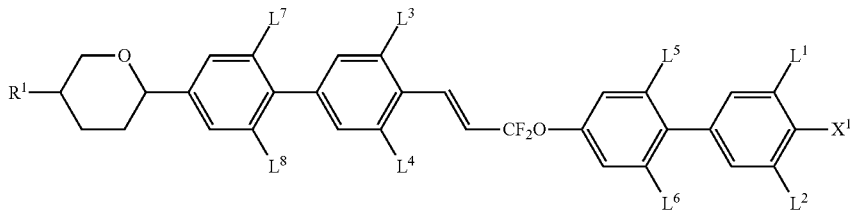
(1-24)
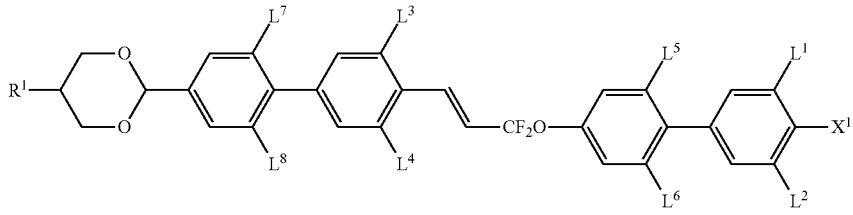
(1-25)
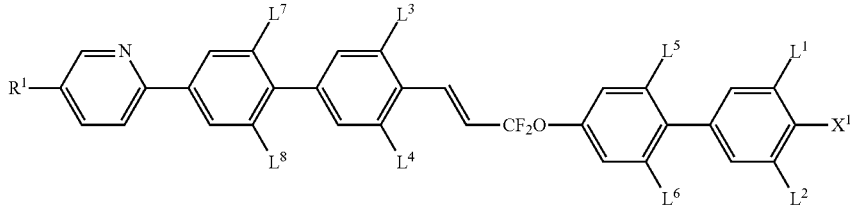
(1-26)
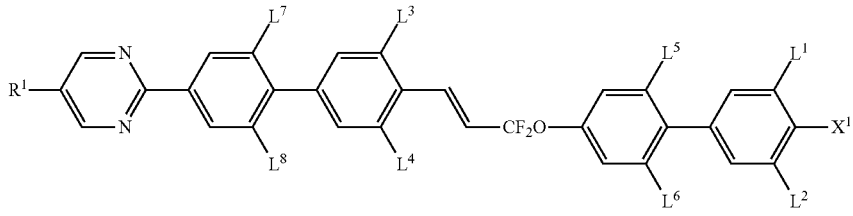
(1-27)
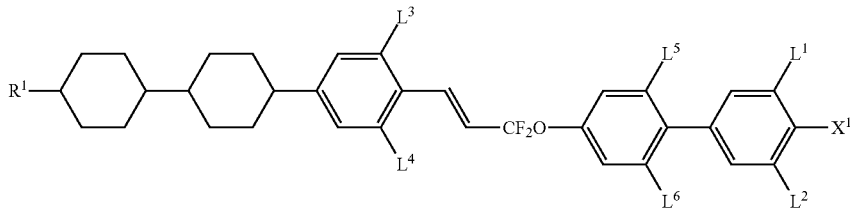

-continued
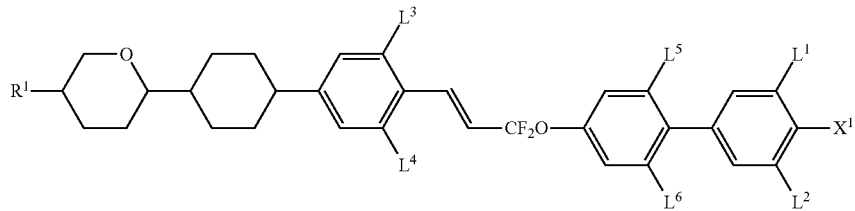
(1-28)
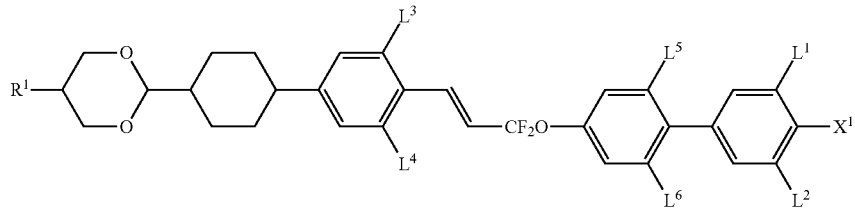
(1-29)
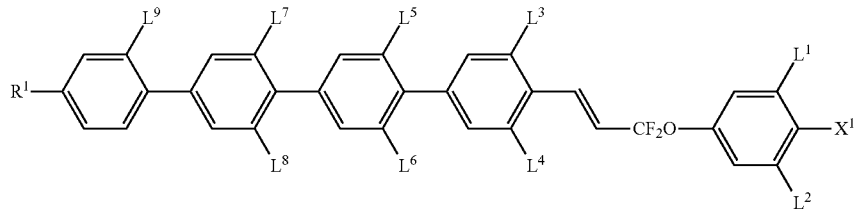
(1-30)
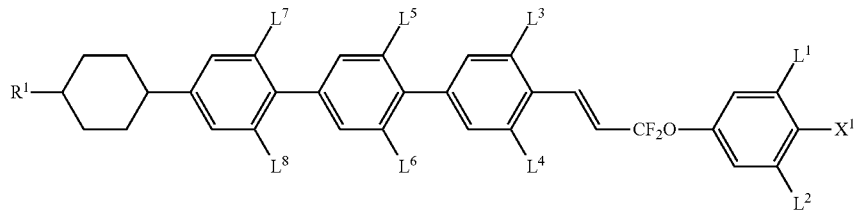
(1-31)
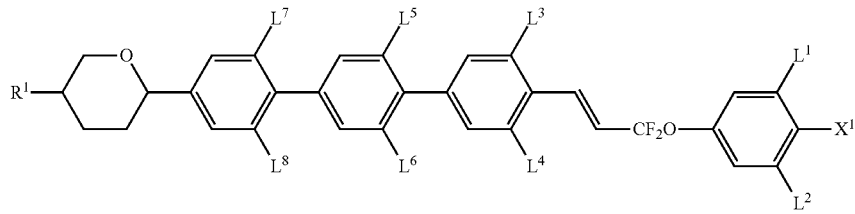
(1-32)
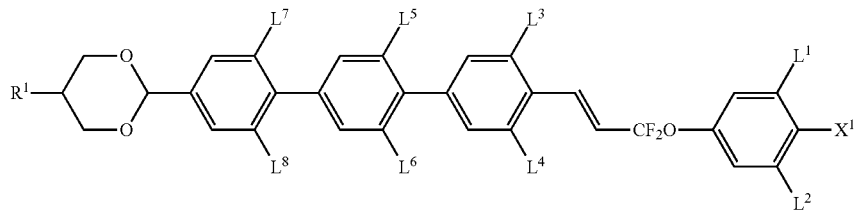
(1-33)
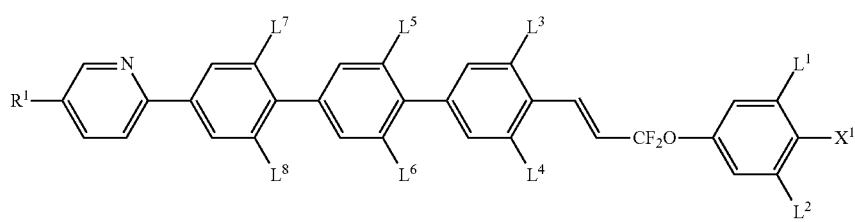
(1-34)

(1-35)
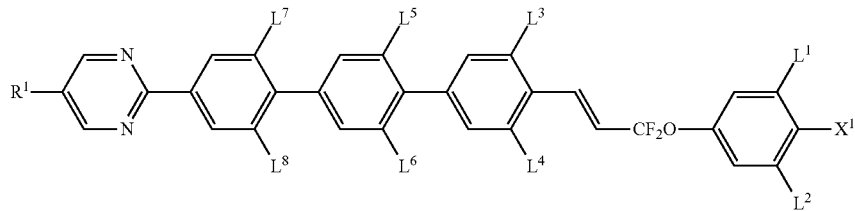

(1-36)
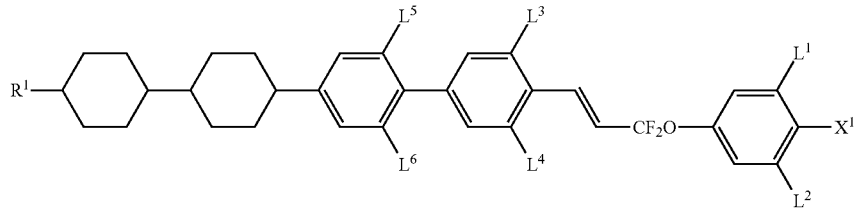

(1-37)
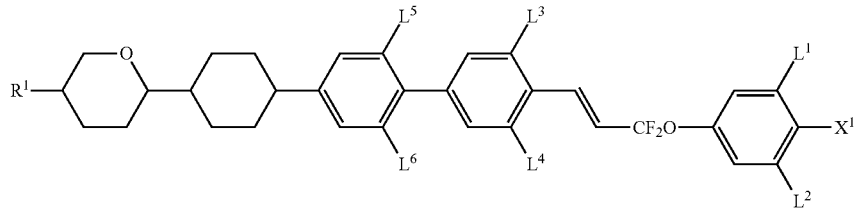

(1-38)
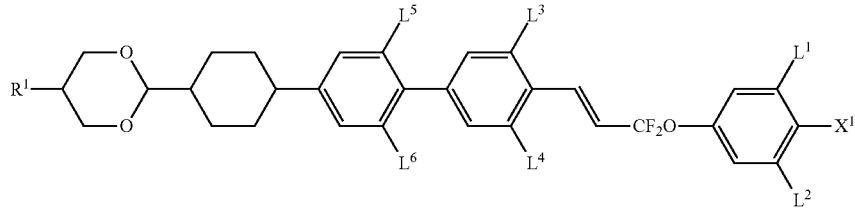

wherein, in the formulas, $R^1$ is alkyl having 1 to 12 carbons; $L^1, L^2, L^3, L^4, L^5, L^6, L^7, L^8$ and $L^9$ are independently hydrogen, chlorine or fluorine; $X^1$ is fluorine, chlorine, —$CF_3$ or —$OCF_3$. Then, when $X^1$ is fluorine in formula (1-6), at least one of $L^1, L^2, L^3$ and $L^4$ is hydrogen.

Item 7. The compound according to item 1, wherein the compound is represented by any one of formula (1-39) to formula (1-49):

(1-39)
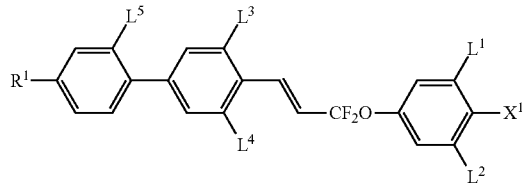

(1-40)
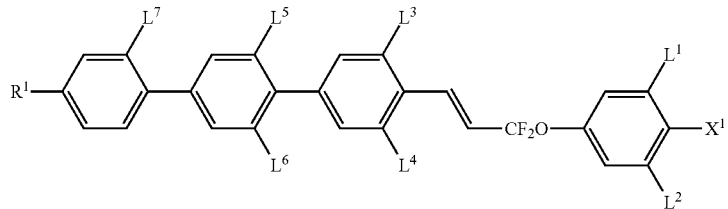

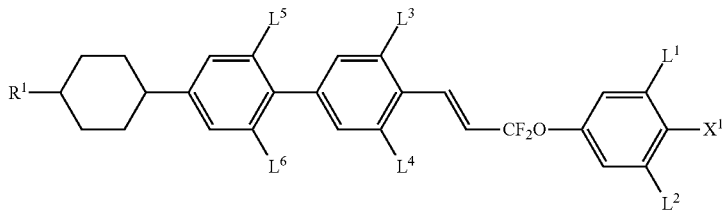
(1-41)
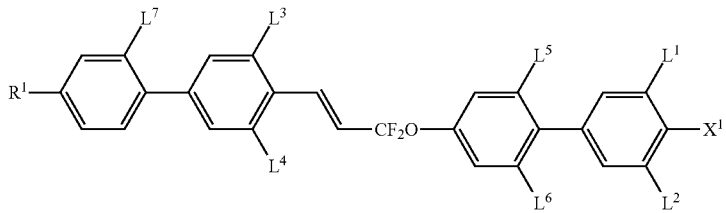
(1-42)
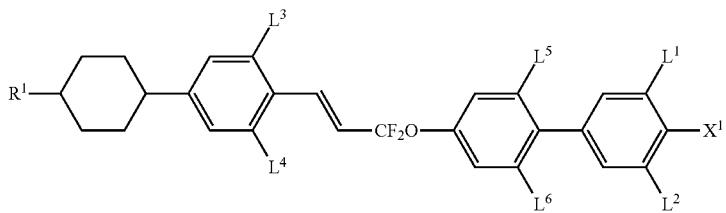
(1-43)
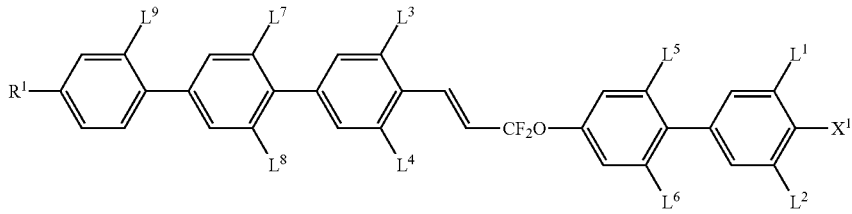
(1-44)
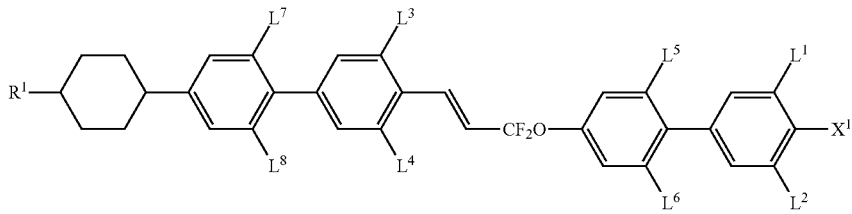
(1-45)
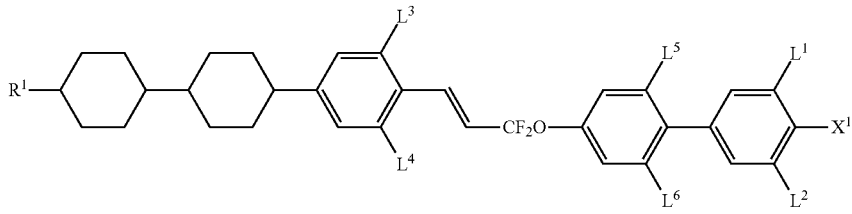
(1-46)
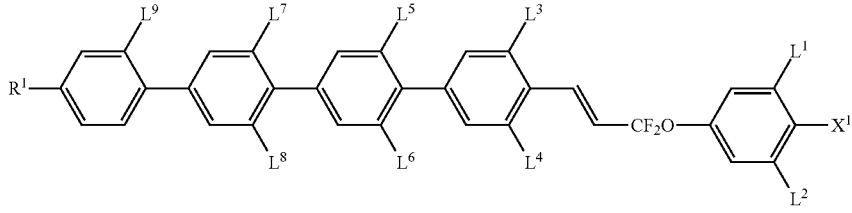
(1-47)

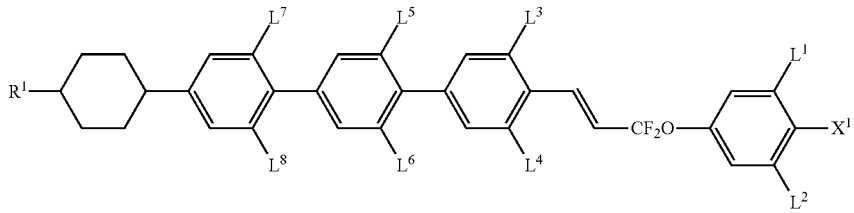

(1-48)

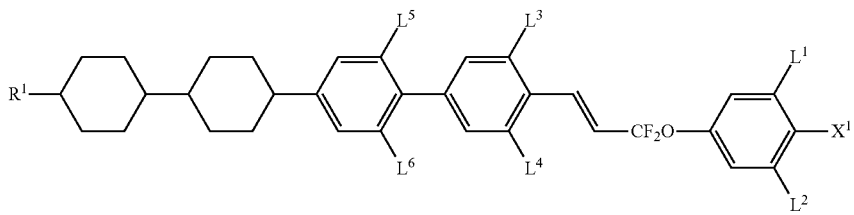

(1-49)

wherein, in the formulas, $R^1$ is alkyl having 1 to 12 carbons; $L^1, L^2, L^3, L^4, L^5, L^6, L^7, L^8$ and $L^9$ are independently hydrogen or fluorine; $X^1$ is fluorine, chlorine, —$CF_3$ or —$OCF_3$. Then, when $X^1$ is fluorine in formula (1-39), at least one of $L^1$, $L^2$, $L^3$ and $L^4$ is hydrogen.

Usage of terms in the specification is as described below. The liquid crystal compound is a generic term for a compound having a liquid crystal phase such as a nematic phase or a smectic phase and a compound having no liquid crystal phase but being useful as a component of a liquid crystal composition. The liquid crystal compound, the liquid crystal composition and the liquid crystal display device may be abbreviated as "compound", "composition" and "device," respectively. The liquid crystal display device is a generic term for a liquid crystal display panel and a liquid crystal display module. A maximum temperature of the nematic phase is a phase transition temperature between the nematic phase and an isotropic phase, and may simply be abbreviated as "clearing point" or "maximum temperature." A minimum temperature of the nematic phase may simply be abbreviated as "minimum temperature." The compound represented by formula (1) may be abbreviated as "compound (1)." A plurality of same symbols including ring $A^1$, $Z^1$ and $X^1$ are described in an identical or different formula, and two arbitrary symbols may be identical or different.

"Arbitrary" represents any of not only positions but also numbers without including the case where the number is zero (0). An expression "arbitrary A may be replaced by B, C or D" includes the case where arbitrary A is replaced by B, the case where arbitrary A is replaced by C, and the case where arbitrary A is replaced by D, and also the case where a plurality of A are replaced by at least two of B to D. For example, an expression "alkyl in which arbitrary —$CH_2$— may be replaced by —O— or —CH=CH—" includes alkyl, alkenyl, alkoxy, alkoxyalkyl, alkoxyalkenyl and alkenyloxyalkyl. Incidentally, according to the invention, it is not preferred that two successive —$CH_2$— are replaced by —O— to form —O—O— or the like. Then it is also not preferred that a terminal —$CH_2$— in alkyl is replaced by —O—. The invention will be further explained below.

Advantageous Effects of Invention

A compound of the invention has general physical properties necessary for the compound, namely, stability to heat, light and so forth, a wide temperature range of a liquid crystal phase, a high clearing point, a good compatibility with other compounds, a large optical anisotropy and a large dielectric anisotropy. A composition containing the compound of the invention has a high maximum temperature of a nematic phase, a low minimum temperature of the nematic phase, a small viscosity, an optical anisotropy with a suitable largeness and a low threshold voltage. A liquid crystal display device including the compound of the invention has a wide temperature range in which the device can be used, a short response time, a low electric power consumption, a large contrast ratio and a low driving voltage.

DESCRIPTION OF EMBODIMENTS 1-1 Compound of the Invention

An embodiment of the invention relates to a compound represented by formula (1):

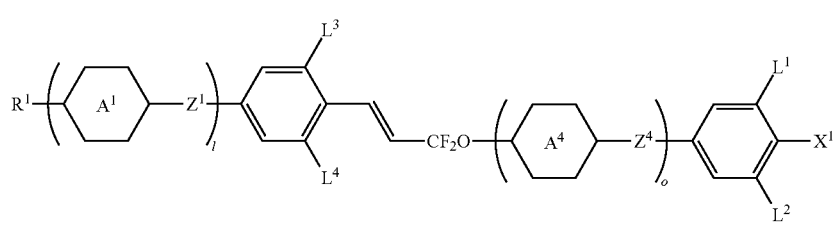

(1)

wherein, in formula (1), l and o are independently an integer from 0 to 3. Two arbitrary ring $A^1$ or the like when l is 2 or 3 may be identical or different. Thus, the compound of formula (1) may also be represented by formula (1'):

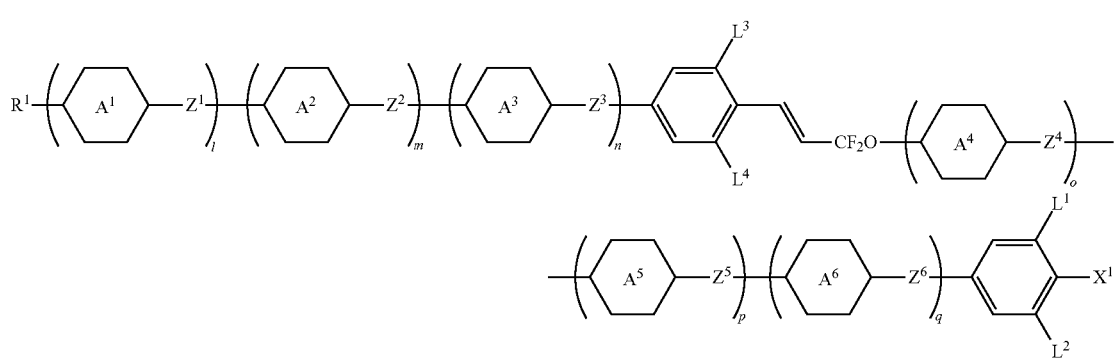

wherein, in formula (1'), l, m, n, o, p and q are independently 0 or 1, and a sum of l, m, n, o, p and q is 3 or less.

In formula (1'), $R^1$ is alkyl having 1 to 20 carbons, and in the alkyl, arbitrary —$CH_2$— may be replaced by —O—, —S— or —CH=CH—. Examples of groups in which arbitrary —$CH_2$— in $CH_3$—$(CH_2)_3$— is replaced by —O—, —S— or —CH=CH— include $CH_3$—$(CH_2)_2$—O—, $CH_3O$—$(CH_2)_2$—, $CH_3OCH_2O$—, $CH_3$—$(CH_2)_2$—S—, $CH_3S$—$(CH_2)_2$—, $CH_3SCH_2S$—, $CH_2$=CH—$(CH_2)_3$—, $CH_3CH$=CH—$(CH_2)_2$— and $CH_3CH$=$CHCH_2O$—.

Examples of such $R^1$ include alkyl, alkoxy, alkoxyalkyl, alkoxyalkoxy, thioalkyl, thioalkylalkoxy, alkenyl, alkenyloxy, alkenyloxyalkyl and alkoxyalkenyl. In the groups, a chain may be straight or branched, and a straight chain is preferable to a branched chain. Even if $R^1$ is a branched-chain group, $R^1$ when the group is optically active is preferred. A preferred configuration of —CH=CH— in alkenyl depends on a position of a double bond. A trans configuration is preferred in alkenyl having the double bond in an odd-numbered position, such as —CH=$CHCH_3$, —CH=$CHC_2H_5$, —CH=$CHC_3H_7$, —CH=$CHC_4H_9$, —$C_2H_4$—CH=$CHCH_3$ and —$C_2H_4$—CH=$CHC_2H_5$. A cis configuration is preferred in alkenyl having the double bond at an even-numbered position, such as —$CH_2CH$=$CHCH_3$, —$CH_2CH$=$CHC_2H_5$ and —$CH_2CH$=$CHC_3H_7$. An alkenyl compound having the preferred configuration has a high maximum temperature or a wide temperature range of a liquid crystal phase. A detailed description is found in Mol. Cryst. Liq. Cryst., 1985, 131, 109 and Mol. Cryst. Liq. Cryst., 1985, 131, 327.

Specific examples of alkyl include —$CH_3$, —$C_2H_5$, —$C_3H_7$, —$C_4H_9$, —$C_5H_{11}$, $C_6H_{13}$, —$C_7H_{15}$, —$C_8H_{17}$, —$C_9H_{19}$, —$C_{10}H_{21}$, —$C_{11}H_{23}$, —$C_{12}H_{25}$, —$C_{13}H_{27}$, —$C_{14}H_{29}$ and —$C_{15}H_{31}$.

Specific examples of alkoxy include —$OCH_3$, —$OC_2H_5$, —$OC_3H_7$, —$OC_4H_9$, —$OC_5H_{11}$, —$OC_6H_{13}$, and —$OC_7H_{15}$, —$OC_8H_{17}$, —$OC_9H_{19}$, —$OC_{10}H_{21}$, —$OC_{11}H_{23}$, —$OC_{12}H_{25}$, —$OC_{13}H_{27}$ and —$OC_{14}H_{29}$.

Specific examples of alkoxyalkyl include —$CH_2OCH_3$, —$CH_2OC_2H_5$, —$CH_2OC_3H_7$, —$(CH_2)_2$—$OCH_3$, —$(CH_2)_2$—$OC_2H_5$, —$(CH_2)_2$—$OC_3H_7$, —$(CH_2)_3$—$OCH_3$, —$(CH_2)_4$—$OCH_3$ and —$(CH_2)_5$—$OCH_3$.

Specific examples of alkenyl include —CH=$CH_2$, —CH=$CHCH_3$, —$CH_2CH$=$CH_2$, —CH=$CHC_2H_5$, —$CH_2CH$=$CHCH_3$, —$(CH_2)_2$—CH=$CH_2$, —CH=$CHC_3H_7$, —$CH_2CH$=$CHC_2H_5$, —$(CH_2)_2$—CH=$CHCH_3$ and —$(CH_2)_3$—CH=$CH_2$.

Specific examples of alkenyloxy include —$OCH_2CH$=$CH_2$, —$OCH_2CH$=$CHCH_3$ and —$OCH_2CH$=$CHC_2H_5$.

$R^1$ is preferably alkyl having 1 to 12 carbons or alkenyl having 2 to 12 carbons. Examples of the most preferred $R^1$ include —$CH_3$, —$C_2H_5$, —$C_3H_7$, —$C_4H_9$, —$C_5H_{11}$, —$C_6H_{13}$, —$C_7H_{15}$, —$C_8H_{17}$, —$C_9H_{19}$, —$C_{10}H_{21}$, —$C_{11}H_{23}$, —$C_{12}H_{25}$, —$C_{13}H_{27}$, —$C_{14}H_{29}$, —$C_{15}H_{31}$, —CH=$CH_2$, —CH=$CHCH_3$, —$CH_2CH$=$CH_2$, —CH=$CHC_2H_5$, —$CH_2CH$=$CHCH_3$, —$(CH_2)_2$—CH=$CH_2$, —CH=$CHC_3H_7$, —$CH_2CH$=$CHC_2H_5$, —$(CH_2)_2$—CH=$CHCH_3$ and —$(CH_2)_3$—CH=$CH_2$.

In formula (1'), ring $A^1$, ring $A^2$, ring $A^3$, ring $A^4$, ring $A^5$ and ring $A^6$ are independently 1,4-cyclohexylene (14-1), 1,3-dioxane-2,5-diyl (14-2), pyrimidine-2,5-diyl (14-3), pyridine-2,5-diyl (14-4), tetrahydropyran-2,5-diyl (14-5), 1,4-phenylene (14-6), or 1,4-phenylene in which arbitrary hydrogen is replaced by halogen. Examples of 1,4-phenylene in which arbitrary hydrogen is replaced by halogen include groups represented by formula (14-7) to formula (14-24). Examples of preferred groups include groups represented by formula (14-7) to formula (14-11).

(14-1)

(14-2)

(14-3)

(14-4)

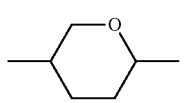 (14-5)
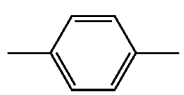 (14-6)
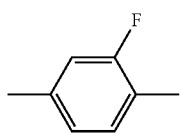 (14-7)
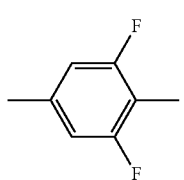 (14-8)
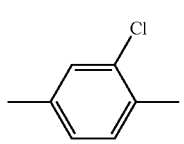 (14-9)
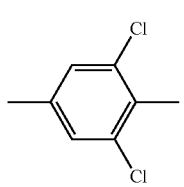 (14-10)
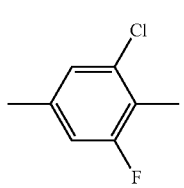 (14-11)
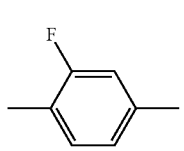 (14-12)
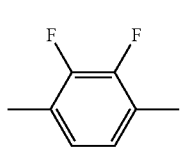 (14-13)
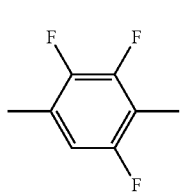 (14-14)
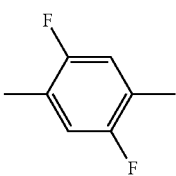 (14-15)
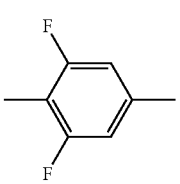 (14-16)
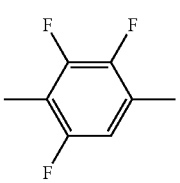 (14-17)
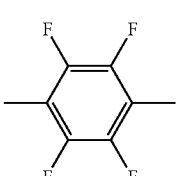 (14-18)
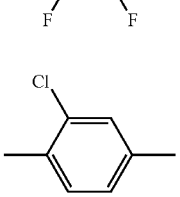 (14-19)
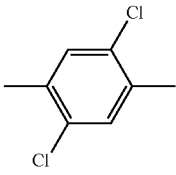 (14-20)
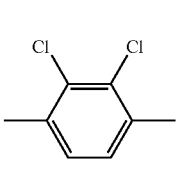 (14-21)
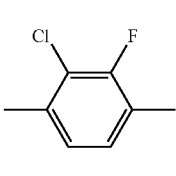 (14-22)
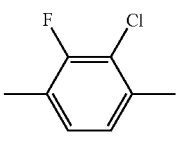 (14-23)

(14-24)

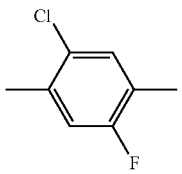

Examples of preferred ring $A^1$, ring $A^2$, ring $A^3$, ring $A^4$, ring $A^5$ and ring $A^6$ include 1,4-cyclohexylene (14-1), 1,3-dioxane-2,5-diyl (14-2), pyrimidine-2,5-diyl (14-3), pyridine-2,5-diyl (14-4), tetrahydropyran-2,5-diyl (14-5), 1,4-phenylene (14-6), 2-fluoro-1,4-phenylene (14-7) or (14-12), 2-chloro-1,4-phenylene (14-9) or (14-19), 2-chloro-6-fluoro-1,4-phenylene (14-11) and 2,6-difluoro-1,4-phenylene (14-8) or (14-16).

Examples of the most preferred ring $A^1$, ring $A^2$, ring $A^3$, ring $A^4$, ring $A^5$ and ring $A^6$ include 1,4-cyclohexylene, 1,4-phenylene, 2-fluoro-1,4-phenylene, 2-chloro-6-fluoro-1,4-phenylene and 2,6-difluoro-1,4-phenylene.

In formula (1'), $Z^1$, $Z^2$, $Z^3$, $Z^4$, $Z^5$ and $Z^6$ are independently a single bond, —$CH_2CH_2$—, —CH=CH—, —C≡C—, —COO—, —OCO—, —$CF_2O$—, —$OCF_2$—, —$CH_2O$—, —$OCH_2$—, —CF=CF—, —$(CH_2)_4$—, —$(CH_2)_2CF_2O$—, —$(CH_2)_2$—$OCF_2$—, —$CF_2O$—$(CH_2)_2$—, —$OCF_2$—$(CH_2)_2$—, —CH=CH—$(CH_2)_2$— or —$(CH_2)_2$—CH=CH—.

Examples of preferred $Z^1$, $Z^2$, $Z^3$, $Z^4$, $Z^5$ and $Z^6$ include a single bond, —$CH_2CH_2$—, —CH=CH—, —C≡C—, —COO—, —$CF_2O$—, —$CH_2O$— or —$OCH_2$—. In the bonds, as for the configuration of the double bond of a bonding group such as —CH=CH—, —CF=CF—, —CH=CH—$(CH_2)_2$— and —$(CH_2)_2$—CH=CH—, trans is preferable to cis. The most preferred $Z^1$, $Z^2$, $Z^3$, $Z^4$, $Z^5$ and $Z^6$ are a single bond.

In formula (1'), $L^1$, $L^2$, $L^3$ and $L^4$ are independently hydrogen, fluorine or chlorine. $L^1$, $L^2$, $L^3$ and $L^4$ are preferably independently hydrogen or fluorine. When ring $A^1$ is 1,4-phenylene, $X^1$ is fluorine, l=1 and m=n=o=p=q=0, at least one of $L^1$, $L^2$, $L^3$ and $L^4$ is hydrogen or chlorine.

In formula (1'), $X^1$ is hydrogen, halogen, —C≡N, —N=C=S, —$SF_5$ or alkyl having 1 to 10 carbons, and in alkyl having 2 to 10 carbons, arbitrary —$CH_2$— may be replaced by —O—, —S— or —CH=CH—. Moreover, in a group in which arbitrary —$CH_2$— is replaced by —O—, —S— or —CH=CH— in alkyl having 1 to 10 carbons, or in the alkyl, alkyl having 2 to 10 carbons, and arbitrary hydrogen may be replaced by halogen.

Specific examples of alkyl in which arbitrary hydrogen is replaced by halogen include —$CH_2F$, —$CHF_2$, —$CF_3$, —$(CH_2)_2$—F, —$CF_2CH_2F$, —$CF_2CHF_2$, —$CH_2CF_3$, —$CF_2CF_3$, —$(CH_2)_3$—F, —$(CF_2)_3$—F, —$CF_2CHFCF_3$, —$CHFCF_2CF_3$, —$(CH_2)_4$—F, —$(CF_2)_4$—F, —$(CH_2)_5$—F and —$(CF_2)_5$—F.

Specific examples of alkoxy in which arbitrary hydrogen is replaced by halogen include —$OCH_2F$, —$OCHF_2$, —$OCF_3$, —O—$(CH_2)_2$—F, —$OCF_2CH_2F$, —$OCF_2CHF_2$, —$OCH_2CF_3$, —O—$(CH_2)_3$—F, —O—$(CF_2)_3$—F, —$OCF_2CHFCF_3$, —$OCHFCF_2CF_3$, —O—$(CH_2)_4$—F, —O—$(CF_2)_4$—F, —O—$(CH_2)_5$—F and —O—$(CF_2)_5$—F.

Specific examples of alkenyl in which arbitrary hydrogen is replaced by halogen include —CH=CHF, —CH=$CF_2$, —CF=CHF, —CH=$CHCH_2F$, —CH=$CHCF_3$, —$(CH_2)_2$—CH=$CF_2$, —$CH_2CH$=$CHCF_3$ and —CH=$CHCF_2CF_3$.

Specific examples of $X^1$ include hydrogen, fluorine, chlorine, —C≡N, —N=C=S, —$SF_5$, —$CH_3$, —$C_2H_5$, —$C_3H_7$, —$C_4H_9$, —$C_5H_{11}$, —$C_6H_{13}$, —$C_7H_{15}$, —$C_8H_{17}$, —$C_9H_{19}$, —$C_{10}H_{21}$, —$CH_2F$, —$CHF_2$, —$CF_3$, —$(CH_2)_2$—F, —$CF_2CH_2F$, —$CF_2CHF_2$, —$CH_2CF_3$, —$CF_2CF_3$, —$(CH_2)_3$—F, —$(CF_2)_3$—F, —$CF_2CHFCF_3$, —$CHFCF_2CF_3$, —$(CH_2)_4$—F, —$(CF_2)_4$—F, —$(CH_2)_5$—F, —$(CF_2)_5$—F, —$OCH_3$, —$OC_2H_5$, —$OC_3H_7$, —$OC_4H_9$, —$OCH_2F$, —$OCHF_2$, —$OCF_3$, —O—$(CH_2)_2$—F, —$OCF_2CH_2F$, —$OCF_2CHF_2$, —$OCH_2CF_3$, —O—$(CH_2)_3$—F, —O—$(CF_2)_3$—F, —$OCF_2CHFCF_3$, —$OCHFCF_2CF_3$, —O$(CH_2)_4$—F, —O—$(CF_2)_4$—F, —O—$(CH_2)_5$—F, —O—$(CF_2)_5$—F, —CH=$CH_2$, —CH=$CHCH_3$, —$CH_2CH$=$CH_2$, —CH=$CHC_2H_5$, —$CH_2CH$=$CHCH_3$, —$(CH_2)_2$—CH=$CH_2$, —CH=$CHC_3H_7$, —$CH_2CH$=$CHC_2H_5$, —$(CH_2)_2$—CH=$CHCH_3$, —$(CH_2)_3$—CH=$CH_2$, —CH=CHF, —CH=$CF_2$, —CF=CHF, —CH=$CHCH_2F$, —CH=$CHCF_3$, —$(CH_2)_2$—CH=$CF_2$, —$CH_2CH$=$CHCF_3$ and —CH=$CHCF_2CF_3$.

Examples of preferred $X^1$ include fluorine, chlorine, —C≡N, —$CF_3$, —$CHF_2$, —$CH_2F$, —$OCF_3$, —$OCHF_2$ and —$OCH_2F$. Examples of the most preferred $X^1$ are fluorine, chlorine, —$CF_3$ and —$OCF_3$.

In formula (1'), l, m, n, o, p and q are independently 0 or 1, and a sum, 1+m+n+o+p+q, is 3 or less. A preferred combination of l, m, n, o, p and q is (l=1, m=n=o=p=q=0) as in formula (1-1), (l=m=1, n=o=p=q=0) as in formula (1-2), (l=o=1, m=n=p=q=0) as in formula (1-3), (l=m=o=1, n=p=q=0) as in formula (1-4), and (l=m=n=1, o=p=q=0) as in formula (1-5).

1-2 Properties of Compound of the Invention and a Method for Adjusting the Compound Compound (1) of the invention will be explained in more detail. Under conditions in which a device is usually used, compound (1) is very stable both physically and chemically and has a good compatibility with other compounds. A composition containing the compound is stable under conditions in which the device is usually used. Even if the composition is kept at a low temperature, the compound will not deposit in the form of crystals (or a smectic phase). The compound has the wide temperature range of the liquid crystal phase and a high clearing point. Accordingly, a temperature range of a nematic phase can be extended in the composition, and the compound can be used in the wide temperature range in the form of a display device. Moreover, the compound has a large optical anisotropy. Therefore, the compound is suitable for producing a liquid crystal display device being responsive at a high speed. Furthermore, the compound has a large dielectric anisotropy, and hence is useful as a component for decreasing threshold voltage of the composition.

Physical properties such as a clearing point, an optical anisotropy and a dielectric anisotropy can be arbitrarily adjusted by suitably selecting a combination of l, m, n, o, p and q, types of ring $A^1$ to ring $A^6$, left terminal group $R^1$, a group on a rightmost benzene ring and a replacement position thereof ($L^1$, $L^2$ and $X^1$), or bonding groups $Z^1$ to $Z^6$ in compound (1). An effect of the combination of l, m, n, o, p and q, and types of ring $A^1$ to ring $A^6$, left terminal group $R^1$, right terminal group $X^1$, bonding groups $Z^1$ to $Z^6$ and $L^1$, $L^2$, $L^3$ and $L^4$ on the physical properties of compound (1) will be explained below.

When the combination of l, m, n, o, p and q is (l=1, m=n=o=p=q=0) as in formula (1-1), compatibility with other compounds is good and viscosity is low. When the combination is (l=m=1, n=o=p=q=0) as in formula (1-2), a temperature range of the liquid crystal phase is wide, the clearing point is high and the optical anisotropy is large. When the combination is (l=o=1, m=n=p=q=0) as in formula (1-3), the compatibility with other compounds is good and the dielectric anisotropy is large. When the combination is (l=m=o=1, n=p=q=0) as in formula (1-4), the clearing point is high, the dielectric anisotropy is large, and the optical anisotropy is large. When the combination is (l=m=n=1, o=p=q=0) as in formula (1-5), the clearing point is very high, and the optical anisotropy is large.

When all of ring $A^1$ to ring $A^6$ include 1,4-phenylene in compound (1), a chemical stability is high, and the optical anisotropy and the dielectric anisotropy are large. When at least one of ring $A^1$ to ring $A^6$ is 1,4-cyclohexylene, the compatibility with other compounds is good, the clearing point is high and the viscosity is small. When at least one of ring $A^1$ to ring $A^6$ is 1,3-dioxane-2,5-diyl or pyrimidine-2,5-diyl, the dielectric anisotropy is very large. When at least one of ring $A^1$ to ring $A^6$ is tetrahydropyran-2,5-diyl, the compatibility with other compounds is good.

When the chain of $R^1$ is straight, the temperature range of the liquid crystal phase is wide and the viscosity is small. When the chain of $R^1$ is branched, the compatibility with other compounds is good. A compound in which $R^1$ is an optically active group is useful as a chiral dopant. A reverse twisted domain to be generated in the device can be prevented by adding the compound to the composition. A compound in which $R^1$ is not an optically active group is useful as the component of the composition. When $R^1$ is alkenyl, the preferred configuration depends on the position of the double bond. The alkenyl compound having the preferred configuration has the high maximum temperature or the wide temperature range of the liquid crystal phase.

When one of bonding groups $Z^1$, $Z^2$, $Z^3$, $Z^4$, $Z^5$ and $Z^6$ is a single bond, —$CH_2CH_2$—, —CH=CH—, —$CF_2O$—, —$OCF_2$—, —$CH_2O$—, —CF=CF—, —$(CH_2)_3$—O—, —O—$(CH_2)_3$—, —$(CH_2)_2$—$CF_2O$—, —$OCF_2$—$(CH_2)_2$— or —$(CH_2)_4$—, the viscosity is small. When one of the bonding groups is a single bond, —$(CH_2)_2$—, —$CF_2O$—, —$OCF_2$— or —CH=CH—, the viscosity is smaller. When one of the bonding groups is —CH=CH—, the temperature range of the liquid crystal phase is wide, and an elastic constant ratio $K_{33}/K_{11}$ ($K_{33}$: bend elastic constant, $K_{11}$: spray elastic constant) is large. When one of the bonding groups is —C≡C—, the optical anisotropy is large. When $Z^1$, $Z^2$, $Z^3$, $Z^4$, $Z^5$ and $Z^6$ each are a single bond, —$(CH_2)_2$—, —$CH_2O$—, —$CF_2O$—, —$OCF_2$— or —$(CH_2)_4$—, compound (1) is comparatively chemically stable, and relatively hard to be deteriorated.

When right terminal group $X^1$ is fluorine, chlorine, —C≡N, —N=C=S, —$SF_5$, —$CF_3$, —$CHF_2$, —$CH_2F$, —$OCF_3$, —$OCHF_2$ or —$OCH_2F$, the dielectric anisotropy is large. When $X^1$ is —C≡N, —N=C=S or alkenyl, the optical anisotropy is large. When $X^1$ is fluorine, —$OCF_3$, —$CF_3$ or alkyl, compound (1) is chemically stable.

When both $L^1$ and $L^2$ are fluorine and $X^1$ is fluorine, chlorine, —C≡N, —N=C=S, —$SF_5$, —$CF_3$, —$CHF_2$, —$CH_2F$, —$OCF_3$, —$OCHF_2$ or —$OCH_2F$, the dielectric anisotropy is large. When $L^1$ is fluorine and $X^1$ is —$OCF_3$, when both $L^1$ and $L^2$ are fluorine and $X^1$ is —$OCF_3$ or —$CF_3$ or when all of $L^1$, $L^2$ and $X^1$ are fluorine, values of the dielectric anisotropy are large, the temperature range of the liquid crystal phase is wide, and compound (1) is chemically stable and hard to be deteriorated.

As described above, a compound having objective physical properties can be obtained by suitably selecting types of ring structures, terminal groups, the bonding groups and so forth. Accordingly, compound (1) is useful as the component of the composition to be used for the device such as PC, TN, STN, ECB, OCB, IPS or VA.

1-3 Specific Examples of Compound (1)

Examples of preferred compound (1) are represented by formula (1-1) to formula (1-5). Examples of further preferred compound (1) are represented by formula (1-6) to formula (1-38). Examples of still further preferred compound (1) are represented by formula (1-39) to formula (1-49).

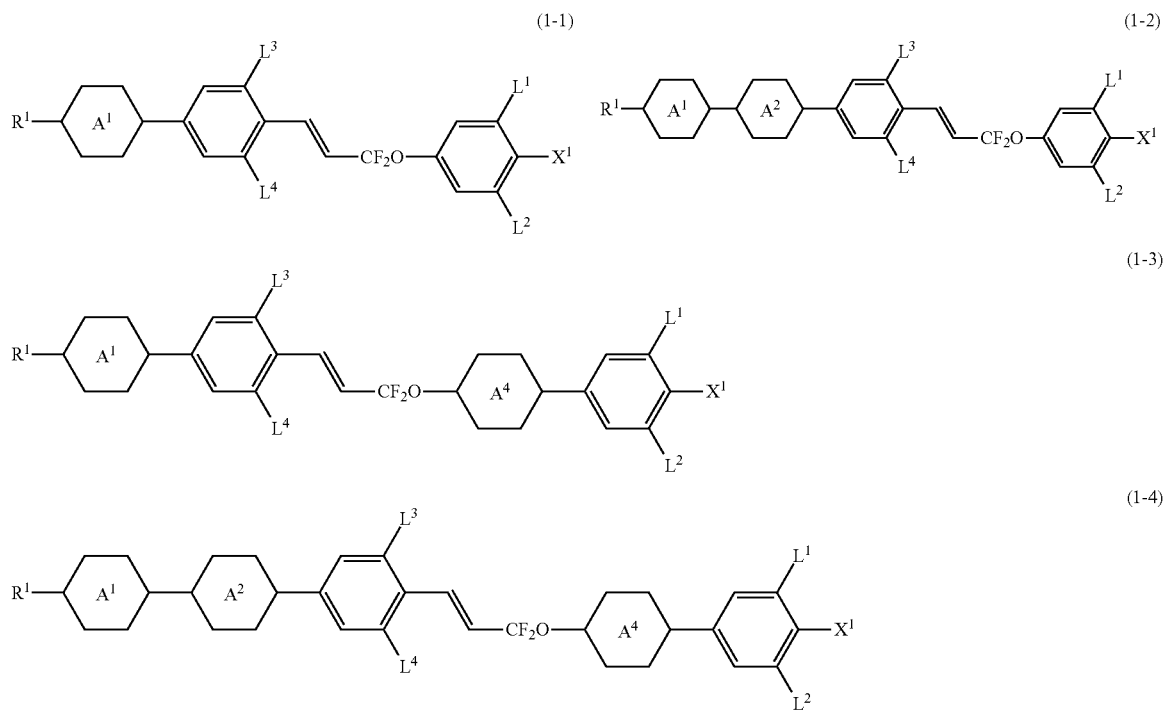

(1-5)
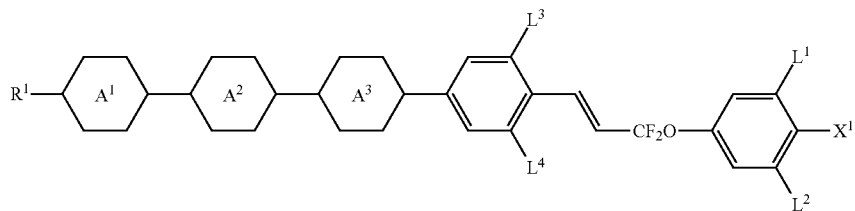

wherein, in the formulas, R¹ is alkyl having 1 to 12 carbons or alkenyl having 2 to 12 carbons; ring A¹, ring A², ring A³ and ring A⁴ are independently 1,4-cyclohexylene, 1,3-dioxane-2,5-diyl, pyrimidine-2,5-diyl, pyridine-2,5-diyl, tetrahydropyran-2,5-diyl, 1,4-phenylene, or 1,4-phenylene in which arbitrary hydrogen is replaced by halogen; $L^1$, $L^2$, $L^3$ and $L^4$ are independently hydrogen, chlorine or fluorine; and $X^1$ is fluorine, chlorine, —$CF_3$ or —$OCF_3$. Then, when ring $A^1$ is 1,4-phenylene and $X^1$ is fluorine in formula (1-1), at least one of $L^1$, $L^2$, $L^3$ and $L^4$ is hydrogen.

(1-6)
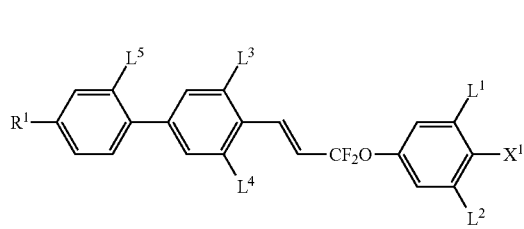

(1-7)
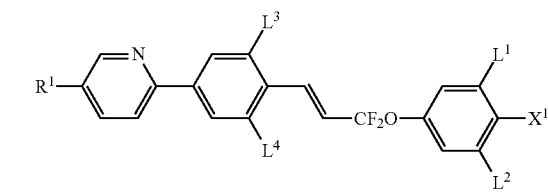

(1-8)
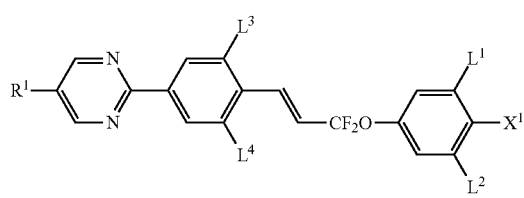

(1-9)
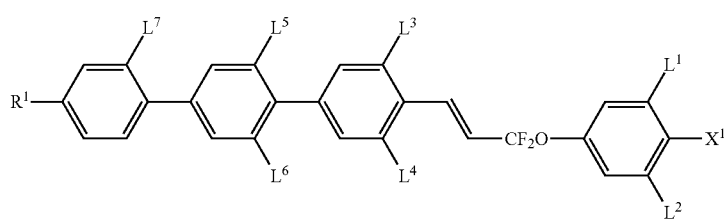

(1-10)
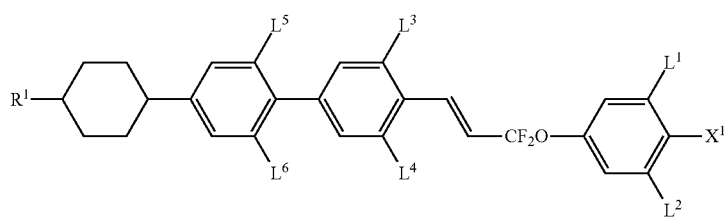

(1-11)
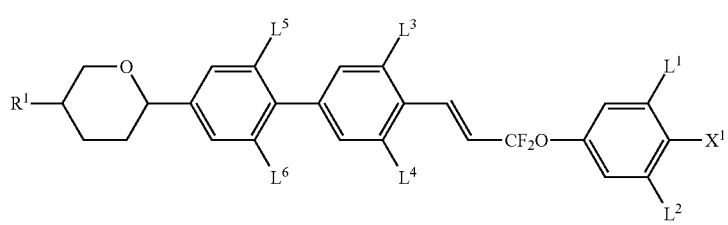

-continued
(1-12)
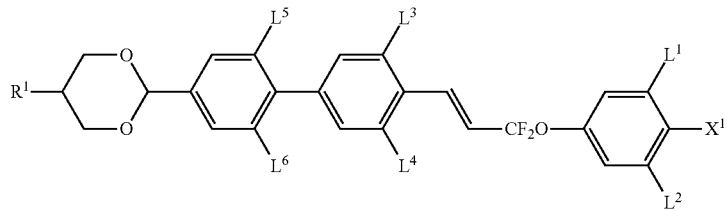
(1-13)
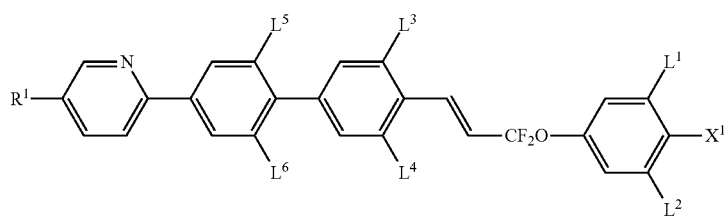
(1-14)
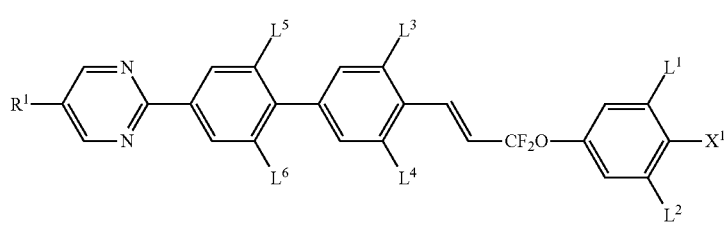
(1-15)
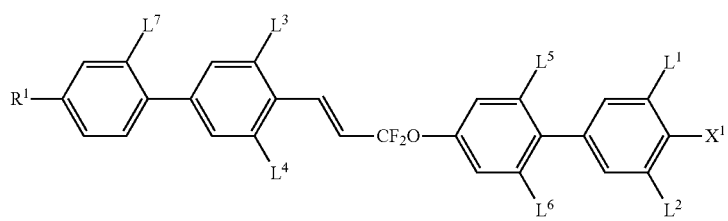
(1-16)
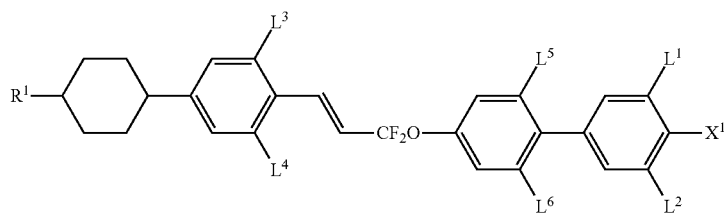
(1-17)
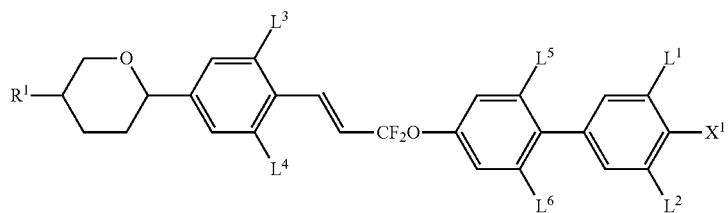
(1-18)
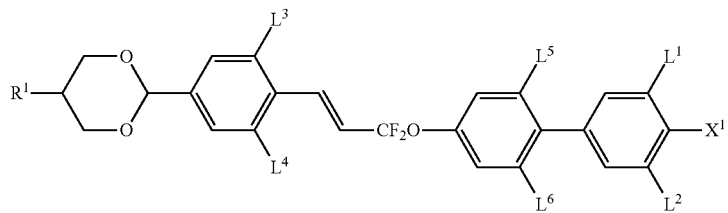

(1-19)
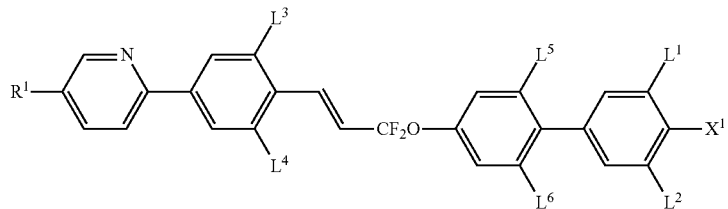
(1-20)
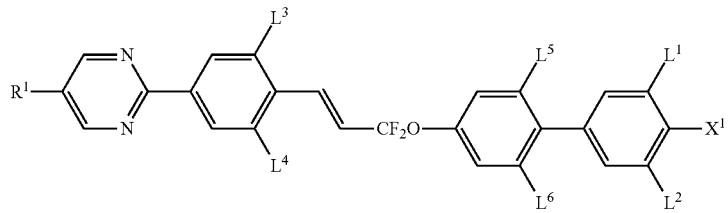
(1-21)
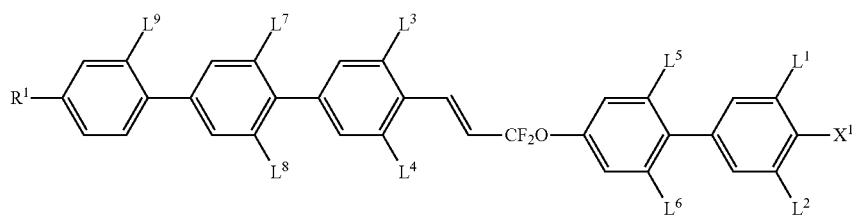
(1-22)
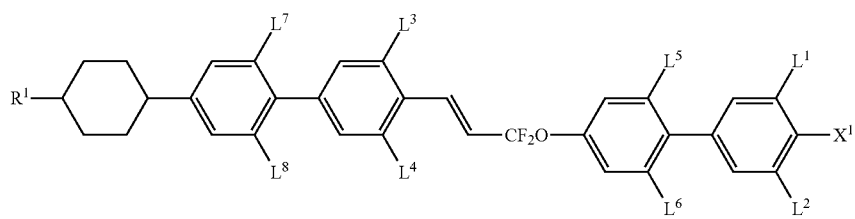
(1-23)
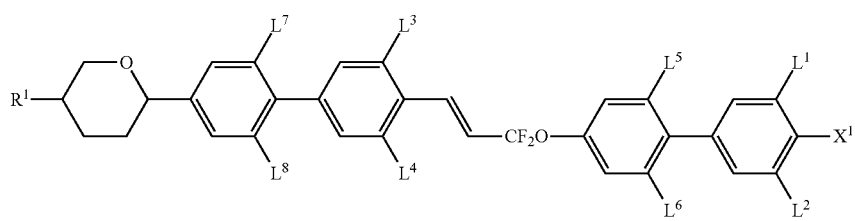
(1-24)
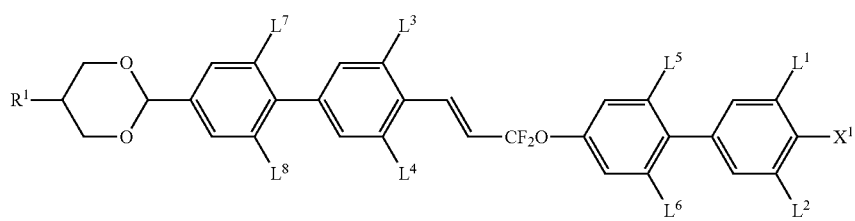
(1-25)
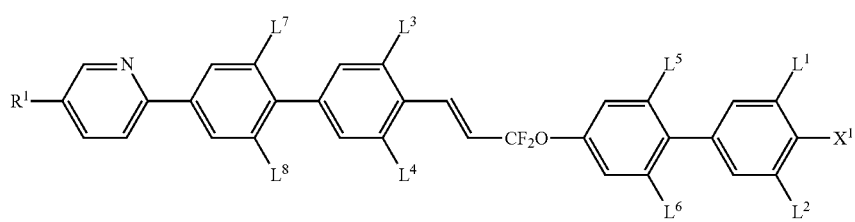

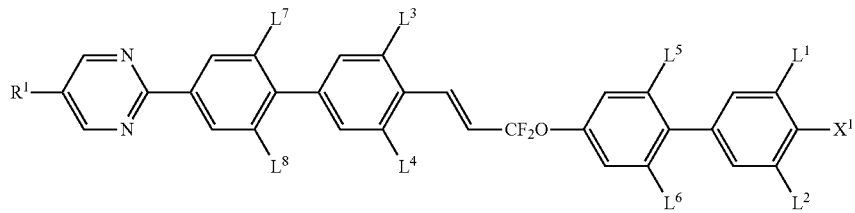
(1-26)
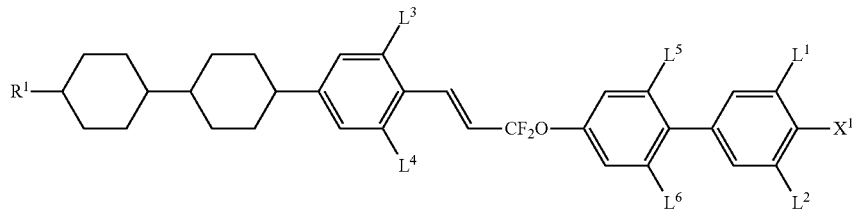
(1-27)
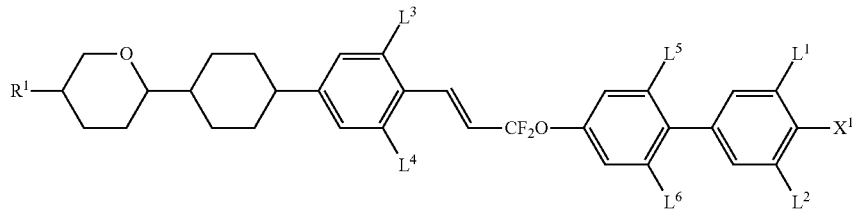
(1-28)
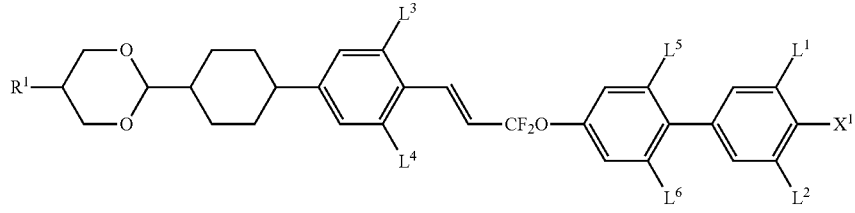
(1-29)
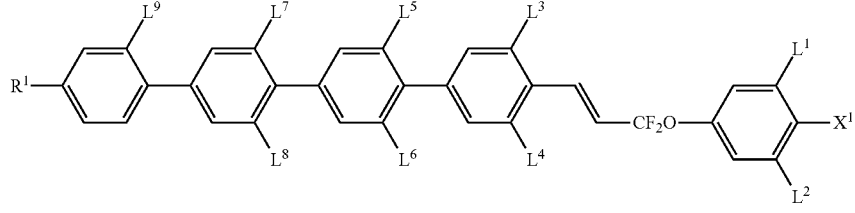
(1-30)
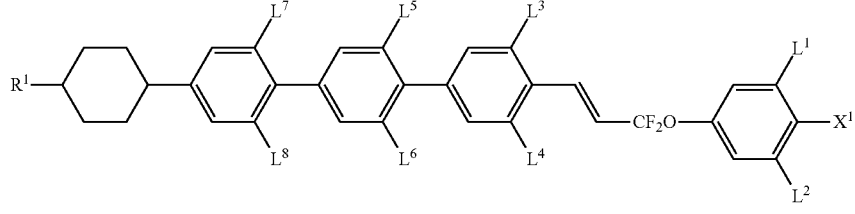
(1-31)
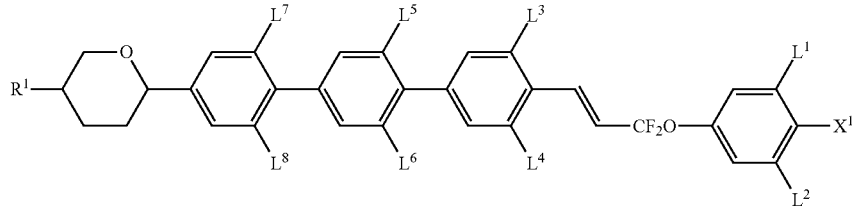
(1-32)

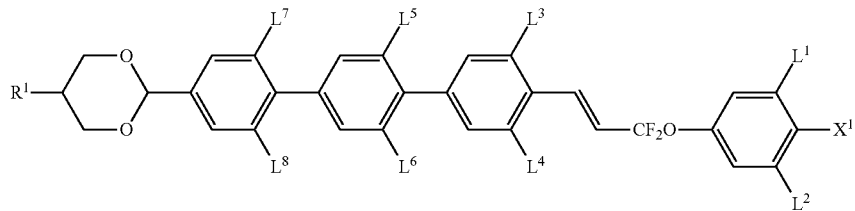
(1-33)
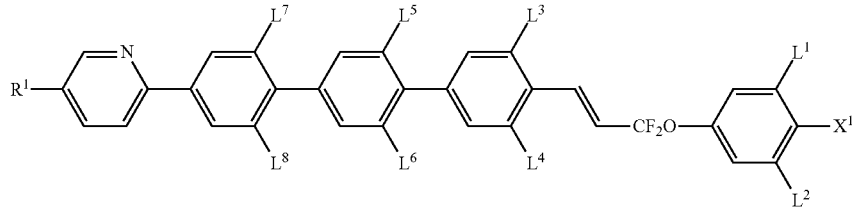
(1-34)
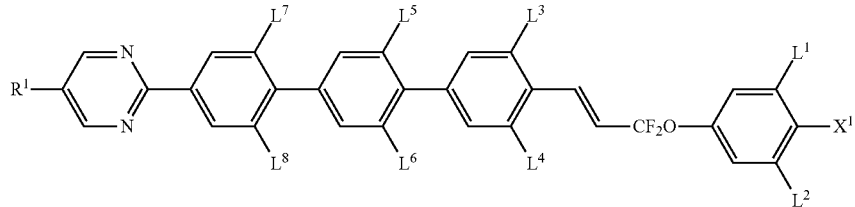
(1-35)
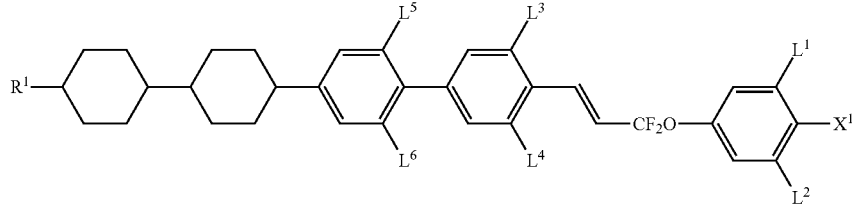
(1-36)
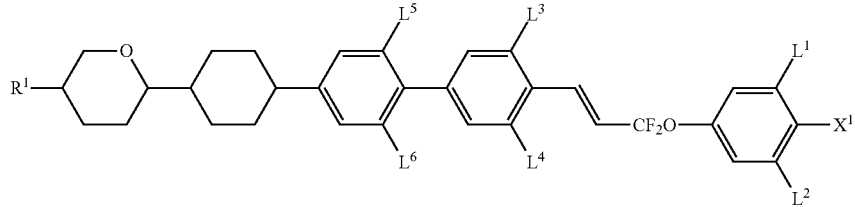
(1-37)
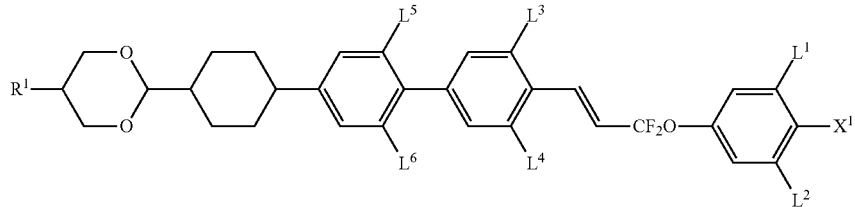
(1-38)
wherein, in the formulas, $R^1$ is alkyl having 1 to 12 carbons; $L^1$, $L^2$, $L^3$, $L^4$, $L^5$, $L^6$, $L^7$, $L^8$ and $L^9$ are independently hydrogen, chlorine or fluorine; and $X^1$ is fluorine, chlorine, $-CF_3$ or $-OCF_3$. Then, when $X^1$ is fluorine in formula (1-6), at least one of $L^1$, $L^2$, $L^3$ and $L^4$ is hydrogen.

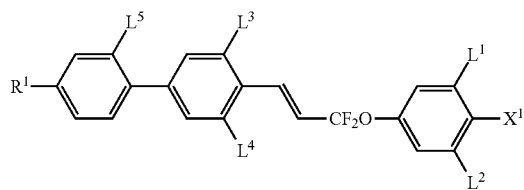
(1-39)
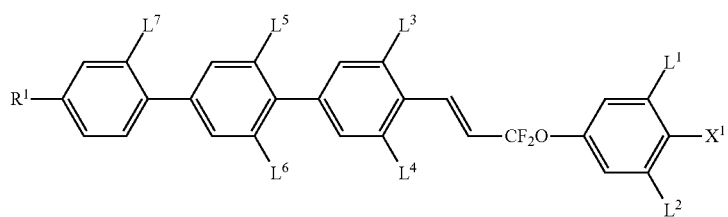
(1-40)
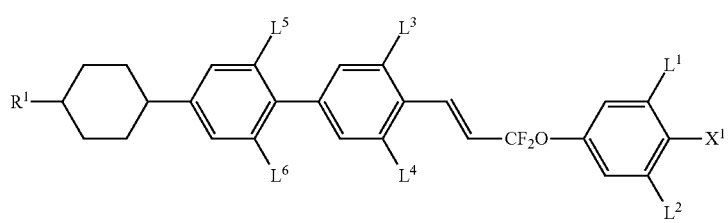
(1-41)
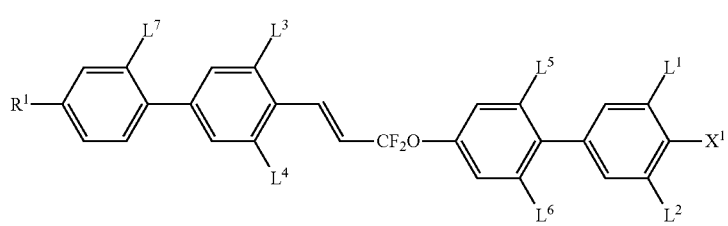
(1-42)
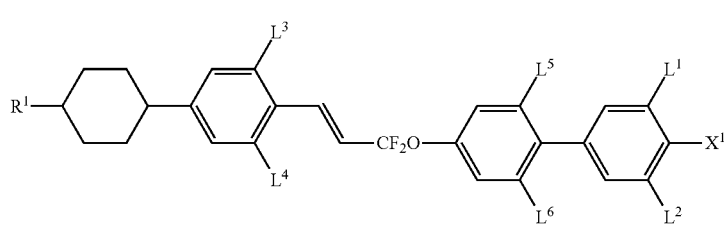
(1-43)
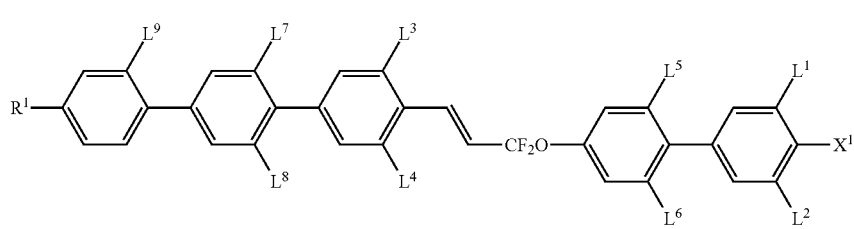
(1-44)
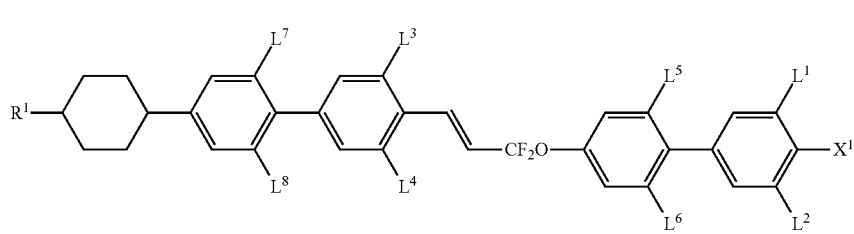
(1-45)

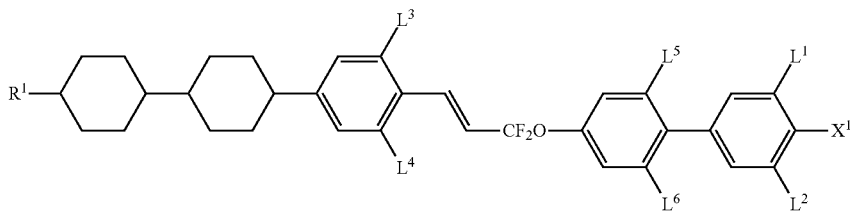
(1-46)

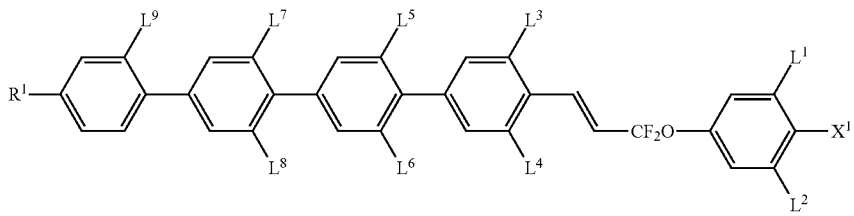
(1-47)

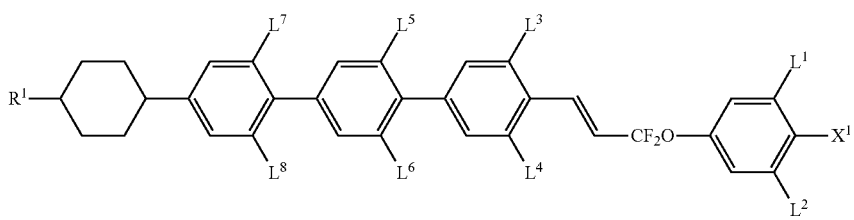
(1-48)

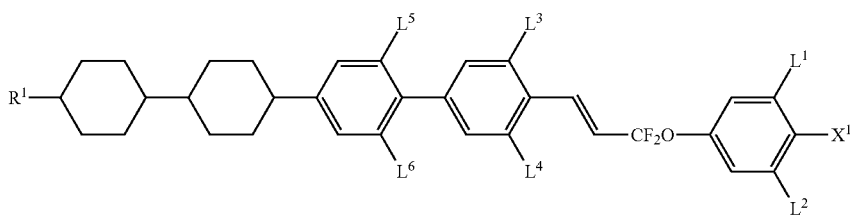
(1-49)

wherein, in the formulas, $R^1$ is alkyl having 1 to 12 carbons; $L^1, L^2, L^3, L^4, L^5, L^6, L^7, L^8$ and $L^9$ are independently hydrogen or fluorine; $X^1$ is fluorine, chlorine, —$CF_3$ or —$OCF_3$. Then, when $X^1$ is fluorine in formula (1-39), at least one of $L^1$, $L^2$, $L^3$ and $L^4$ is hydrogen.

1-4 Preparation of Compound (1)

Next, preparation of compound (1) will be explained. Compound (1) can be prepared by suitably combining techniques in synthetic organic chemistry. Methods for introducing objective terminal groups, rings and bonding groups into starting materials are described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza, in Japanese) (Maruzen Co., Ltd.).

1-4-1 Method for Forming Bonding Groups $Z^1$ to $Z^6$

One example of methods for forming bonding groups $Z^1$ to $Z^6$ in compound (1) is as described in the schemes below. In the schemes, $MSG^1$ or $MSG^2$ is a monovalent organic group having at least one ring. A plurality of $MSG^1$ (or $MSG^2$) used in the schemes may be identical or different. Compound (1A) to compound (1J) correspond to compound (1).

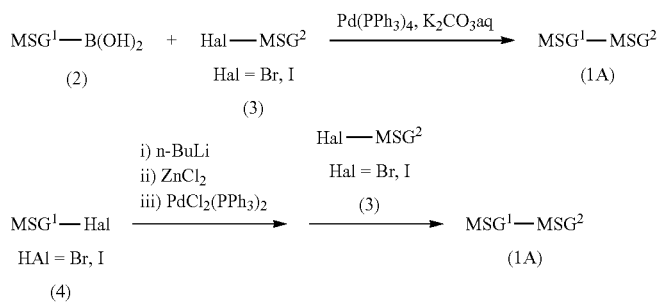

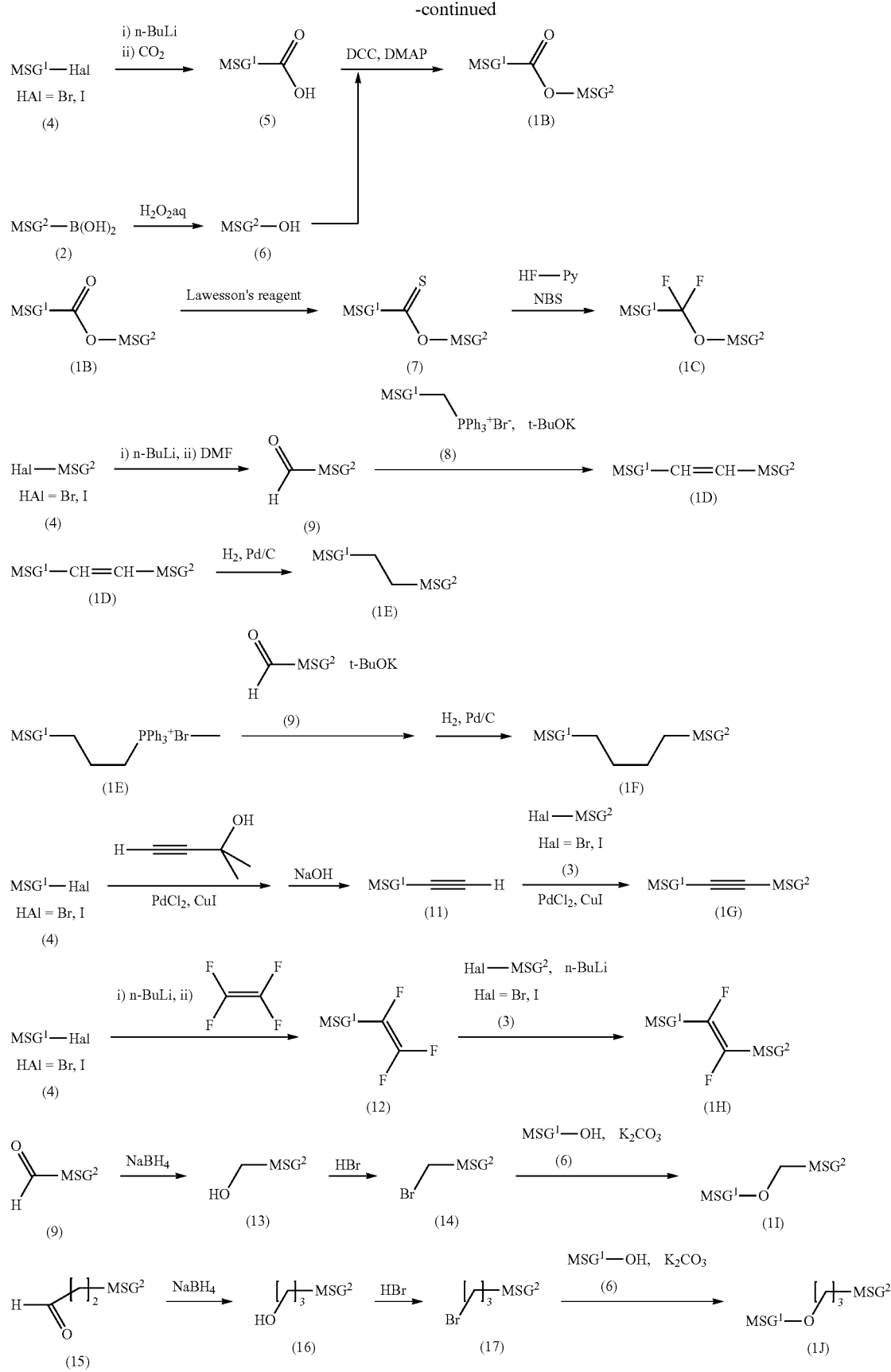

Next, methods for forming various types of bonds of bonding groups $Z^1$ to $Z^6$ in compound (1) will be explained in section (I) to section (XI) as described below.

(I) Formation of a Single Bond

Compound (1A) is prepared by allowing arylboronic acid (2) to react with compound (3) prepared according to a known method in the presence of an aqueous solution of carbonate and a catalyst such as tetrakis(triphenylphosphine) palladium. Compound (1A) is also prepared by allowing compound (4) prepared according to a known method to react with n-butyllithium and subsequently with zinc chloride, and further with compound (3) in the presence of a catalyst such as dichlorobis(triphenylphosphine) palladium.

(II) Formation of —COO— and —OCO—

Carboxylic acid (5) is obtained by allowing compound (4) to react with n-butyllithium and subsequently with carbon dioxide. Compound (1B) having —COO— is prepared by performing dehydration of compound (5) and phenol (6) prepared according to a known method in the presence of 1,3-dicyclohexylcarbodiimide (DCC) and 4-dimethylaminopyridine (DMAP). A compound having —OCO— is also prepared according to the method.

(III) Formation of —CF$_2$O— and —OCF$_2$—

Compound (7) is obtained by treating compound (1B) with a thiation reagent such as Lawesson's reagent. Compound (1C) having —CF$_2$O— is prepared by fluorinating compound (7) with a hydrogen fluoride pyridine complex and N-bromosuccinimide (NBS). See M. Kuroboshi et al., Chem. Lett., 1992, 827. Compound (1C) is also prepared by fluorinating compound (7) with (diethylamino) sulfur trifluoride (DAST). See W. H. Bunnelle et al., J. Org. Chem. 1990, 55, 768. A compound having —OCF$_2$— is also prepared according to the method. The bonding groups can also be formed according to the method described in Peer. Kirsch et al., Angew. Chem. Int. Ed. 2001, 40, 1480.

(IV) Formation of —CH=CH—

Aldehyde (9) is obtained by treating compound (4) with n-butyllithium and then allowed to react with formamide such as N,N-dimethylformamide (DMF). Compound (1D) is prepared by allowing phosphorus ylide generated by treating phosphonium salt (8) prepared according to a known method with a base such as potassium tert-butoxide to react with aldehyde (9). Because a cis isomer is generated depending on reaction conditions, the cis isomer is isomerized to a trans isomer according to a known method, when necessary.

(V) Formation of —(CH$_2$)$_2$—

Compound (1E) is prepared by hydrogenating compound (1D) in the presence of a catalyst such as palladium on carbon.

(VI) Formation of —(CH$_2$)$_4$—

A compound having —(CH$_2$)$_2$—CH=CH— is obtained by using phosphonium salt (10) in place of phosphonium salt (8) according to the method in section (IV). Compound (1F) is prepared by performing catalytic hydrogenation of the compound obtained.

(VII) Formation of —C≡C—

Compound (II) is obtained by allowing compound (4) to react with 2-methyl-3-butyn-2-ol in the presence of a catalyst including dichloropalladium and copper halide, and then performing deprotection under basic conditions. Compound (1G) is prepared by allowing compound (II) to react with compound (3) in the presence of a catalyst including dichlorobistriphenylphosphine palladium and copper halide.

(VIII) Formation of —CF=CF—

Compound (12) is obtained by treating compound (4) with n-butyllithium and then allowing the treated compound to react with tetrafluoroethylene. Compound (1H) is prepared by treating compound (3) with n-butyllithium and then allowing the treated compound to react with compound (12).

(IX) Formation of —CH$_2$O— or —OCH$_2$—

Compound (13) is obtained by reducing compound (9) with a reducing agent such as sodium borohydride. Compound (14) is obtained by halogenating compound (13) with hydrobromic acid or the like. Compound (II) is prepared by allowing compound (14) to react with compound (6) in the presence of potassium carbonate or the like.

(X) Formation of —(CH$_2$)$_3$O— and —O(CH$_2$)$_3$—

Compound (1J) is prepared by using compound (15) in place of compound (9) in a manner similar to preceding section (IX).

1-4-2 Methods for Preparing Ring A$^1$, Ring A$^2$, Ring A$^3$, Ring A$^4$, Ring A$^5$ and Ring A$^6$ Starting materials are marketed or synthetic processes are well known for rings such as 1,4-cyclohexylene, 1,3-dioxane-2,5-diyl, pyrimidine-2,5-diyl, pyridine-2,5-diyl, tetrahydropyran-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene and 2,3,5,6-tetrafluoro-1,4-phenylene.

1-4-3-1 Method for Preparing Compound (1)

A plurality of methods for preparing a compound represented by formula (1) are known. Examples of the methods are shown herein. Methoxyvinylbenzene derivative (19) is obtained by performing Wittig reaction by allowing methoxymethyltriphenylphosphonium chloride and potassium t-butoxide to act on benzaldehyde derivative (18), and then treated with formic acid to be converted into aldehyde derivative (20). 3,3-Difluoroallylbenzene derivative (21) is obtained by allowing triphenylphosphine and sodium chlorodifluoroacetate to act thereon, and then allowing bromine to act thereon to be converted into 2,3-dibromo-3,3-difluoropropylbenzene derivative (22). Subsequently, derivative (22) is etherified with alcohol derivative (23), and thus can be converted into compound (1).

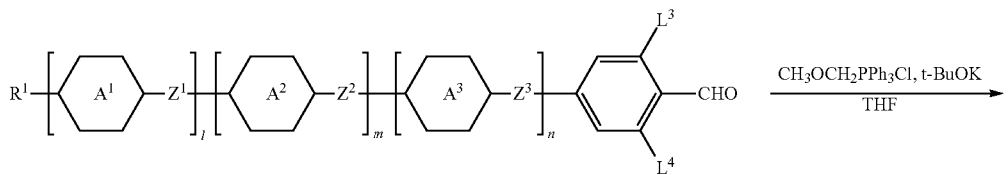

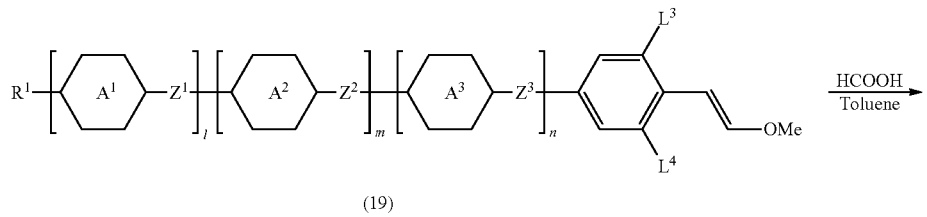

(19)

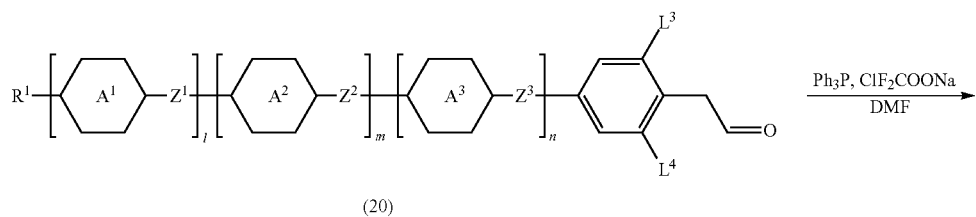

(20)

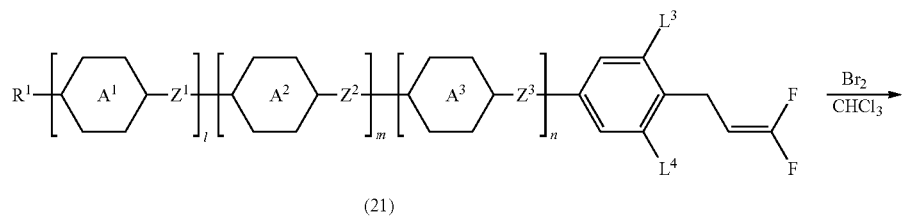

(21)

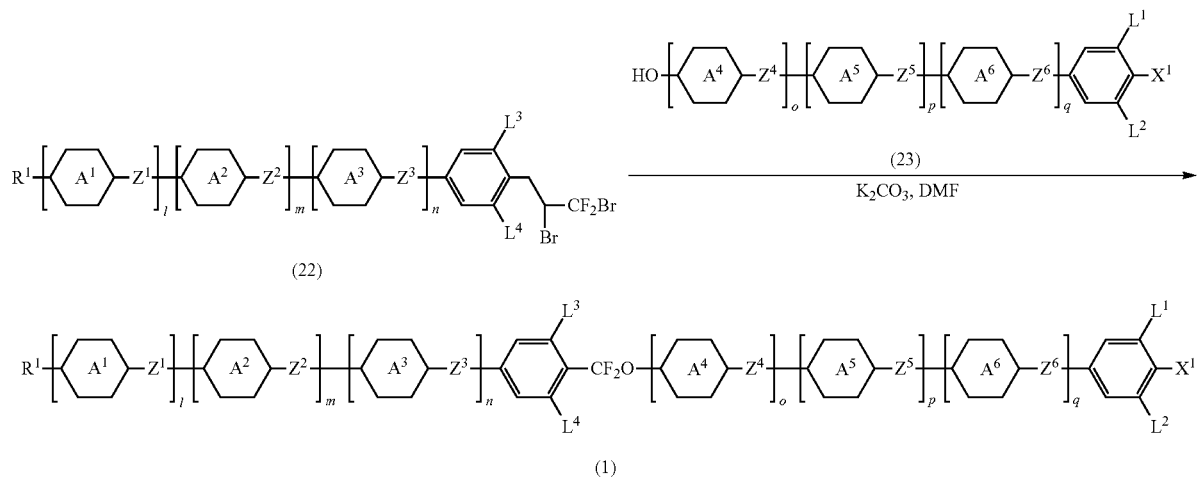

(22)

(1)

wherein, in the formulas, ring $A^1$ to ring $A^6$, $Z$ to $Z^6$, $L$ to $L^4$, $R^1$, $X^1$, l, m, n, o, p and q are defined in the same way as described in item 1.

1-4-3-2 Method for Preparing Alcohol Derivative (23) being a Synthetic Raw Material Alcohol derivative (23) being a raw material for preparing compound (1) is prepared, for example, in accordance with the technique as described below.

When both o and p are 0 in formula (23), objective alcohol derivative (23-1) can be easily produced by allowing trialkyl borate to act on Grignard reagent prepared from bromobenzene derivative (24) and then oxidizing the thus obtained boronic acid ester derivative with peracetic acid (R. L. Kidwell et al., Organic Syntheses, Vol. 5, P918 (1973)), or by oxidizing boronic acid derivative (25), easily obtained by acid hydrolysis of a boronic acid ester, with peracetic acid.

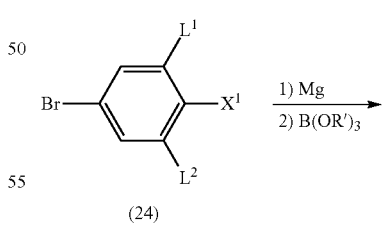

(24)

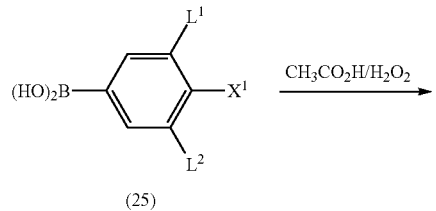

(25)

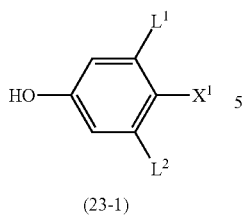

(23-1)

wherein, in the formula, $L^1$, $L^2$ and $X^1$ are defined in the same way as described in item 1.

When both $Z^4$ and $Z^5$ are a single bond, o is 1 and p is 0 or when both o and p are 1 in formula (23), compound (28) is obtained, for example, by allowing anisole derivative (27) to act on boronic acid derivative (26) by using tetrakistriphenylphosphinepalladium as a catalyst in the presence of a base to perform coupling (Akira Suzuki et al., Journal of Synthetic Organic Chemistry, Japan (Yuki Gosei Kagaku Kyokai Shi, in Japanese), Vol. 46, No. 9, 848 (1988)). Subsequently, objective phenol derivative (23-2) can be prepared by allowing boron tribromide to act thereon to perform demethylation.

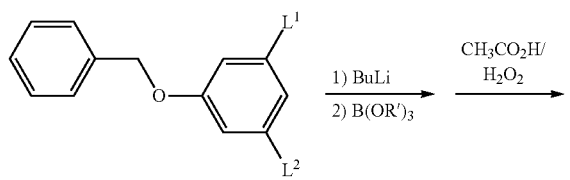

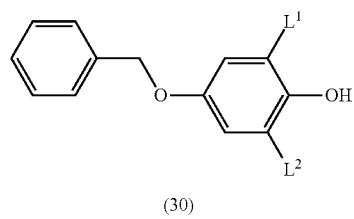

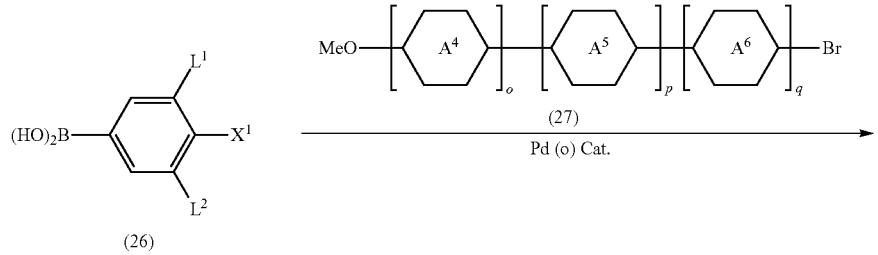

(28)

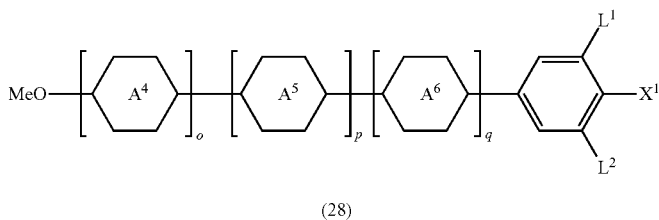

(23-2)

wherein, in the formula, ring $A^4$ is 1,4-phenylene, or 1,4-phenylene in which arbitrary hydrogen is replaced by fluorine. Ring $A^5$, ring $A^6$, $L^1$, $L^2$, o, p and $X^1$ are defined in the same way as described in item When both o and p are 0 in formula (23), synthesis can also be made in accordance with the technique as described below. Phenol derivative (30) is obtained by allowing n-butyllithium or sec-butyllithium to act on benzyl ether derivative (29) in THF at −70° C. or lower, and subsequently allowing trialkyl borate to act thereon, and oxidizing the thus obtained boronic acid ester derivative with peracetic acid or oxidizing a boronic acid ester derivative, obtained by performing acid hydrolysis of the boronic acid ester derivative, with peracetic acid. Then objective phenol derivative (23-3) can be prepared by converting derivative (30) into a phenolate with sodium hydride, and then allowing fluoroalkyl bromide to act thereon to perform etherification, and then subjected to catalytic hydrogen reduction to perform deprotection.

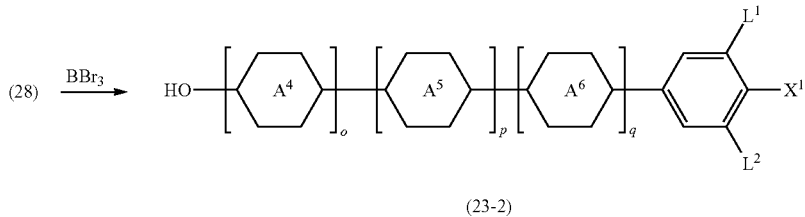

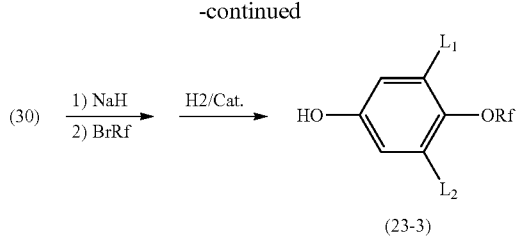

wherein, in the formula, $L^1$ and $L^2$ are defined in the same way as described in item 1 and Rf represents a fluoroalkyl group except a trifluoromethyl group.

EXAMPLES

The invention will be explained below in greater detail. However, the invention is not limited to the Examples. Unless otherwise noted, "%" means "% by weight."

Because a compound obtained was identified on the basis of nuclear magnetic resonance spectra obtained according to $^1$H-NMR analysis, gas chromatograms obtained according to gas chromatography (GC) analysis and so forth, analytical methods will be first explained.

$^1$H-NMR Analysis: As a measuring apparatus, DRX-500 (made by Bruker BioSpin Corporation) was used. A sample produced in Examples and so forth was dissolved in a deuterated solvent such as $CDCl_3$ in which the sample was soluble, and measurements were carried out under the conditions of room temperature, 500 MHz and 24 times of accumulation. In the explanation of the nuclear magnetic resonance spectra obtained, s, d, t, q and m stand for a singlet, a doublet, a triplet, a quartet, and a multiplet, respectively. Tetramethylsilane (TMS) was used as a standard reference material for a zero point of chemical shifts, δ values.

GC Analysis: As a measuring apparatus, GC-14B gas chromatograph made by Shimadzu Corporation was used. As a column, capillary column CBP1-M25-025 (length 25 m, bore 0.22 mm, film thickness 0.25 μm; dimethylpolysiloxane as a stationary liquid phase; non-polar) made by Shimadzu Corporation was used. Helium was used as a carrier gas, and a flow rate was adjusted at 1 milliliter per minute. Temperature in a sample injector was set at 300° C. and temperature of a detector (FID) part was set at 300° C.

A sample was dissolved in toluene and prepared to be a 1% solution, and 1 μl of the solution obtained was injected into the sample injector.

As a recorder, C-R6A Chromatopac made by Shimadzu Corporation or the equivalent thereof was used. In the gas chromatograms obtained, a retention time of a peak corresponding to each of component compounds and values of peak areas are shown.

Incidentally, as a solvent for diluting the sample, chloroform or hexane, for example, may be used. Moreover, as the column, capillary column DB-1 (length 30 m, bore 0.32 mm, film thickness 0.25 μm) made by Agilent Technologies Inc., HP-1 (length 30 m, bore 0.32 mm, film thickness 0.25 μm) made by Agilent Technologies Inc., Rtx-1 (length 30 m, bore 0.32 mm, film thickness 0.25 μm) made by Restek Corporation, BP-1 (length 30 m, bore 0.32 mm, film thickness 0.25 μm) made by SGE International Pty. Ltd., and so forth may be used.

A ratio of the peak areas in the gas chromatograms corresponds to a ratio of the component compounds. In general, weight percent of each of the component compounds in an analytical sample is not completely identical with a percentage of each of the peak areas in the analytical sample. However, because a correction coefficient is essentially 1 (one) when the column described above is used in the invention, the weight percent of each of the component compounds in the analytical sample corresponds virtually to the percentage of each of the peak areas in the analytical sample. The reason is that no significant difference exists among the correction coefficients of the component compounds. An internal standard method by the gas chromatograms is used in order to determine a composition ratio of the compounds in a composition more accurately by the gas chromatograms. Each compound component (test-component) weighed accurately in a fixed amount and a standard compound (standard reference material) are simultaneously measured according to gas chromatography, and the relative intensity of the ratio of the peak areas obtained between the test-component and the standard reference material is calculated in advance. When corrected based on the relative intensity of the peak area of each component relative to the standard reference material, the composition ratio of the compounds in the composition can be determined more accurately according to the gas chromatographic analysis.

[Samples for Determining Physical Property Values of a Compound and so Forth]

A sample for determining physical property values of a liquid crystal compound includes two types of cases: the case where the compound itself is used as the sample, and the case where the compound is mixed with mother liquid crystals to be used as the sample.

In the latter case where the sample prepared by mixing the compound with the mother liquid crystals is used, measurements are carried out according to the method described below. First, the sample is prepared by mixing 15% of the liquid crystal compound obtained and 85% of the mother liquid crystals. Then, according to an extrapolation method based on the equation as shown below, extrapolated values are calculated from measured values of the sample obtained. The extrapolated values are described as the physical property values of the compound.

[Extrapolated value]=(100×[measured value of a sample]−[% of mother liquid crystals]×[measured value of the mother liquid crystals])/[% of the compound].

When a smectic phase or crystals deposited at 25° C. even at the ratio of the compound to the mother liquid crystals, a ratio of the compound to the mother liquid crystals is changed in the order of (10%:90%), (5%:95%) and (1%:99%). The physical property values of the sample are determined at the composition in which the smectic phase or the crystals did not deposit at 25° C. The extrapolated values are determined according to the equation, and described as the physical property values of the compound.

As the mother liquid crystals used for measurements, a variety of types exist. For example, a composition of mother liquid crystals (A) (%) is as described below.

Mother Liquid Crystals (A):

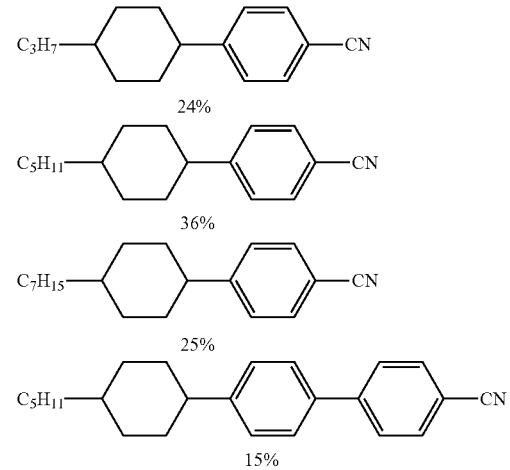

[Methods for Determining Physical Property Values of a Compound and so Forth]

Physical property values were determined according to the methods described below. Most of the measuring methods are described in EIAJ ED-2521A of the Standard of Electronic Industries Association of Japan, or modified thereon. Moreover, no TFT was attached to a TN device used for measurements.

Among measured values, in the case where the compound itself was used as the sample, values obtained were described as experimental data. In the case where a mixture of the compound with the mother liquid crystals was used as the sample, values obtained according to the extrapolation method were described as experimental data.

Phase Structure and Phase Transition Temperature (° C.): Measurements were carried out according to method (1) and method (2) described below.

(1) A compound was placed on a hot plate of a melting point apparatus (FP52 Hot Stage made by Mettler Toledo International Inc.) equipped with a polarizing microscope, and a phase state and the change thereof were observed with the polarizing microscope while heating at a rate of 3° C. per minute, and types of liquid crystal phases were specified.

(2) Temperature was increased and decreased at a rate of 3° C. per minute by using a differential scanning calorimeter, DSC-7 System or Diamond DSC System, made by PerkinElmer, Inc. A starting point (on set) of an endothermic peak or exothermic peak caused by a change in phase of the sample was determined according to extrapolation, and thus a phase transition temperature was finally determined.

Hereinafter, the crystals were expressed as C, and when the crystals were further distinguishable, each of the crystals was expressed as $C_1$ or $C_2$. The smectic phase or nematic phase was expressed as S or N. A liquid (isotropic) was expressed as I. When smectic A phase, smectic B phase, smectic C phase or smectic F phase was distinguishable among the smectic phases, the phases were expressed as $S_A$, $S_B$, $S_C$ or $S_F$, respectively. As an expression of the phase transition temperature, for example, "C 50.0 N 100.0 I" means 50.0° C. in a phase transition temperature from the crystals to the nematic phase (CN), and 100.0° C. in a phase transition temperature from the nematic phase to the liquid (NI). A same rule applied to other expressions.

Maximum Temperature of a Nematic Phase ($T_{NI}$; ° C.): A sample (a mixture of the compound and the mother liquid crystals) was placed on a hot plate of a melting point apparatus (FP52 Hot Stage made by Mettler Toledo International Inc.) equipped with a polarizing microscope, and was observed with the polarizing microscope while heating at a rate of 1° C. per minute. Temperature when a part of the sample changed from the nematic phase to the isotropic liquid was described as a maximum temperature. Hereinafter, the maximum temperature of the nematic phase may simply be abbreviated as "maximum temperature."

Compatibility at a Low Temperature: Samples in which the compound and the mother liquid crystals were mixed for the compound to be 20%, 15%, 10%, 5%, 3% and 1% were prepared, and placed in glass vials. After the glass vials were kept in freezers at −10° C. or −20° C. for a predetermined period of time, whether or not the crystals or the smectic phase deposited was observed.

Viscosity (bulk viscosity; η; measured at 20° C.; mPa·s): The mixture of the compound and the mother liquid crystals was measured with E type viscometer.

Optical Anisotropy (refractive index anisotropy; Δn): Measurements were carried out by means of Abbe refractometer with a polarizing plate mounted on an ocular by using light at a wavelength of 589 nanometers at a temperature of 25° C. A surface of a main prism was rubbed in one direction, and then a sample (a mixture of the compound and the mother liquid crystals) was added dropwise onto the main prism. A refractive index (nil) was measured when the direction of polarized light was parallel to the direction of rubbing. A refractive index (n⊥) was measured when the direction of polarized light was perpendicular to the direction of rubbing. Values of optical anisotropy (Δn) were calculated from an equation:

$$\Delta n = n \| - n \perp.$$

Dielectric Anisotropy (Δε; measured at 25° C.): A sample (a mixture of the compound and the mother liquid crystals) was put in a liquid crystal cell in which a distance (gap) between two glass substrates was about 9 micrometers and a twist angle was 80 degrees. A voltage of 20 V was applied to the cell, and a dielectric constant (ε∥) in the major axis direction of liquid crystal molecules was measured. A voltage of 0.5 V was applied to the cell, and a dielectric constant (ε⊥) in the minor axis direction of the liquid crystal molecules was measured. Values of dielectric anisotropy were calculated from an equation:

$$\Delta \epsilon = \epsilon \| - \epsilon \perp$$

Example 1

Preparation of (E)-4-[3,3-difluoro-3-(3,4,5-trifluorophenoxy)-1-propenyl]-3-fluoro-4'-propylbiphenyl (1-1-2)

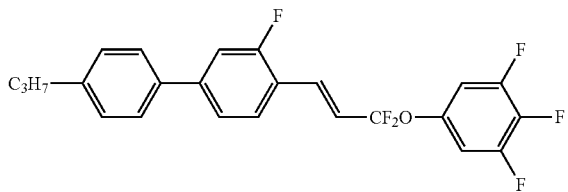

No. 1-1-2

C 47.9 N 64.2 I

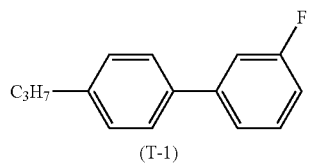

(T-1)

1) sec-BuLi
2) DMF

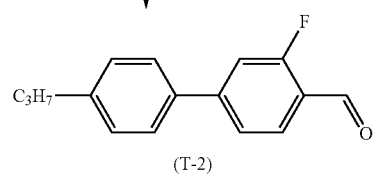

(T-2)

CH₃OCH₂PPh₃Cl
t-BuOK

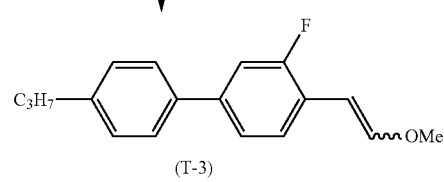

(T-3)

HCOOH

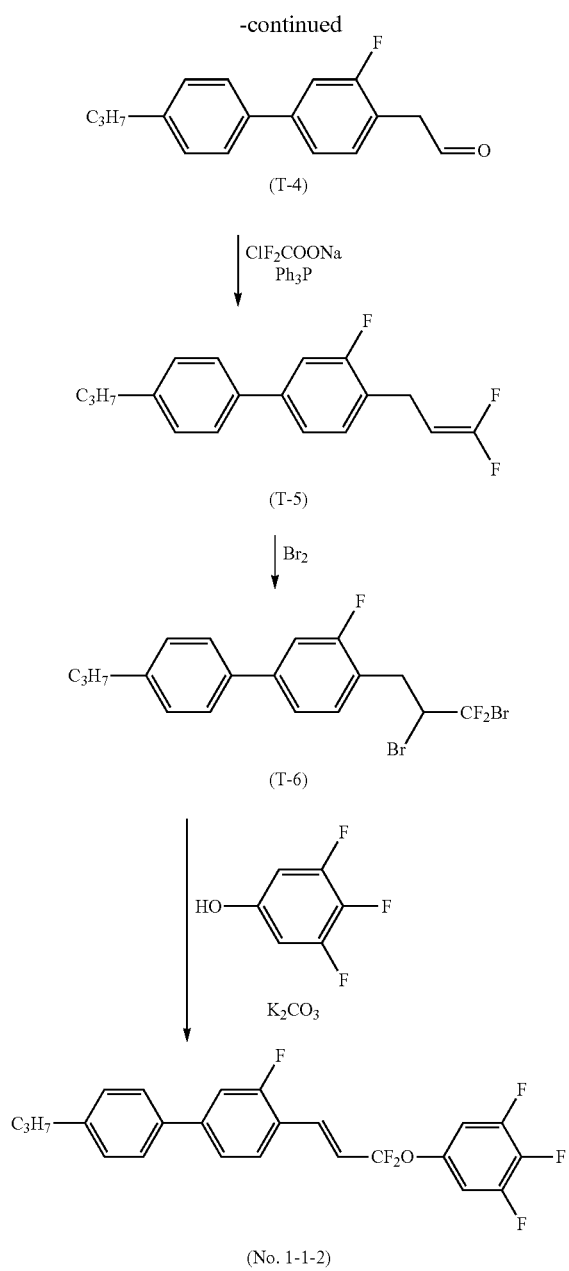

[Preparation of Compound (T-2)]

In a reaction vessel under a nitrogen atmosphere, 27.0 g of 3-fluoro-4'-propylbiphenyl (T-1) and 270 ml of THF were put, and cooled to −74° C. Thereto, 141 ml of cyclohexane and n-hexane solution of 1.07 M sec-butyllithium was added dropwise in a temperature range of −74° C. to −65° C., and stirred for another 120 minutes. Subsequently, 19.5 ml of N,N-dimethylformamide (DMF) was added dropwise in a temperature range of −74° C. to −67° C., and stirred for another 60 minutes. The reaction mixture obtained was returned to 25° C., and then poured into 300 ml of 0.1 N hydrochloric acid solution and mixed. Then 300 ml of toluene was added, and allowed to be separated into an organic layer and an aqueous layer, and extraction was carried out. Then the organic layer obtained was washed successively with water, a saturated aqueous solution of sodium hydrogencarbonate and water, and dried over anhydrous magnesium sulfate. The solution obtained was concentrated under reduced pressure, and the residue was purified by column chromatography (silica gel; heptane/toluene (=1/1 by volume)) to obtain 29.6 g of 3-fluoro-4'-propylbiphenyl-4-carbaldehyde (T-2). The yield based on compound (T-1) was 97%.

[Preparation of Compound (T-3)]

In a reaction vessel under a nitrogen atmosphere, 35.2 g of methoxymethyltriphenylphosphonium chloride and 140 ml of THF were put, and cooled to −30° C. Thereto, 140 ml of a THF solution of 11.1 g of potassium t-butoxide was slowly added and stirred for 30 minutes. Subsequently, 40.0 ml of a THF solution of 20.0 g of compound (T-2) obtained as described above was added dropwise in a temperature range of −30° C. to −25° C., and allowed to react for 3 hours while returning to room temperature. The reaction mixture obtained was returned to 25° C., and then poured into 350 ml of ice water and mixed. Then 350 ml of toluene was added, and allowed to be separated into an organic layer and an aqueous layer, and extraction was carried out. Then the organic layer obtained was washed successively with water, 1 N hydrochloric acid solution, a saturated aqueous solution of sodium hydrogencarbonate and water, and dried over anhydrous magnesium sulfate. The solution obtained was concentrated under reduced pressure, and the residue was purified by column chromatography (silica gel; heptane/ethyl acetate (=10/1 by volume)) to obtain 20.9 g of 3-fluoro-4-(2-methoxyvinyl)-4'-propylbiphenyl T-3). The yield based on compound (T-2) was 94%.

[Preparation of Compound (T-4)]

In a reaction vessel under a nitrogen atmosphere, 20.9 g of compound (T-3) obtained as described above, 100 ml of formic acid and 100 ml of toluene were put, and stirred for 3 hours under heated reflux. The reaction mixture obtained was returned to 25° C., and then poured into 100 ml of ice water and mixed. Then 200 ml of toluene was added, and allowed to be separated into an organic layer and an aqueous layer, and extraction was carried out. Then the organic layer obtained was washed successively with water, a saturated aqueous solution of sodium hydrogencarbonate and water, and dried over anhydrous magnesium sulfate. The solution obtained was concentrated under reduced pressure, and the residue was purified by column chromatography (silica gel; toluene). The residue was further purified by recrystallization from heptane to obtain 15.4 g of 2-(3-fluoro-4'-propylbiphenyl-4-yl)acetaldehyde (T-4). The yield based on compound (T-3) was 78%.

[Preparation of Compound (T-5)]

In a reaction vessel under a nitrogen atmosphere, 15.4 g of compound (T-4) obtained as described above, 15.4 g of triphenyl phosphine and 100 ml of DMF were put, and heated to 90° C. Thereto, 130 ml of a DMF solution of 18.3 g of sodium chlorodifluoroacetate was slowly added, heated to 115° C., and stirred for another 60 minutes. The reaction mixture obtained was returned to 25° C., and then poured into 250 ml of ice water and mixed. Then 250 ml of toluene was added, and allowed to be separated into an organic layer and an aqueous layer, and extraction was carried out. Then the organic layer obtained was washed successively with water, 1N hydrochloric acid solution, a saturated aqueous solution of sodium hydrogencarbonate and water, and dried over anhydrous magnesium sulfate. The solution obtained was concentrated under reduced pressure, and the residue was purified by column chromatography (silica gel; heptane) to obtain 7.66 g of 4-(3,3-difluoroallyl)-3-fluoro-4'-propylbiphenyl (T-5). The yield based on compound (T-4) was 44%.

[Preparation of Compound (T-6)]

In a reaction vessel under a nitrogen atmosphere, 3.78 g of compound (T-5) obtained as described above and 30.0 ml of chloroform were put, and cooled to −10° C. Thereto, 10.0 ml of a chloroform solution of 2.70 g of bromine was added dropwise slowly, and stirred for another 180 minutes. The reaction mixture obtained was washed successively with water, a saturated aqueous solution of sodium thiosulfate and water, and dried over anhydrous magnesium sulfate. The solution obtained was concentrated under reduced pressure and the residue was purified by column chromatography (silica gel; heptane) to obtain 4.96 g of 4-(2,3-dibromo-3,3-difluoropropyl)-3-fluoro-4'-propylbiphenyl (T-6). The yield based on compound (T-5) was 85%.

[Preparation of Compound (1-1-2)]

In a reaction vessel under a nitrogen atmosphere, 1.71 g of 3,4,5-trifluorophenol, 4.57 g of potassium carbonate and 60.0 ml of DMF were put, and stirred at 90° C. for 30 minutes. Subsequently, 40.0 ml of a DMF solution of 4.96 g of compound (T-6) obtained as described above was added dropwise thereto, and stirred at 90° C. for 2 hours. The reaction mixture obtained was returned to 25° C., and then poured into 100 ml of ice water and mixed. Then 100 ml of toluene was added, and allowed to be separated into an organic layer and an aqueous layer, and extraction was carried out. Then the organic layer obtained was washed successively with water, a saturated aqueous solution of sodium hydrogencarbonate and water, and dried over anhydrous magnesium sulfate. The solution obtained was concentrated under reduced pressure, and the residue was purified by column chromatography (silica gel; heptane). The residue was further purified by recrystallization from a mixed solvent of heptane/Solmix A-11 (=½ by volume) to obtain 2.15 g of (E)-4-[3,3-difluoro-3-(3,4,5-trifluorophenoxy)-1-propenyl]-3-fluoro-4'-propylbiphenyl (1-1-2). The yield based on compound (T-6) was 45%.

A chemical shift in $^1$H-NMR analysis was as described below, and the compound obtained could be identified as (E)-4-[3,3-difluoro-3-(3,4,5-trifluorophenoxy)-1-propenyl]-3-fluoro-4'-propylbiphenyl.

Chemical shift δ (ppm; CDCl$_3$): 7.57-7.49 (m, 3H), 7.41 (dd, J=8.10 Hz, J=1.60 Hz, 1H), 7.38-7.25 (m, 4H), 6.98-6.91 (m, 2H), 6.43 (dt, J=16.3 Hz, J=6.85 Hz, 1H), 2.64 (t, J=7.45 Hz, 2H), 1.74-1.63 (m, 2H), 0.97 (t, 7.45 Hz, 3H).

A phase transition temperature of compound (1-1-2) obtained was as described below.

Phase transition temperature: C 47.9 N 64.2 I.

Example 2

Physical Properties of Compound (1-1-2)

The physical properties of mother liquid crystals A mentioned above were as described below.

Maximum temperature (T$_{NI}$)=71.7° C.; optical anisotropy (Δn)=0.137; dielectric anisotropy (Δε)=11.0.

Composition B including 85% of mother liquid crystals A and 15% of (E)-4-[3,3-difluoro-3-(3,4,5-trifluorophenoxy)-1-propenyl]-3-fluoro-4'-propylbiphenyl (1-1-2) obtained in Example 1 was prepared. Physical properties of composition B obtained were measured and physical property values of compound (1-1-2) were calculated by extrapolating the measured values. The results were as described below.

Maximum temperature (T$_{NI}$)=57.0° C.; optical anisotropy (Δn)=0.184; dielectric anisotropy (Δε)=25.0.

The findings show that compound (1-1-2) has a large optical anisotropy and a large dielectric anisotropy.

Example 3

Preparation of (E)-4-[3,3-difluoro-3-(3,4,5-trifluorophenoxy)-1-propenyl]-4"-propyl-2'3,5-trifluoro-1,1',4',1"-terphenyl (1-2-5)

No. 1-2-5

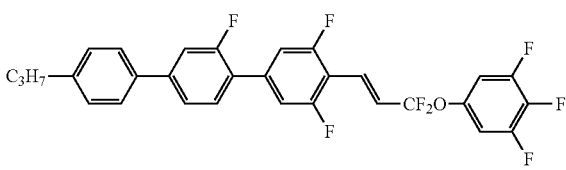

C 70.8 SC 83.0 SA 125 N 198 I

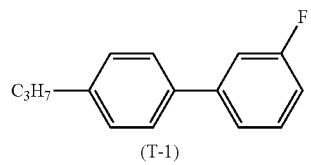

(T-1)

1) sec-BuLi
2) I$_2$

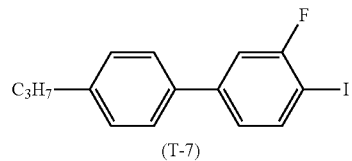

(T-7)

Pd/C(NX)
K$_2$CO$_3$

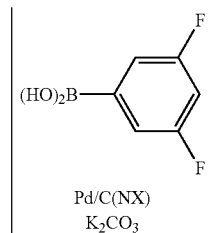

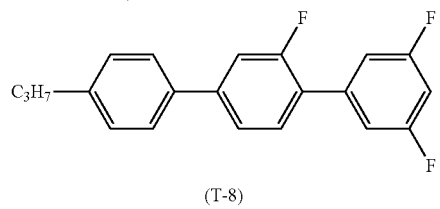

(T-8)

1) n-BuLi
2) DMF

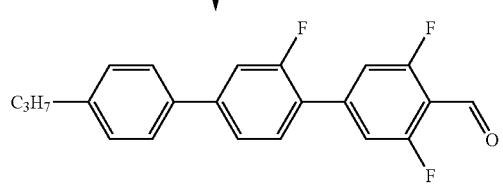

(T-9)

CH$_3$OCH$_2$PPh$_3$Cl
t-BuOK

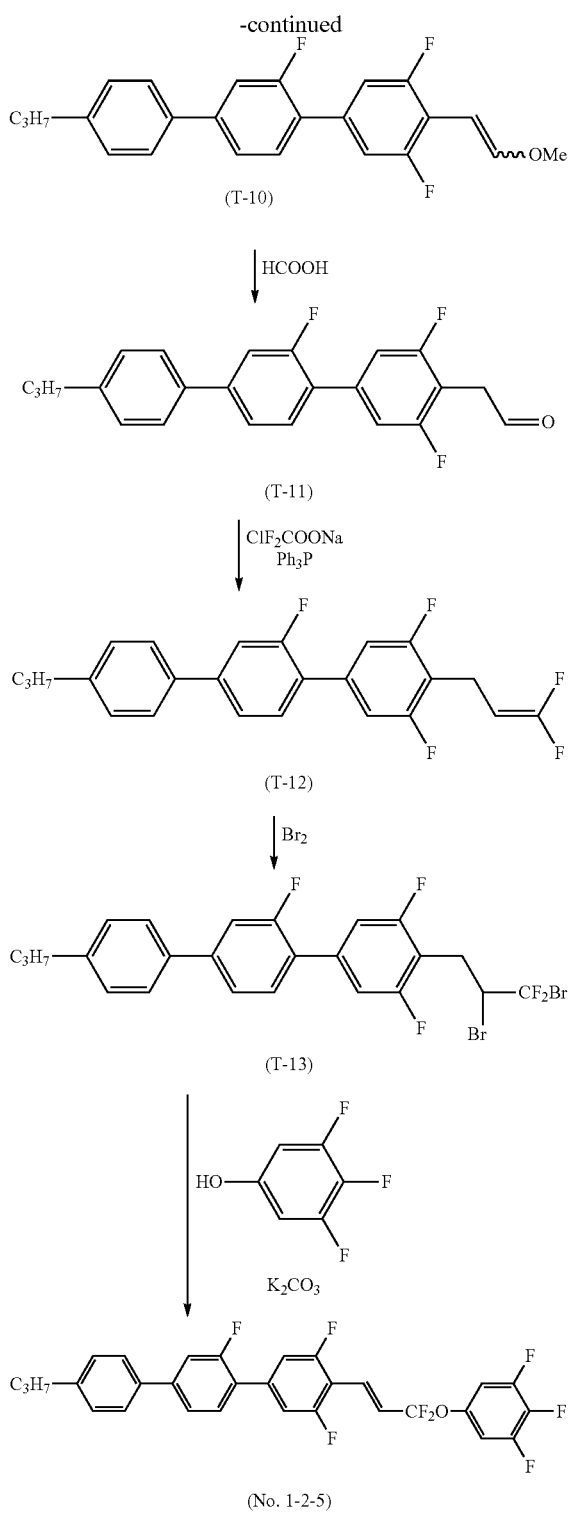

[Preparation of Compound (T-7)]

In a reaction vessel under a nitrogen atmosphere, 11.1 g of compound (T-1) and 160 ml of THF were put, and cooled to −74° C. Thereto, 61.0 ml of cyclohexane and n-hexane solution of 1.01M sec-butyllithium was added dropwise in a temperature range of −74° C. to −65° C., and stirred for another 180 minutes. Subsequently, 170 ml of a THF solution of 16.9 g of iodine was added dropwise in a temperature range of −75° C. to −68° C., and stirred for another 60 minutes. The reaction mixture obtained was returned to 25° C., and then poured into 350 ml of ice water and mixed. Then 350 ml of toluene was added, and allowed to be separated into an organic layer and an aqueous layer, and extraction was carried out. Then the organic layer was washed successively with an aqueous solution of sodium thiosulfate and water, and dried over anhydrous magnesium sulfate. The solution obtained was concentrated under reduced pressure, and the residue was purified by column chromatography (silica gel; heptane). The residue was further purified by recrystallization from Solmix A-11 to obtain 12.7 g of 3-fluoro-4-iodo-4'-propylbiphenyl (T-7). The yield based on compound (T-1) was 73%.

[Preparation of Compound (T-8)]

In a reaction vessel under a nitrogen atmosphere, 12.7 g of compound (T-7) obtained as described above, 6.49 g of 3,5-difluorophenylboronic acid, 15.5 g of potassium carbonate, 0.0794 g of Pd/C (NX type), 65.0 ml of toluene, 65.0 ml of Solmix A-11 and 65.0 ml of water were put, heated and refluxed for 3 hours. The reaction mixture obtained was cooled to 25° C., and then poured into 200 ml of water and mixed. Then 200 ml of toluene was added, and allowed to be separated into an organic layer and an aqueous layer, and extraction was carried out. Then the organic layer was washed with water, and dried over anhydrous magnesium sulfate. The solution obtained was concentrated under reduced pressure, and the residue was purified by column chromatography (silica gel; heptane). The residue was further purified by recrystallization from Solmix A-11 to obtain 10.6 g of 4"-propyl-2',3,5-trifluoro-1,1',4',1"-terphenyl (T-8). The yield based on compound (T-7) was 86%.

[Preparation of Compound (T-9)]

In a reaction vessel under a nitrogen atmosphere, 10.0 g of compound (T-8) obtained as described above and 200 ml of THF were put, and cooled to −74° C. Thereto, 20.3 ml of a n-hexane solution of 1.66M n-butyllithium was added dropwise in a temperature range of −74° C. to −65° C., and stirred for another 60 minutes. Subsequently, 10.0 ml of a THF solution of 4.70 ml of DMF was added dropwise in a temperature range of −74° C. to −67° C., and stirred for another 60 minutes. The reaction mixture obtained was returned to 25° C., and then poured into 200 ml of solution of 0.1 N hydrochloric acid and mixed. Then 200 ml of toluene was added, and allowed to be separated into an organic layer and an aqueous layer, and extraction was carried out. The organic layer obtained was washed with water, a saturated aqueous solution of sodium hydrogencarbonate and water, and dried over anhydrous magnesium sulfate. The solution obtained was concentrated under reduced pressure, and the residue was purified by column chromatography (silica gel; toluene). The residue was further purified by recrystallization from a mixed solvent of heptane/toluene (=2/1 by volume) to obtain 8.06 g of 4"-propyl-2',3,5-trifluoro-1,1',4',1"-terphenyl-4-carbaldehyde (T-9). The yield based on compound (T-8) was 75%.

[Preparation of Compound (T-10)]

As a raw material, 8.06 g of compound (T-9) obtained as described above was used, and 8.48 g of 4-(2-methoxyvinyl)-4"-propyl-2',3,5-trifluoro-1,1',4',1"-ter phenyl (T-10) was obtained in a manner similar to preparation of compound (T-3) of Example 1. The yield based on compound (T-9) was 98%.

[Preparation of Compound (T-11)]

As a raw material, 8.48 g of compound (T-10) obtained as described above was used, and 6.94 g of 2-(4"-propyl-2',3,5-trifluoro-1,1',4',1"-terphenyl-4-yl)acetaldehyde (T-11) was obtained in a manner similar to preparation of compound (T-4) of Example 1. The yield based on compound (T-10) was 85%.

[Preparation of Compound (T-12)]

As a raw material, 6.94 g of compound (T-11) obtained as described above was used, and 4.27 g of 4-(3,3-difluoroallyl)-4″-propyl-2′,3,5-trifluoro-1,1′,4′,1″-terphenyl (T-12) was obtained in a manner similar to preparation of compound (T-5) of Example 1. The yield based on compound (T-11) was 56%.

[Preparation of Compound (T-13)]

As a raw material, 4.00 g of compound (T-12) obtained as described above was used, and 1.43 g of 4-(2,3-dibromo-3,3-difluoropropyl)-4″-propyl-2′,3,5-trifluoro-1,1′,4′,1″-terphenyl (T-13) was obtained in a manner similar to preparation of compound (T-6) of Example 1. The yield based on compound (T-12) was 26%.

[Preparation of Compound (1-2-5)]

As a raw material, 1.43 g of compound (T-13) obtained as described above was used, and 0.853 g of (E)-4-[3,3-difluoro-3-(3,4,5-trifluorophenoxy)-1-propenyl]-4″-propyl-2′,3,5-trifluoro-1,1′,4′,1″-terphenyl (1-2-5) was obtained in a manner similar to preparation of compound (1-1-2) of Example 1. The yield based on compound (T-13) was 59%.

A chemical shift in $^1$H-NMR analysis was as described below, and the compound obtained could be identified as (E)-4-[3,3-difluoro-3-(3,4,5-trifluorophenoxy)-1-propenyl]-4″-propyl-2′,3,5-trifluoro-1,1′,4′,1″-terphenyl.

Chemical shift δ (ppm; $CDCl_3$): 7.58-7.39 (m, 5H), 7.32-7.21 (m, 5H), 6.99-6.92 (m, 2H), 6.69 (dt, J=16.5 Hz, J=6.85 Hz, 1H), 2.65 (t, J=7.45 Hz, 2H), 1.74-1.64 (m, 2H), 0.98 (t, 7.35 Hz, 3H).

A phase transition temperature of compound (1-2-5) obtained was as described below.

Phase transition temperature: C 70.8 $S_c$ 83.0 $S_A$ 125 N 198 I.

Example 4

Physical Properties of Compound (1-2-5)

Composition C including 85% of mother liquid crystals A and 15% of (E)-4-[3,3-difluoro-3-(3,4,5-trifluorophenoxy)-1-propenyl]-4″-propyl-2′,3,5-trifluoro-1,1′,4′,1″-terphenyl (1-2-5) obtained in Example 3 was prepared. Physical properties of composition C obtained were measured and physical property values of compound (1-2-5) were calculated by extrapolating the measured values. The results were as described below.

Maximum temperature $(T_{NI})$=136° C.; optical anisotropy (Δn)=0.264; dielectric anisotropy (Δε)=40.8.

The findings show that compound (1-2-5) has a wide temperature range of a liquid crystal phase, in particular, a high maximum temperature $(T_{NI})$, a large optical anisotropy and a very large dielectric anisotropy.

Example 5

Preparation of (E)-4-[3,3-difluoro-3-(3,4,5-trifluorophenoxy)-1-propenyl]-4‴-pentyl-2′,2″,3,5-tetrafluoro-1,1′,4′,1″,4″,1‴-quarterphenyl (1-5-1)

No. 1-5-1

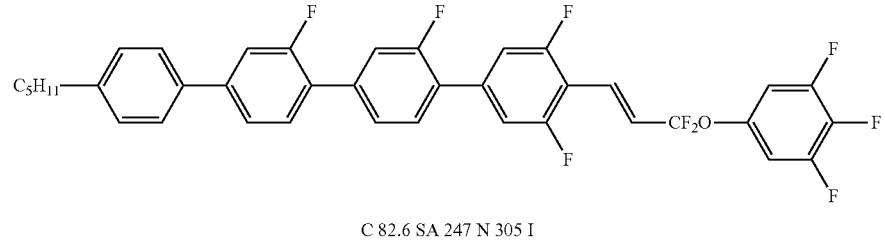

C 82.6 SA 247 N 305 I

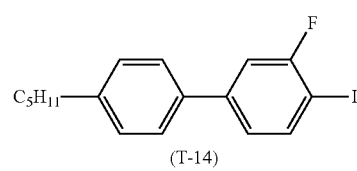

(T-14)

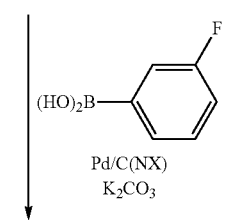

Pd/C(NX)
$K_2CO_3$

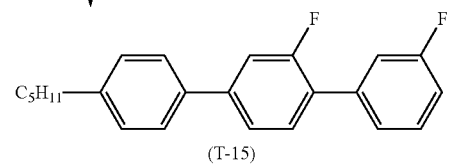

(T-15)

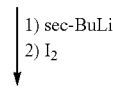

1) sec-BuLi
2) $I_2$

-continued
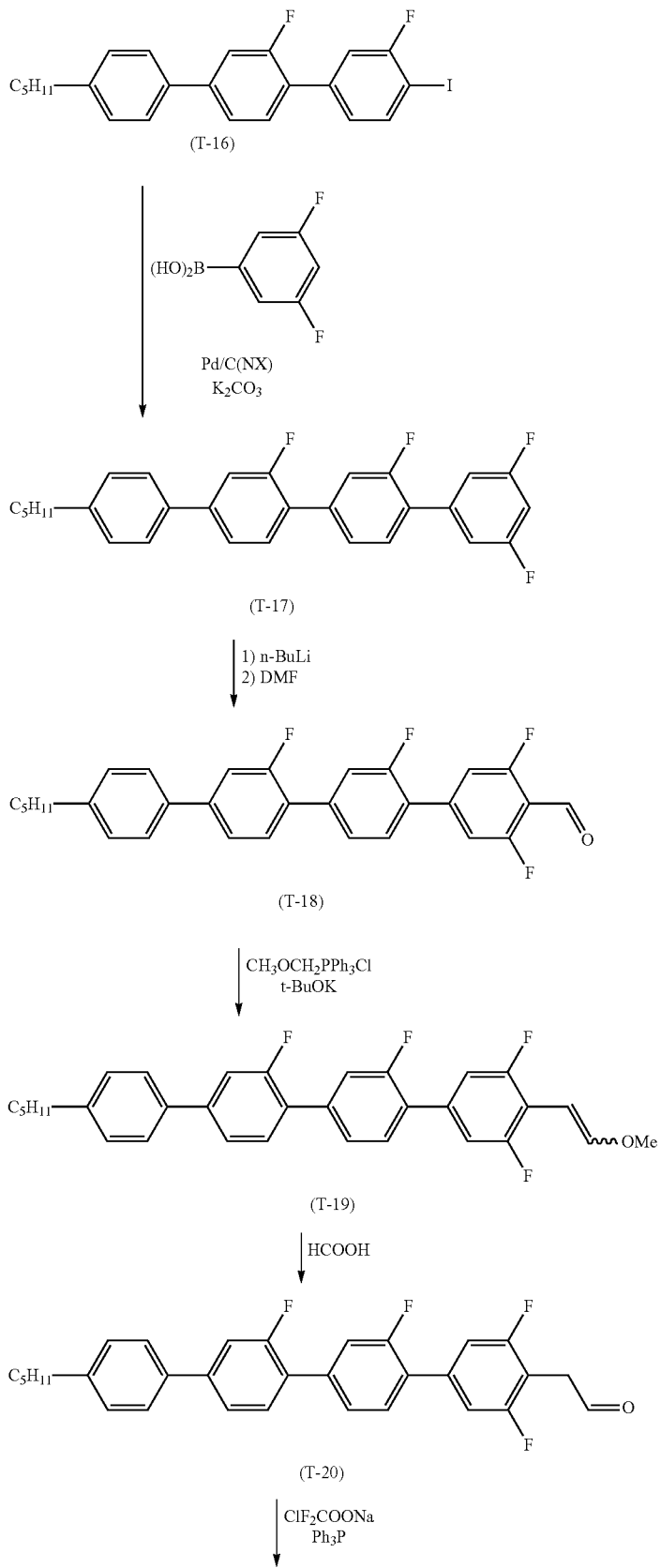

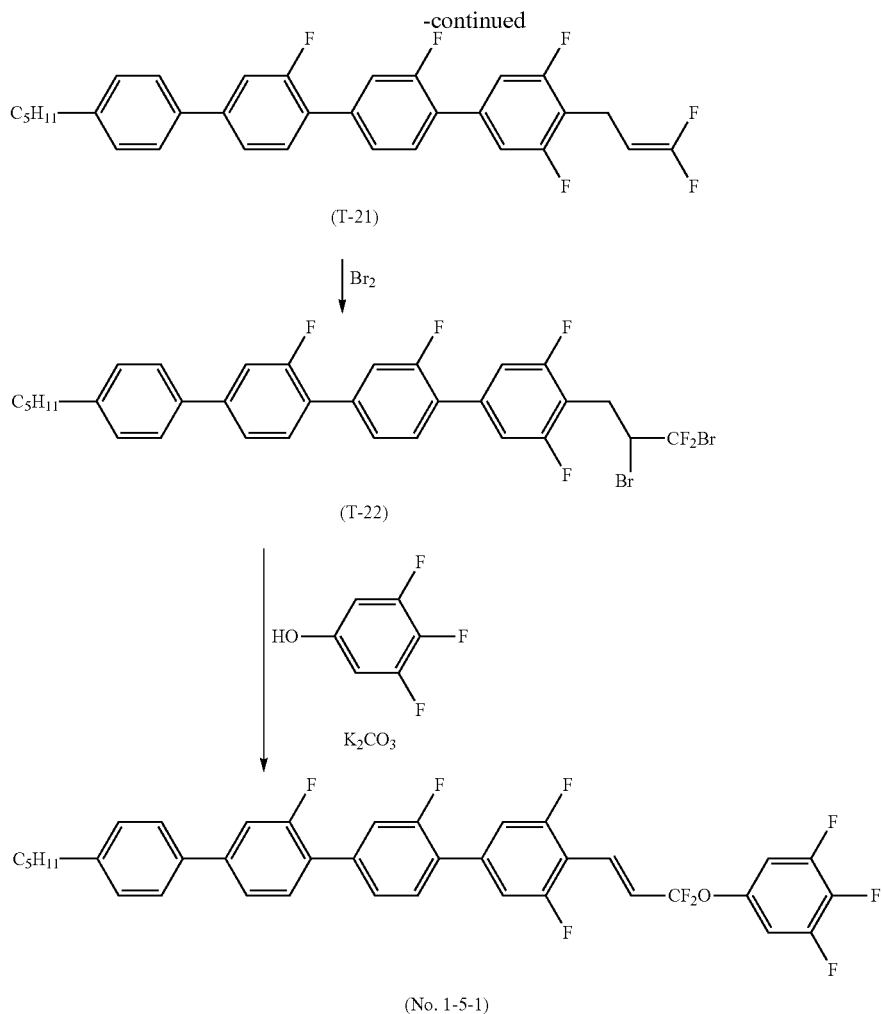

[Preparation of Compound (T-15)]

In a reaction vessel under a nitrogen atmosphere, 45.0 g of 3-fluoro-4-iodo-4'-pentylbiphenyl (T-14), 20.5 g of 3-fluorophenylboronic acid, 50.6 g of potassium carbonate, 0.260 g of Pd/C (NX type), 150 ml of toluene, 150 ml of Solmix A-11 and 150 ml of water were put, heated and refluxed for 3 hours. The reaction mixture obtained was cooled to 25° C., and then poured into 400 ml of water and mixed. Then 400 ml of toluene was added, and allowed to be separated into an organic layer and an aqueous layer, and extraction was carried out. Then the organic layer was washed with water, and dried over anhydrous magnesium sulfate. The solution obtained was concentrated under reduced pressure, and the residue was purified by column chromatography (silica gel; heptane). The residue was further purified by recrystallization from Solmix A-11 to obtain 32.4 g of 2',3-difluoro-4"-pentyl-1,1',4',1"-terphenyl (T-15). The yield based on compound (T-14) was 79%.

[Preparation of Compound (T-16)]

As a raw material, 25.0 g of compound (T-15) obtained as described above was used, and 33.7 g of 2',3-difluoro-4-iodo-1,1',4',1"-terphenyl (T-16) was obtained in a manner similar to preparation of compound (T-7) of Example 3. The yield based on compound (T-15) was 98%.

[Preparation of Compound (T-17)]

As a raw material, 25.0 g of compound (T-16) obtained as described above was used, and 16.3 g of 4'''-pentyl-2',2",3,5-tetrafluoro-1,1',4',1",4",1'''-quarter phenyl (T-17) was obtained in a manner similar to preparation of compound (T-8) of Example 3. The yield based on compound (T-16) was 67%.

[Preparation of Compound (T-18)]

As a raw material, 16.3 g of compound (T-17) obtained as described above was used, and 15.8 g of 4'''-pentyl-2',2",3,5-tetrafluoro-1,1',4',1",4",1'''-quarter phenyl-4-carbaldehyde (T-18) was obtained in a manner similar to preparation of compound (T-9) of Example 3. The yield based on compound (T-17) was 91%.

[Preparation of Compound (T-19)]

As a raw material, 10.0 g of compound (T-18) obtained as described above was used, and 10.2 g of 4-(2-methoxyvinyl)-4'''-pentyl-2',2",3,5-tetrafluoro-1,1',4',1",4",1'''-quarterphenyl (T-19) was obtained in a manner similar to preparation of compound (T-3) of Example 1. The yield based on compound (T-18) was 96%.

[Preparation of Compound (T-20)]

As a raw material, 10.2 g of compound (T-19) obtained as described above was used, and 8.89 g of 2-(4'''-pentyl-2',2",3,5-tetrafluoro-1,1',4',1",4",1'''-guar terphenyl-4-yl)acetaldehyde (T-20) was obtained in a manner similar to preparation of compound (T-4) of Example 1. The yield based on compound (T-19) was 90%.

[Preparation of Compound (T-21)]

As a raw material, 8.89 g of compound (T-20) obtained as described above was used, and 6.05 g of 4-(3,3-difluoroallyl)-4'''-pentyl-2',2'',3,5-tetrafluoro-1,1',4',1'',4'',1'''-quarterphenyl (T-21) was obtained in a manner similar to preparation of compound (T-5) of Example 1. The yield based on compound (T-20) was 64%.

[Preparation of Compound (T-22)]

As a raw material, 5.00 g of compound (T-21) obtained as described above was used, and 5.80 g of 4-(2,3-dibromo-3,3-difluoropropyl)-4'''-pentyl-2',2'',3,5-tetrafluoro-1,1',4',1'',4'',1'''-quarterphenyl (T-22) was obtained in a manner similar to preparation of compound (T-6) of Example 1. The yield based on compound (T-21) was 89%.

[Preparation of Compound (1-5-1)]

As a raw material, 5.80 g of compound (T-22) obtained as described above was used, and 1.35 g of (E)-4-[3,3-difluoro-3-(3,4,5-trifluorophenoxy)-1-propenyl]-4'''-pentyl-2',2'',3,5-tetrafluoro-1,1',4',1'',4'',1'''-quarterphenyl (1-5-1) was obtained in a manner similar to preparation of compound (1-1-2) of Example 1. The yield based on compound (T-22) was 24%.

A chemical shift in $^1$H-NMR analysis was as described below, and the compound obtained could be identified as (E)-4-[3,3-difluoro-3-(3,4,5-trifluorophenoxy)-1-propenyl]-4'''-pentyl-2',2'',3,5-tetrafluoro-1,1',4',1'',4'',1'''-quarterphenyl.

Chemical shift δ (ppm; CDCl$_3$): 7.60-7.40 (m, 8H), 7.34-7.23 (m, 5H), 7.00-6.93 (m, 2H), 6.70 (dt, J=16.5 Hz, J=6.85 Hz, 1H), 2.67 (t, J=7.75 Hz, 2H), 1.72-1.62 (m, 2H), 1.42-1.29 (m, 4H), 0.92 (t, 6.90 Hz, 3H).

A phase transition temperature of compound (1-5-1) obtained was as described below.

Phase transition temperature: C 82.6 S$_A$ 247 N 305 I.

Example 6

Physical Properties of Compound (1-5-1)

Composition D including 90% of mother liquid crystals A and 10% of (E)-4-[3,3-difluoro-3-(3,4,5-trifluorophenoxy)-1-propenyl]-4'''-pentyl-2',2'',3,5-tetrafluoro-1,1',4',1'',4'',1'''-quarterphenyl (1-5-1) obtained in Example 5 was prepared. Physical properties of composition D obtained were measured and physical property values of compound (1-5-1) were calculated by extrapolating the measured values. The results were as described below.

Maximum temperature (T$_{NI}$)=194° C.; optical anisotropy (Δn)=0.307; dielectric anisotropy (Δε)=26.6.

The findings show that compound (1-5-1) has a wide temperature range of a liquid crystal phase, in particular, a very high maximum temperature (T$_{NI}$), a very large optical anisotropy and a large dielectric anisotropy.

Example 7

On the basis of synthesis methods as described in Examples 1, 3 and 5, and also herein, compound (1-1-1) to compound (1-1-14), compound (1-2-1) to compound (1-2-28), compound (1-3-1) to compound (1-3-28), compound (1-4-1) to compound (1-4-42) and compound (1-5-1) to compound (1-5-42) can be prepared. Data appended represent values determined in accordance with the technique mentioned above. Maximum temperature (T$_{NI}$), dielectric anisotropy (Δε) and optical anisotropy (Δn) are physical property values calculated from measured values of the sample obtained by mixing the compound with mother liquid crystals A as described in Examples 2, 4 and 6 according to the extrapolation method.

| No. | |
|---|---|
| 1-1-1 | 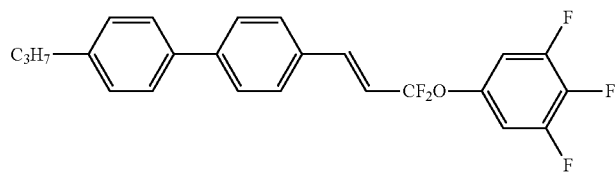 |
| 1-1-2 | 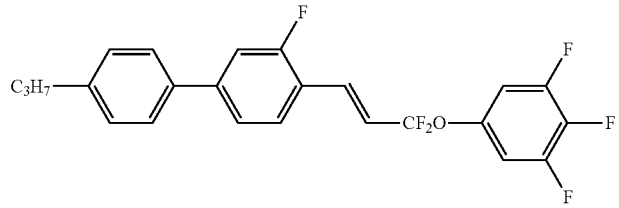 T$_{NI}$ = 57.0° C., Δn = 0.184, Δε = 25.0 |
| 1-1-3 | 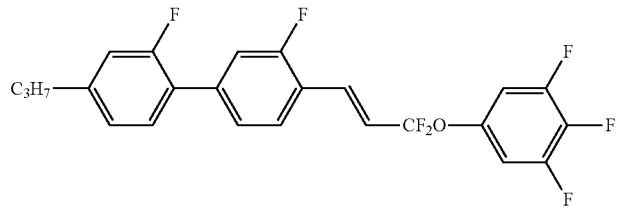 |

| No. | |
|---|---|
| 1-1-4 | 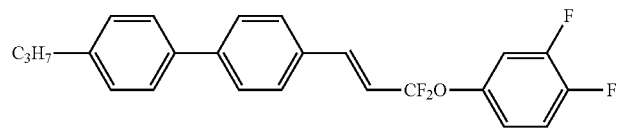 |
| 1-1-5 | 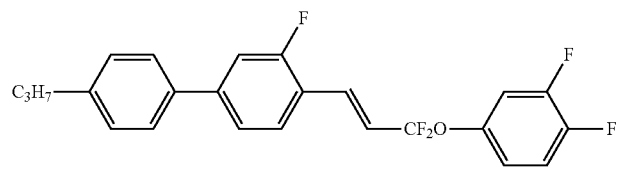 |
| 1-1-6 | 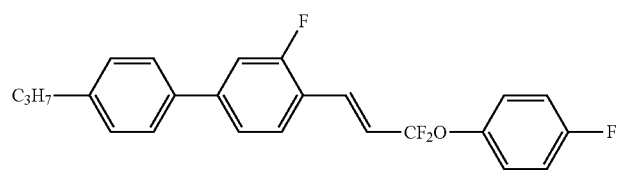 |
| 1-1-7 | 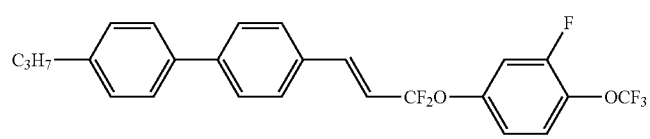 |
| 1-1-8 | 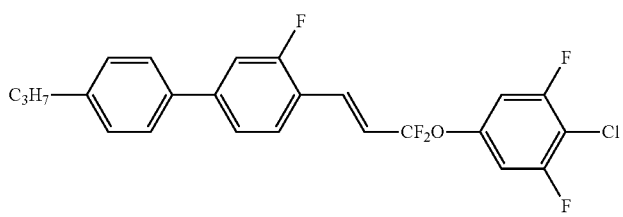 |
| 1-1-9 | 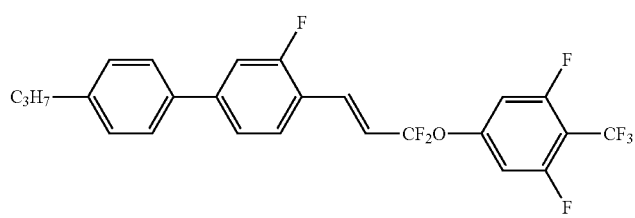 |
| 1-1-10 | 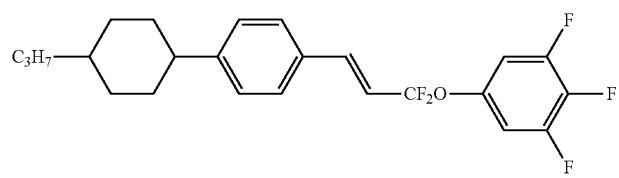 |
| 1-1-11 | 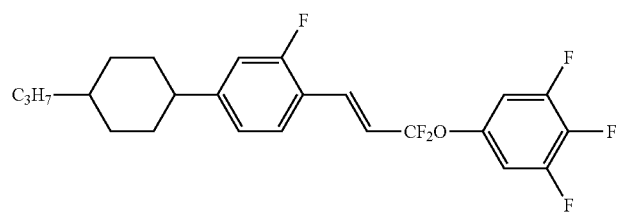 |

-continued
| No. | |
|---|---|
| 1-1-12 | 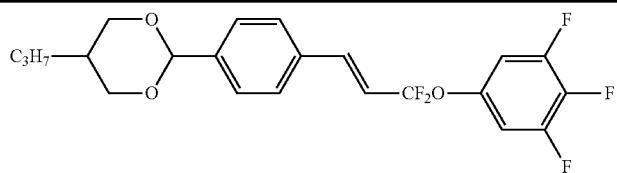 |
| 1-1-13 | 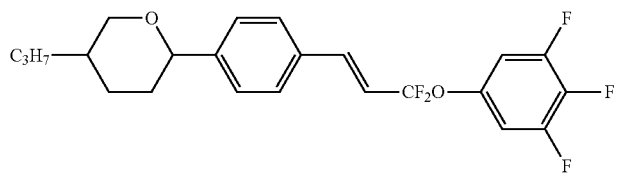 |
| 1-1-14 | 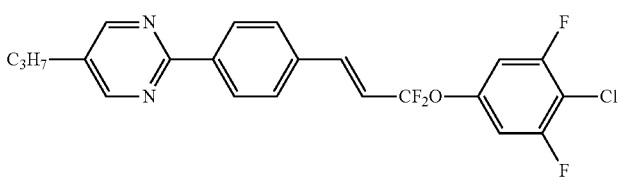 |
| 1-2-1 | 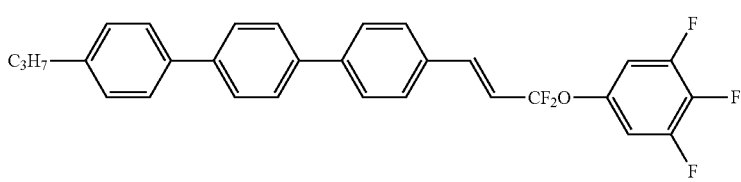 |
| 1-2-2 | 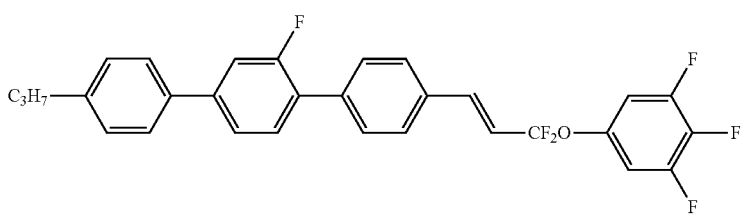 |
| 1-2-3 | 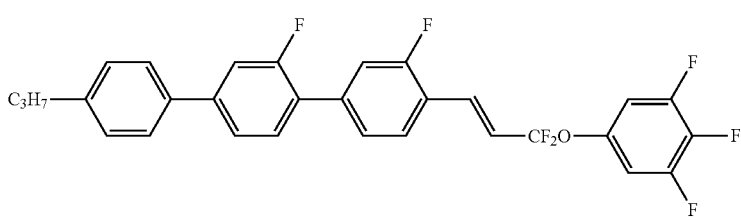 |
| 1-2-4 | 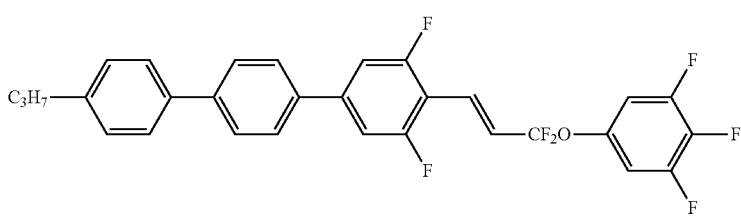 |
| 1-2-5 | 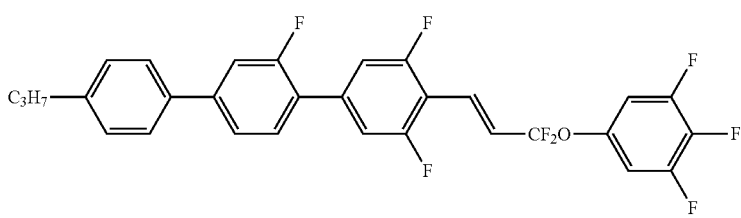 |
$T_{NI} = 136°$ C., $\Delta n = 0.264$, $\Delta \epsilon = 40.8$ -continued
| No. |
|---|
| 1-2-6 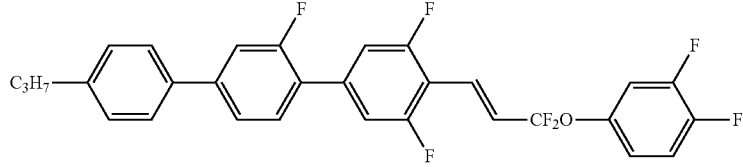 |
| 1-2-7 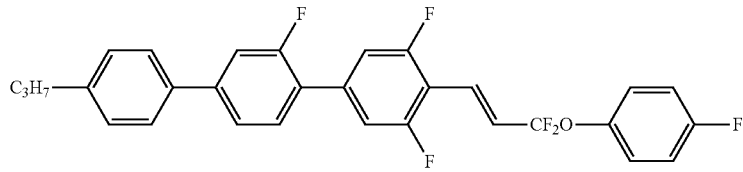 |
| 1-2-8 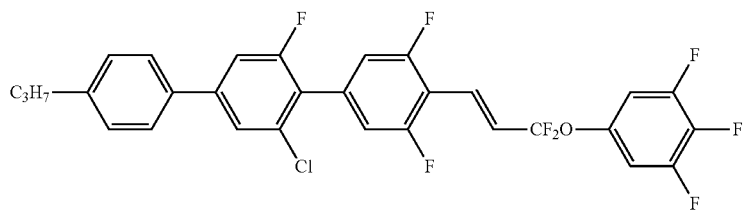 |
| 1-2-9 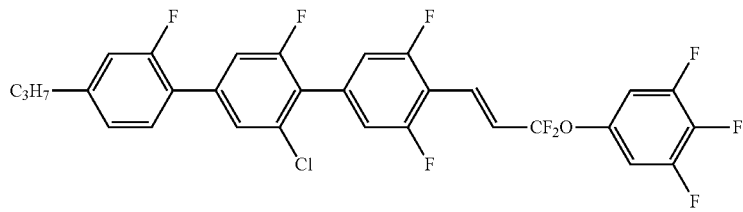 |
| 1-2-10 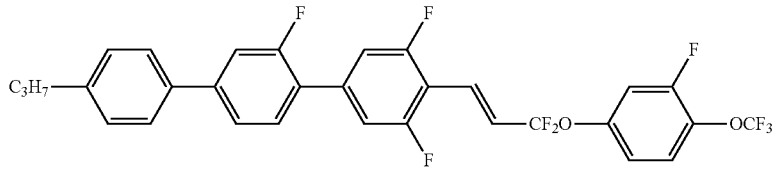 |
| 1-2-11 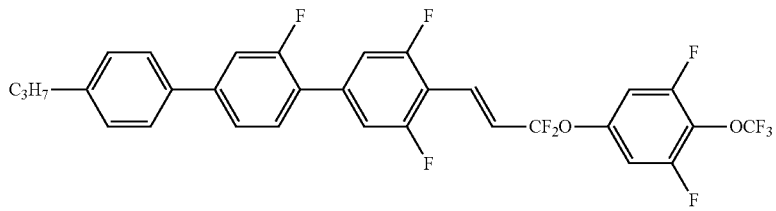 |
| 1-2-12 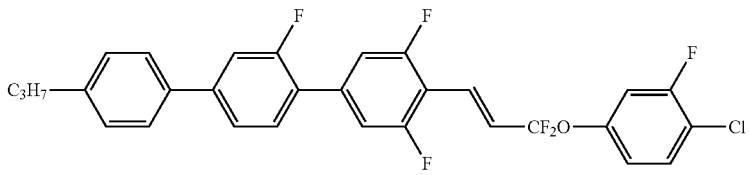 |
| 1-2-13 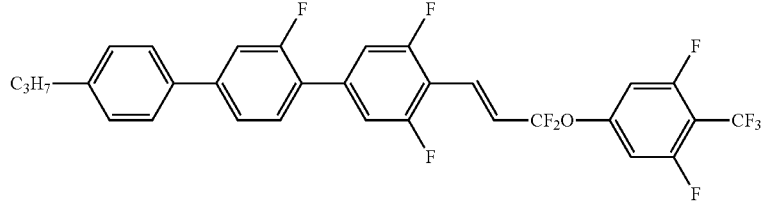 |

| No. | |
|---|---|
| 1-2-14 | 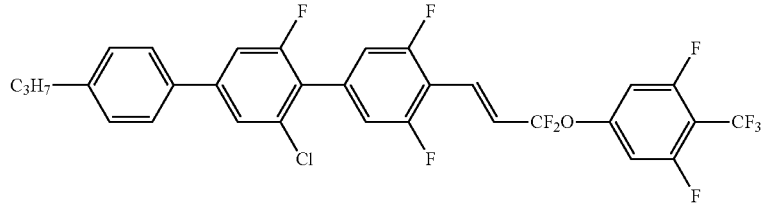 |
| 1-2-15 | 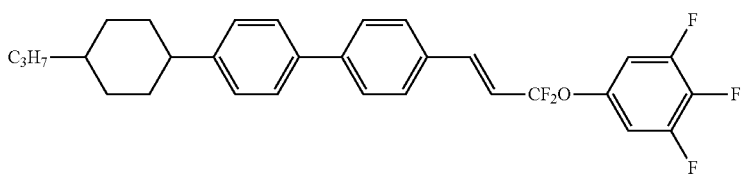 |
| 1-2-16 | 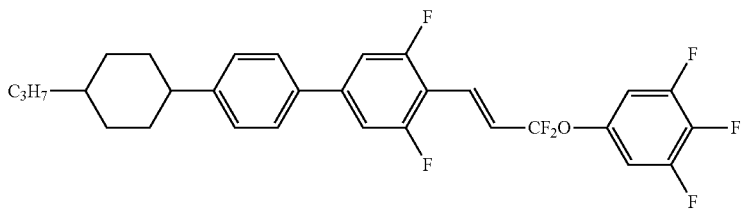 |
| 1-2-17 | 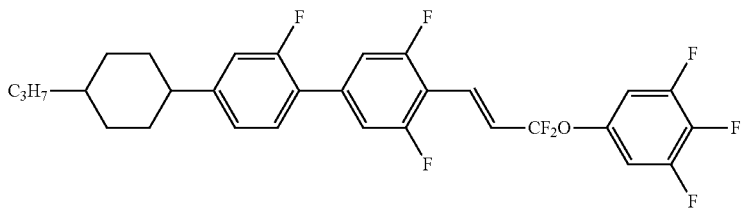 |
| 1-2-18 | 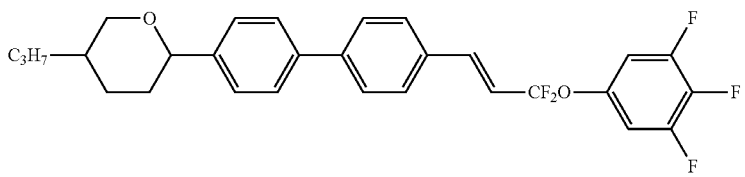 |
| 1-2-19 | 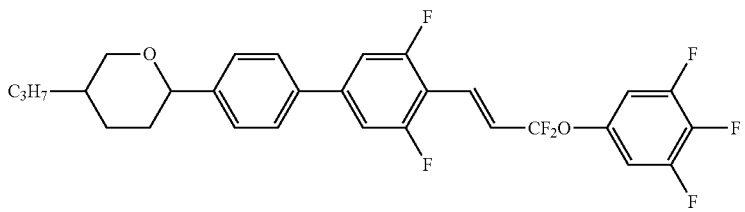 |
| 1-2-20 | 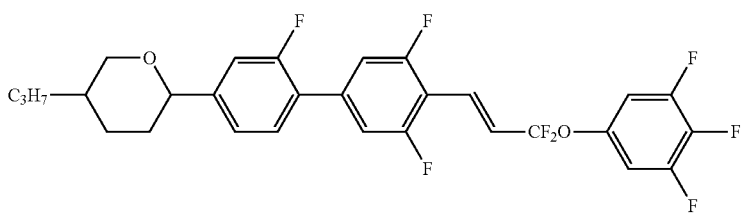 |

| No. | |
|---|---|
| 1-2-21 | 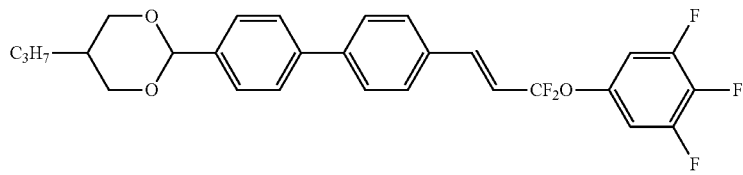 |
| 1-2-22 | 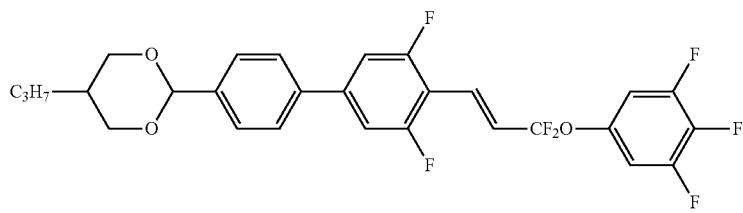 |
| 1-2-23 | 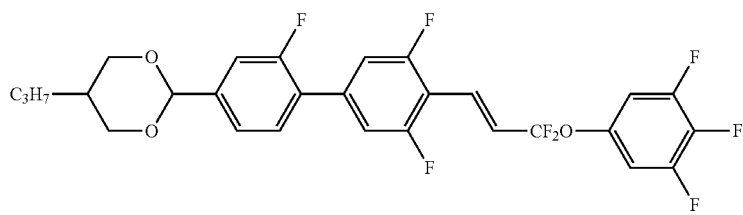 |
| 1-2-24 | 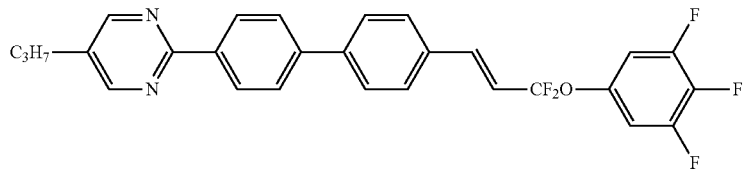 |
| 1-2-25 | 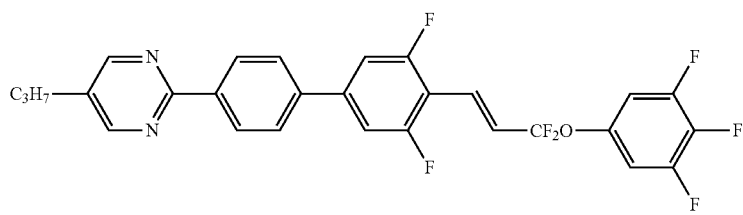 |
| 1-2-26 | 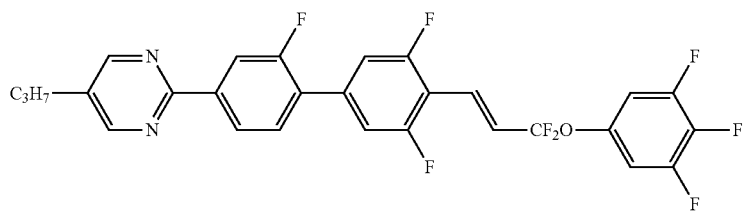 |
| 1-2-27 | 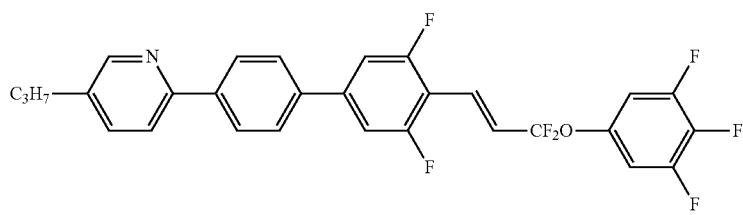 |

| No. | |
|---|---|
| 1-2-28 | 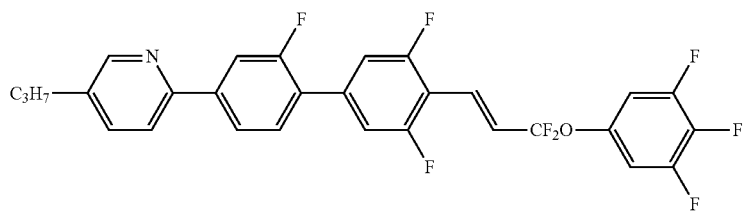 |
| 1-3-1 | 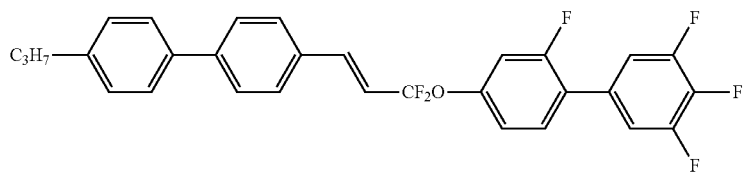 |
| 1-3-2 | 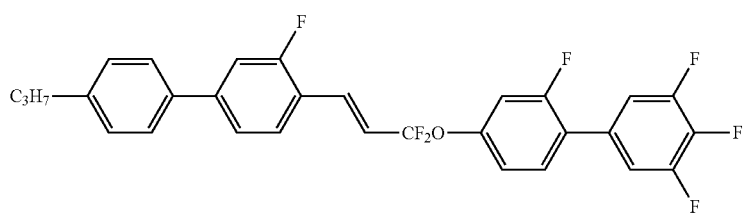 |
| 1-3-3 | 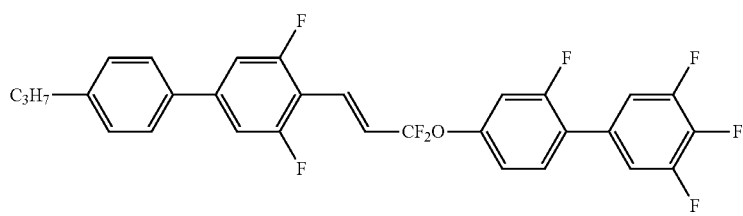 |
| 1-3-4 | 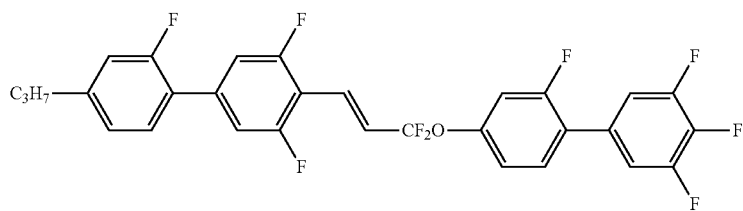 |
| 1-3-5 | 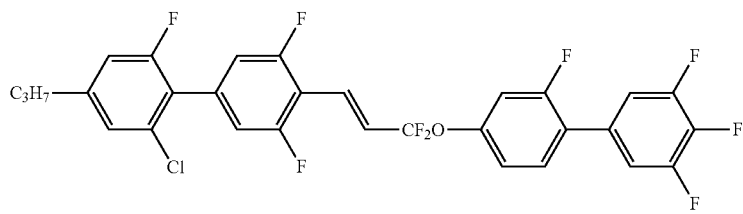 |
| 1-3-6 | 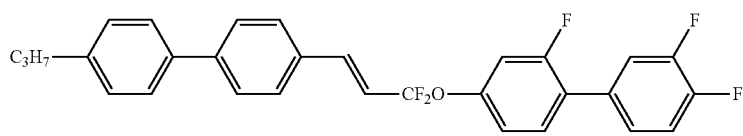 |
| 1-3-7 | 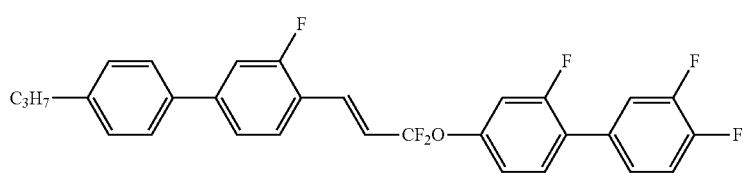 |

| No. | |
|---|---|
| 1-3-8 | 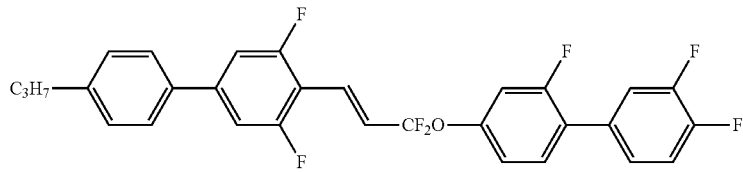 |
| 1-3-9 | 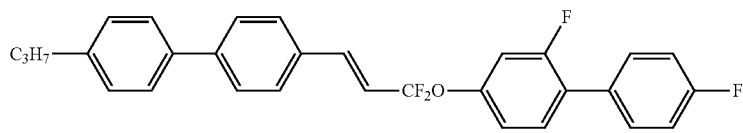 |
| 1-3-10 | 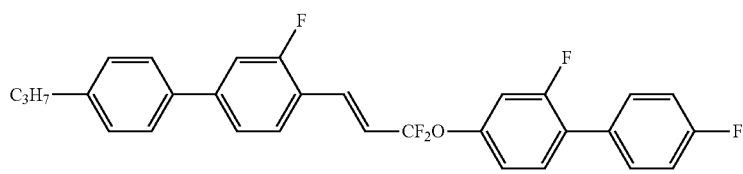 |
| 1-3-11 | 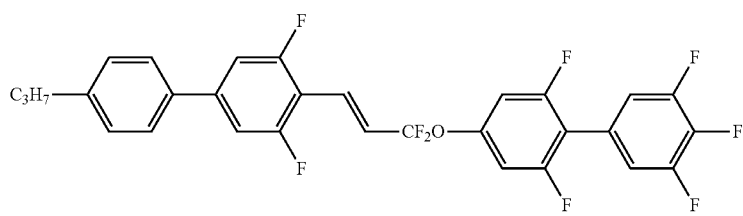 |
| 1-3-12 | 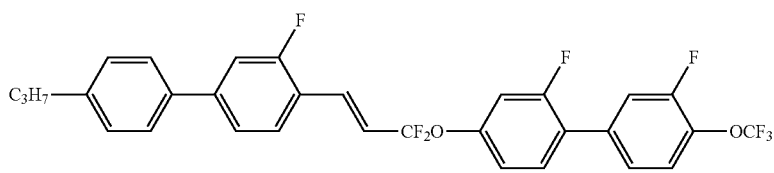 |
| 1-3-13 | 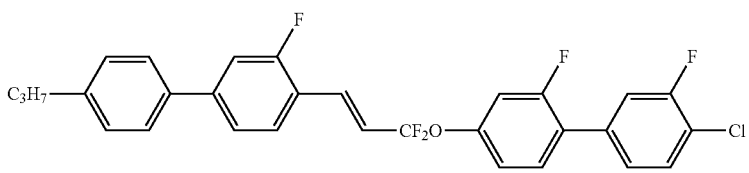 |
| 1-3-14 | 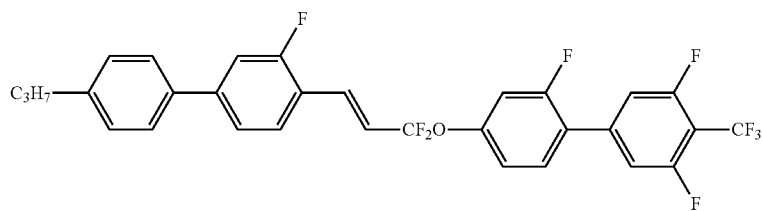 |
| 1-3-15 | 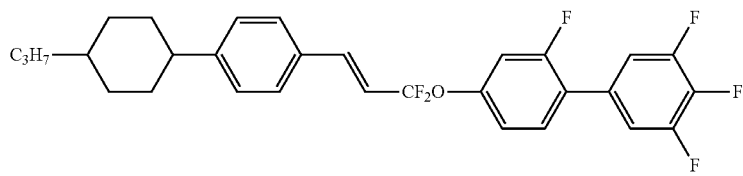 |

| No. | |
|---|---|
| 1-3-16 | 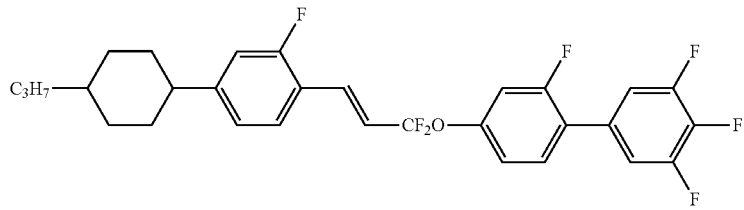 |
| 1-3-17 | 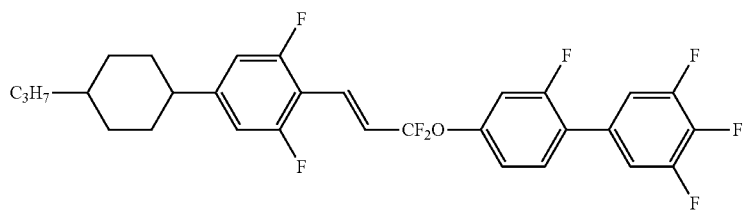 |
| 1-3-18 | 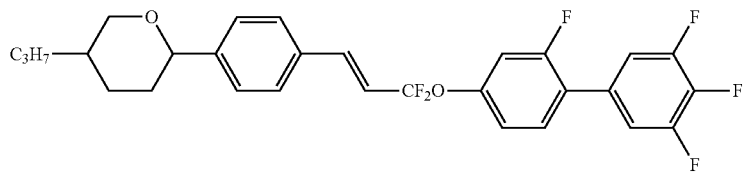 |
| 1-3-19 | 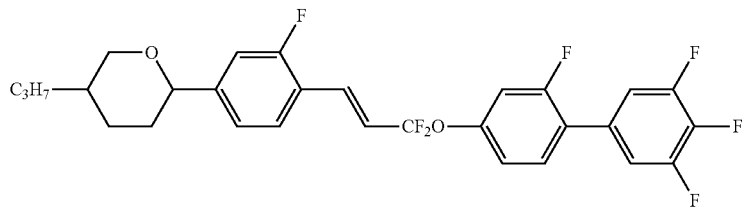 |
| 1-3-20 | 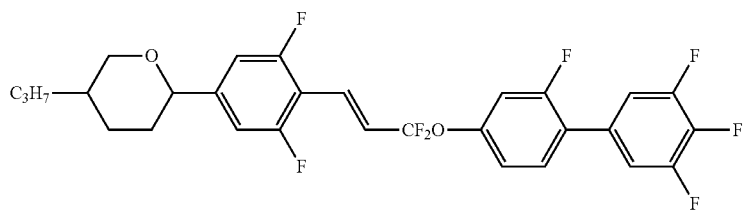 |
| 1-3-21 | 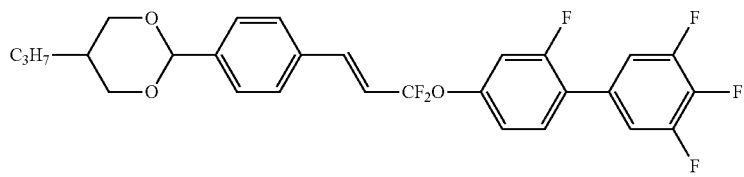 |
| 1-3-22 | 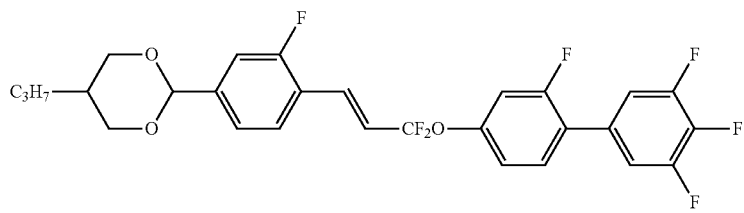 |

| No. | |
|---|---|
| 1-3-23 | 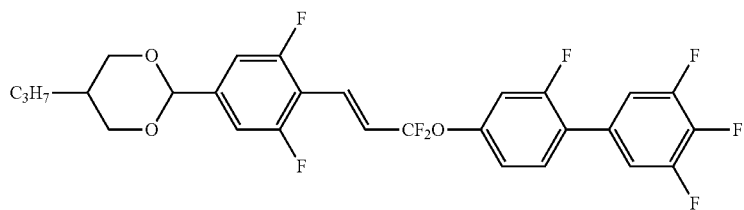 |
| 1-3-24 | 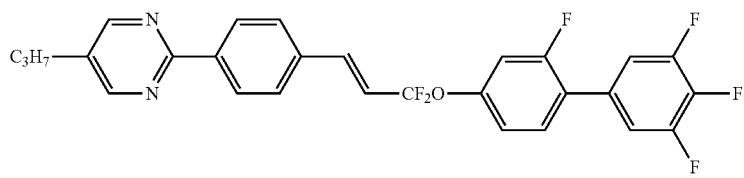 |
| 1-3-25 | 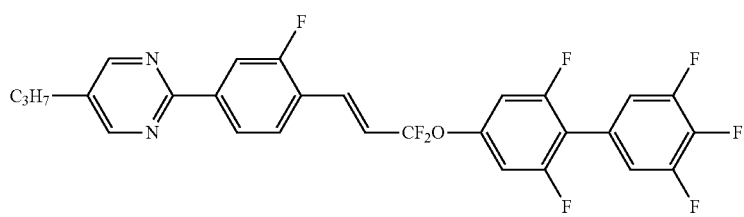 |
| 1-3-26 | 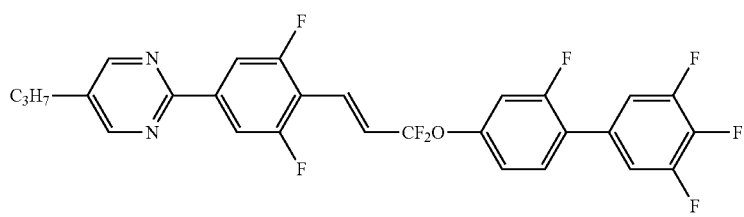 |
| 1-3-27 | 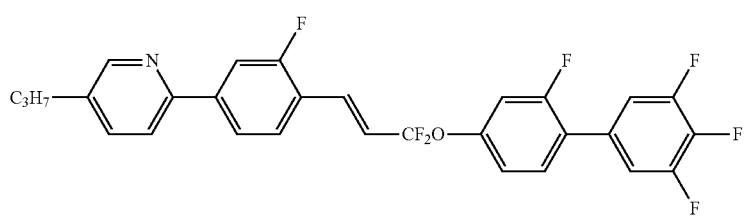 |
| 1-3-28 | 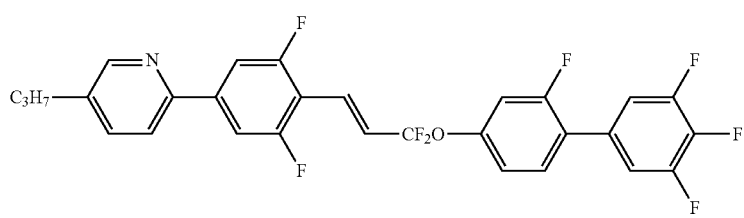 |
| 1-4-1 | 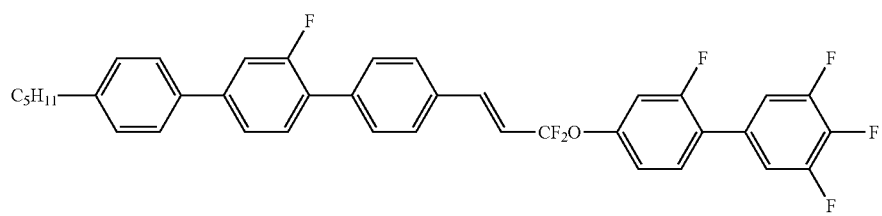 |

-continued
| No. | |
|---|---|
| 1-4-2 | 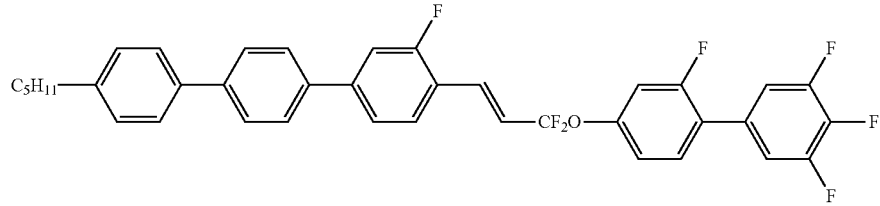 |
| 1-4-3 | 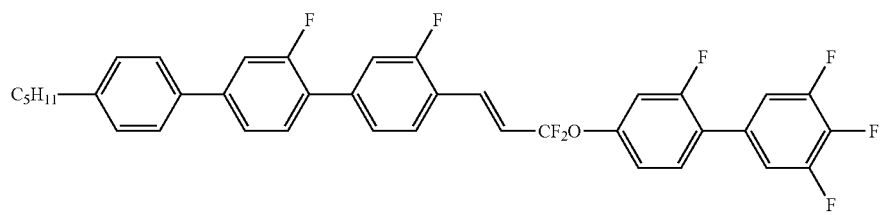 |
| 1-4-4 | 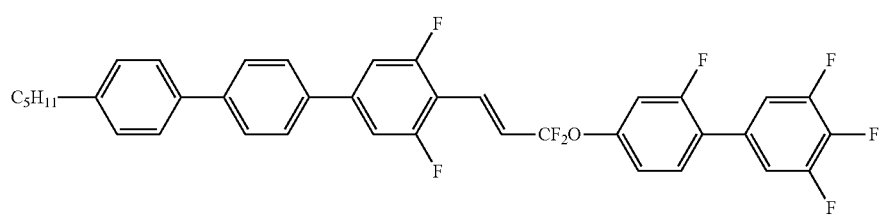 |
| 1-4-5 | 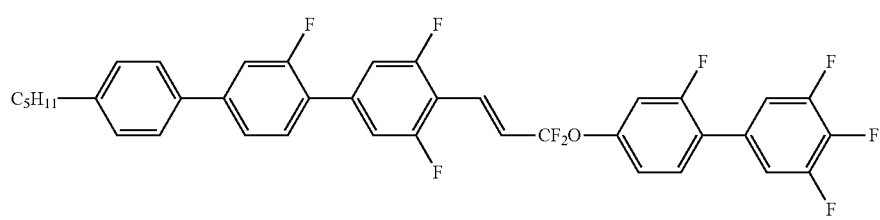 |
| 1-4-6 | 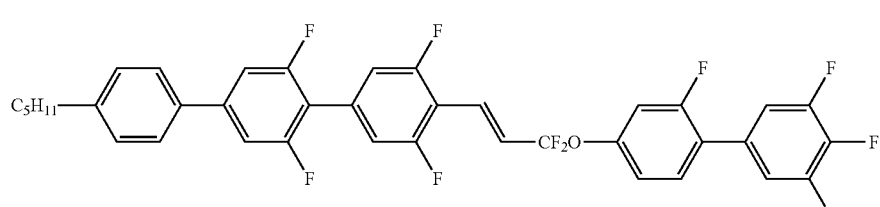 |
| 1-4-7 | 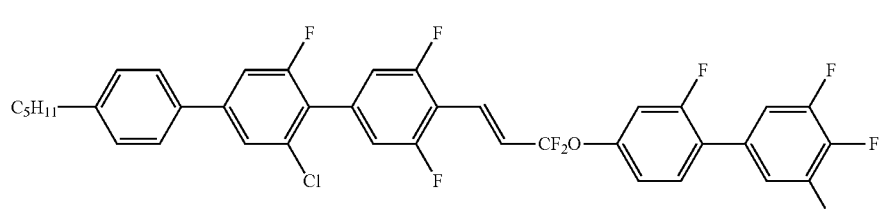 |
| 1-4-8 | 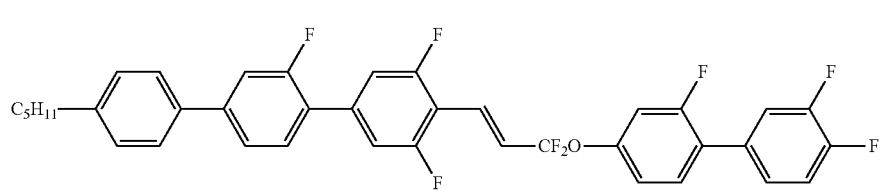 |

| No. | |
|---|---|
| 1-4-9 | 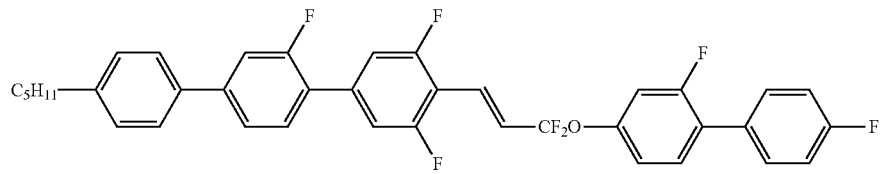 |
| 1-4-10 | 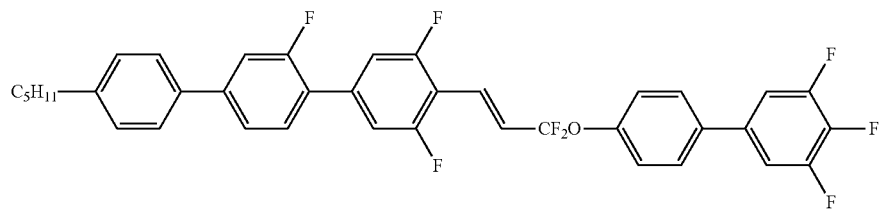 |
| 1-4-11 | 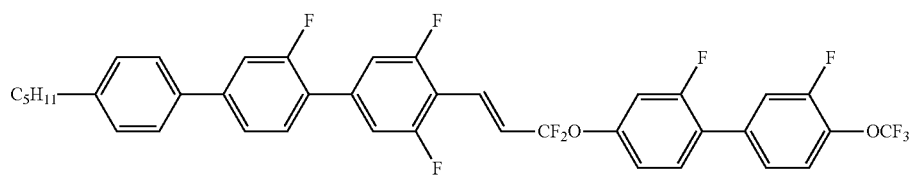 |
| 1-4-12 | 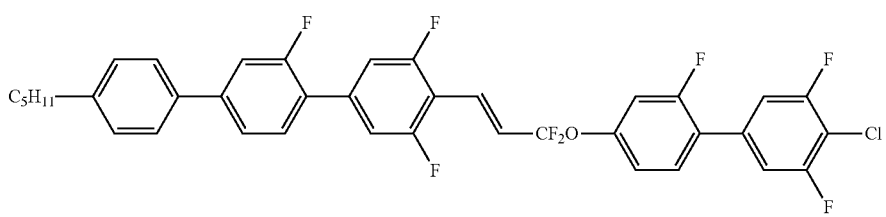 |
| 1-4-13 | 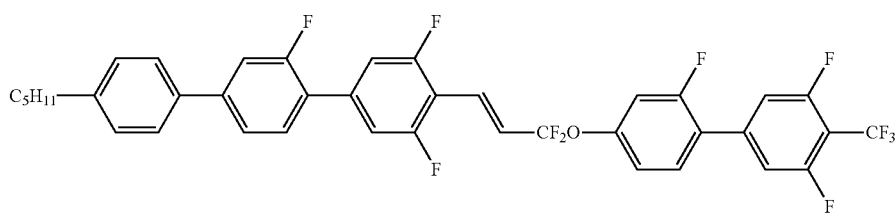 |
| 1-4-14 | 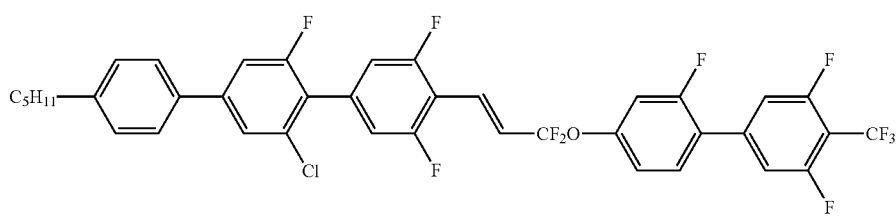 |
| 1-4-15 | 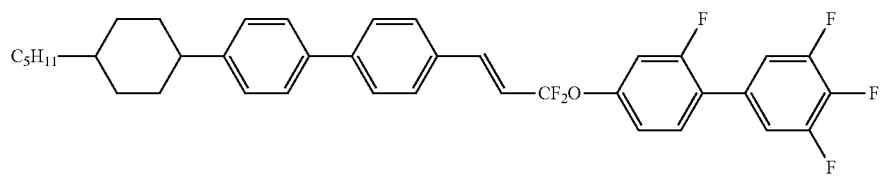 |

| No. |
|---|
| 1-4-16 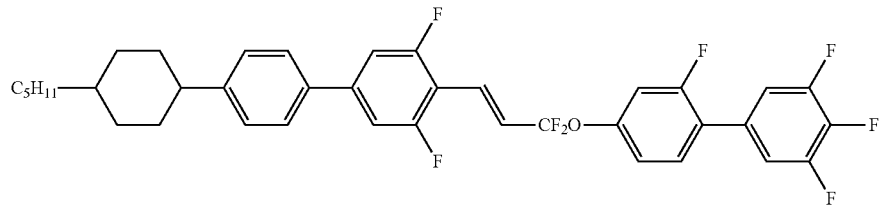 |
| 1-4-17 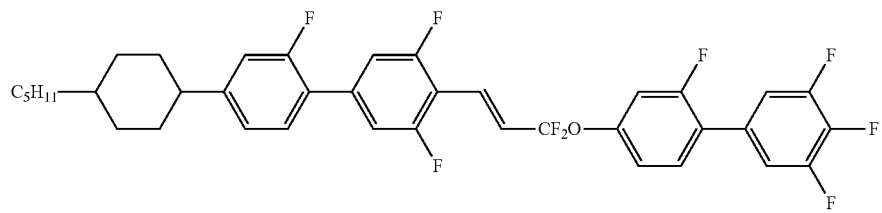 |
| 1-4-18 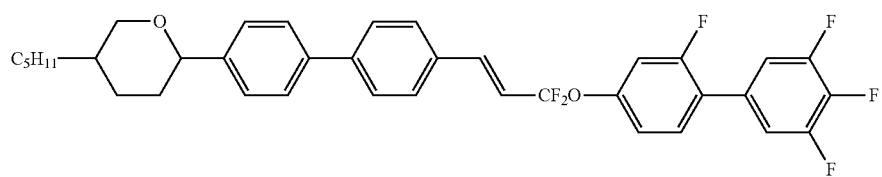 |
| 1-4-19 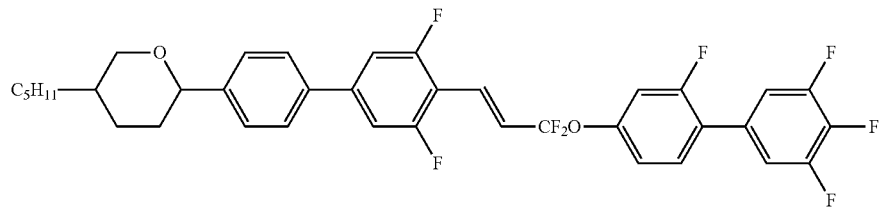 |
| 1-4-20 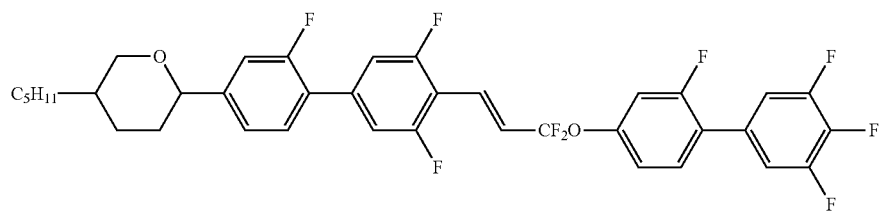 |
| 1-4-21 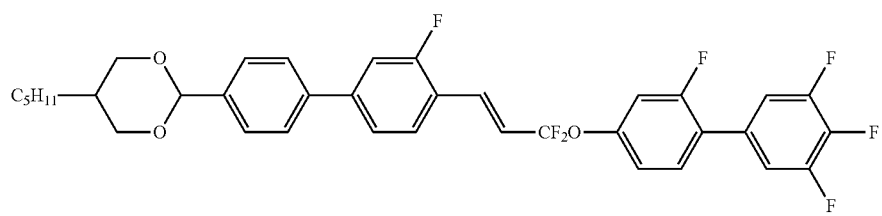 |
| 1-4-22 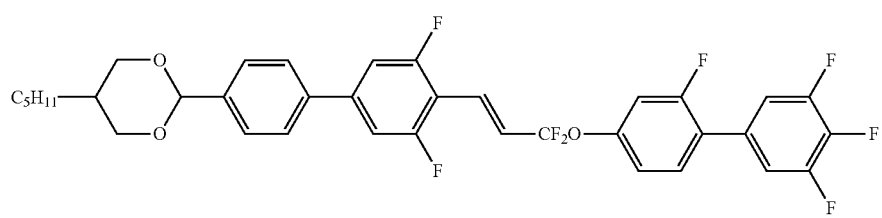 |

-continued
| No. | |
|---|---|
| 1-4-23 | 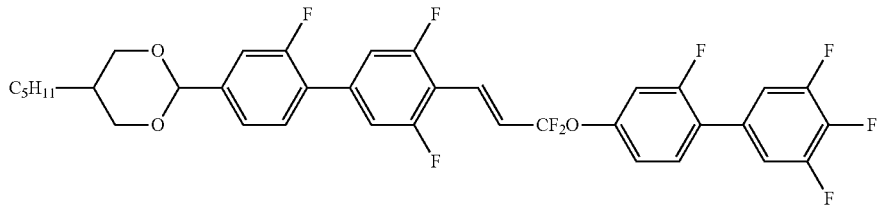 |
| 1-4-24 | 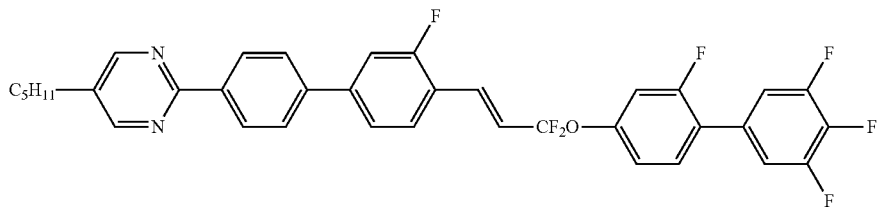 |
| 1-4-25 | 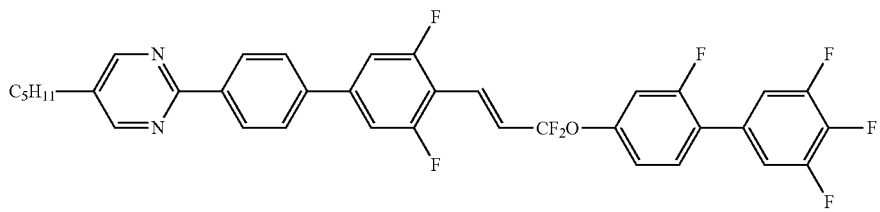 |
| 1-4-26 | 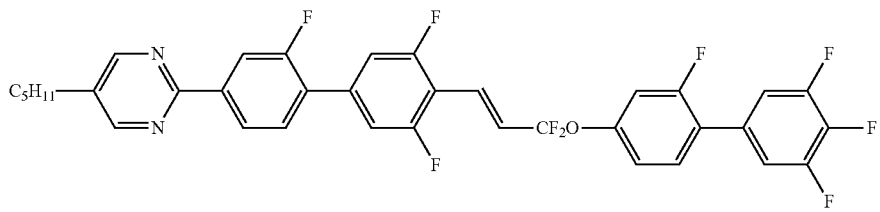 |
| 1-4-27 | 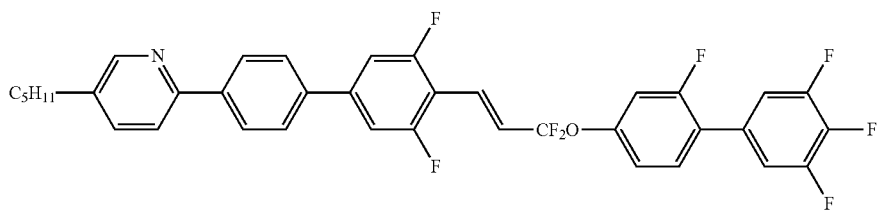 |
| 1-4-28 | 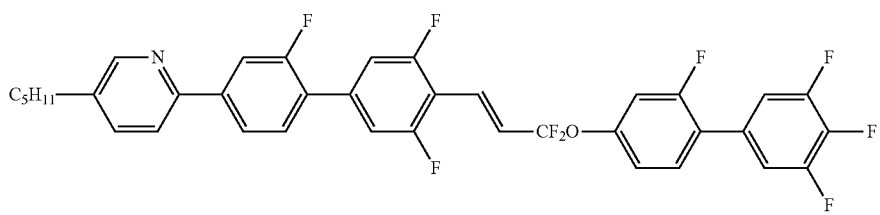 |
| 1-4-29 | 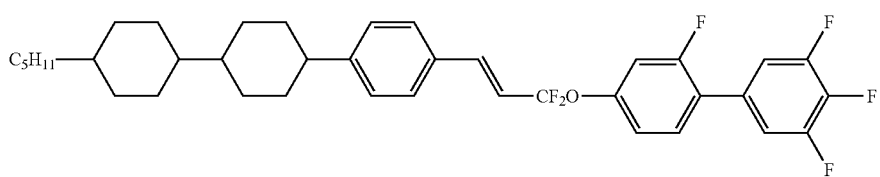 |

| No. |
|---|
| 1-4-30 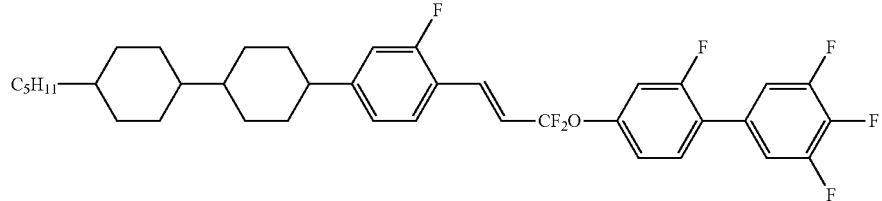 |
| 1-4-31 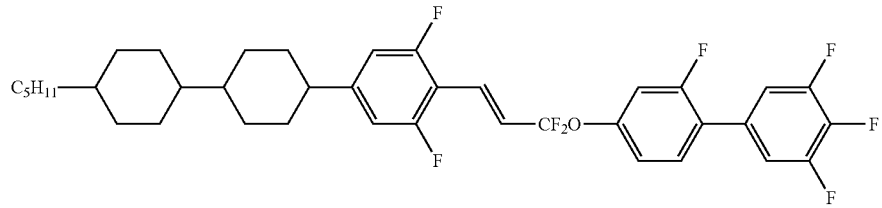 |
| 1-4-32 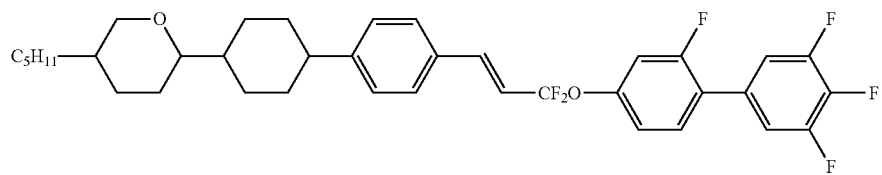 |
| 1-4-33 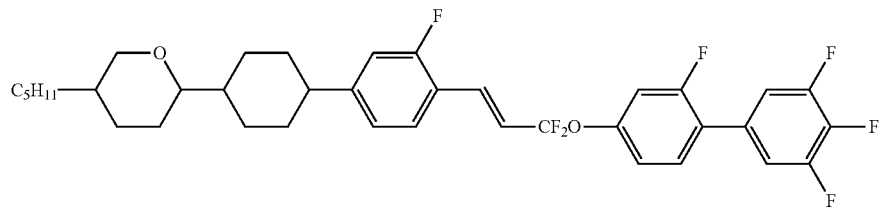 |
| 1-4-34 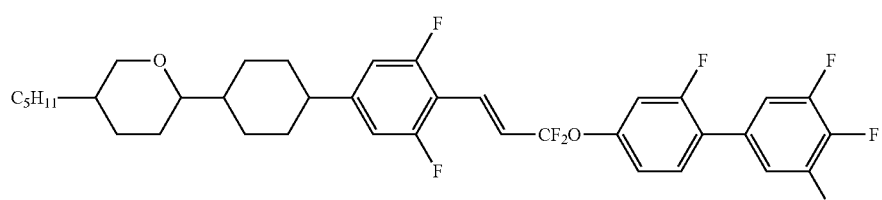 |
| 1-4-35 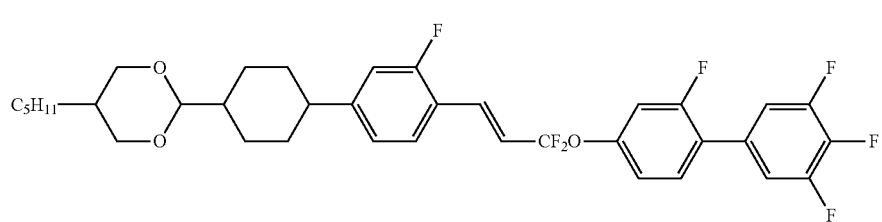 |
| 1-4-36 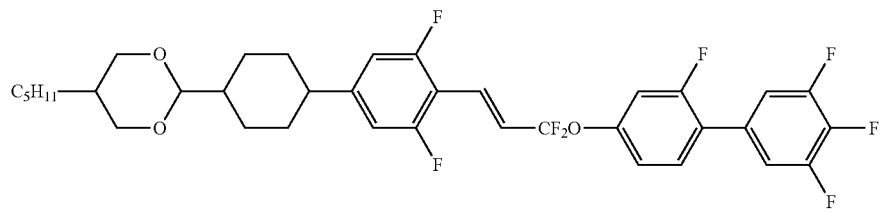 |

| No. | |
|---|---|
| 1-4-37 | 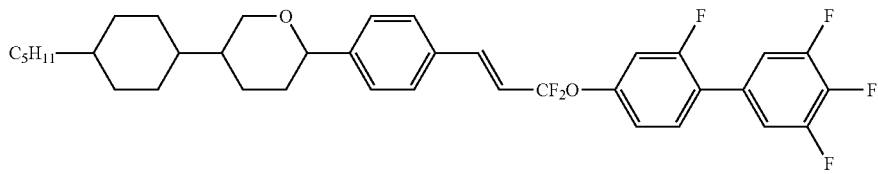 |
| 1-4-38 | 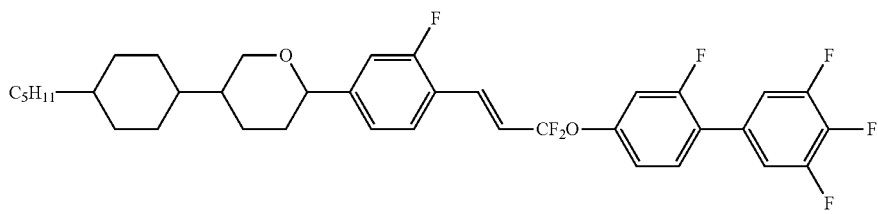 |
| 1-4-39 | 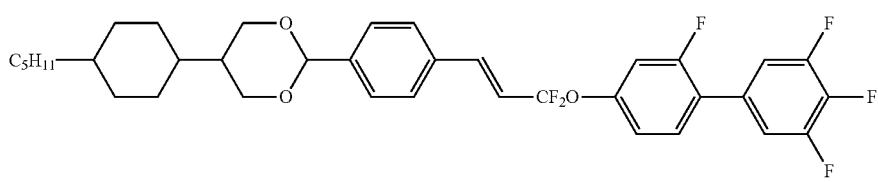 |
| 1-4-40 | 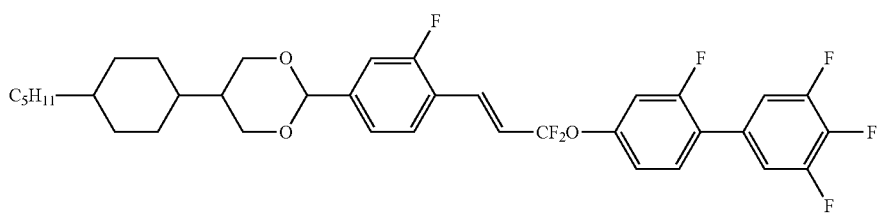 |
| 1-4-41 | 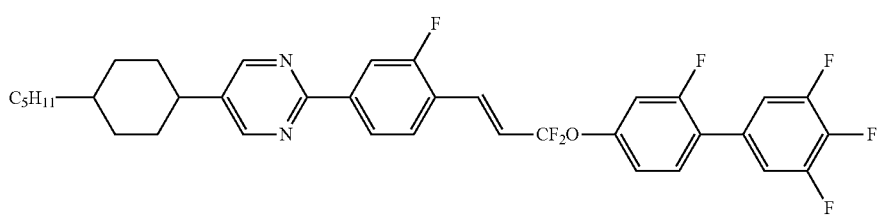 |
| 1-4-42 | 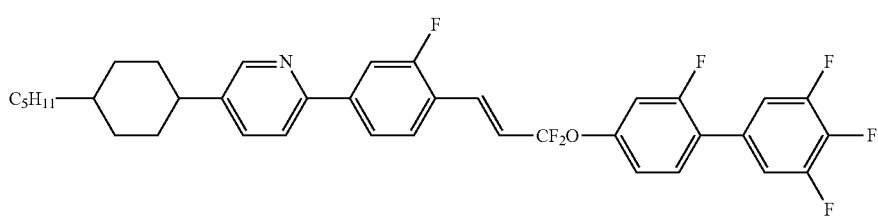 |
| 1-5-1 | 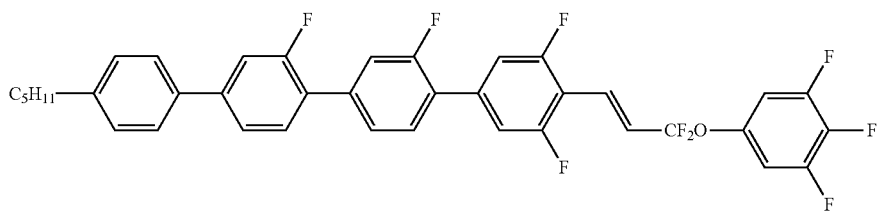 |
$T_{NI} = 194°$ C., $\Delta n = 0.307$, $\Delta \epsilon = 26.6$ -continued
| No. |
|---|
| 1-5-2 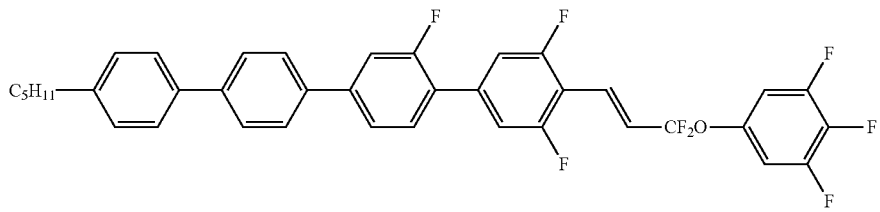 |
| 1-5-3 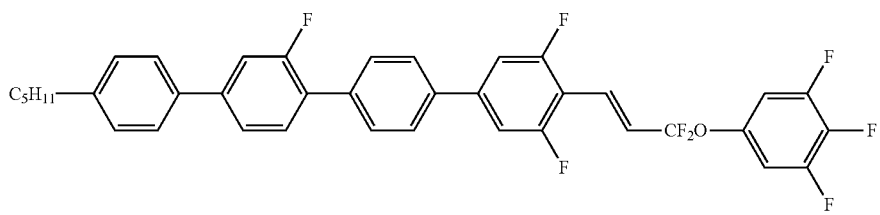 |
| 1-5-4 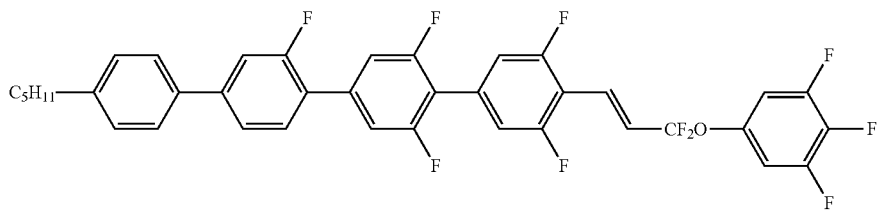 |
| 1-5-5 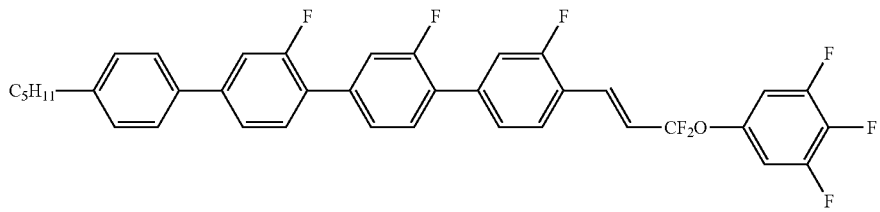 |
| 1-5-6 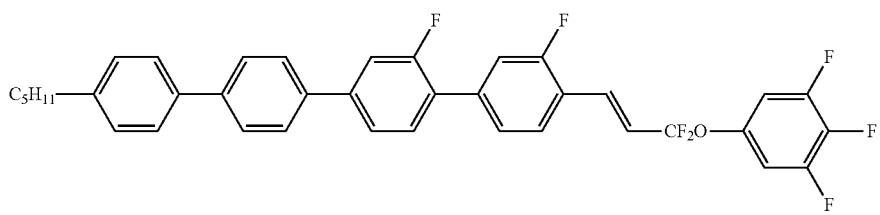 |
| 1-5-7 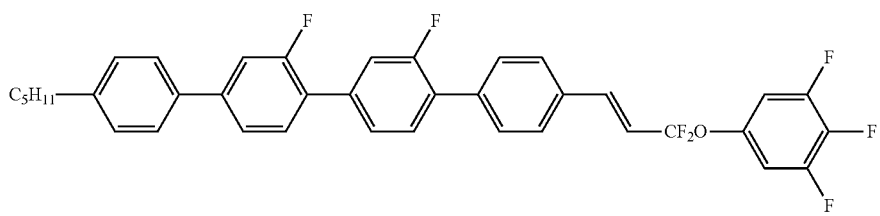 |
| 1-5-8 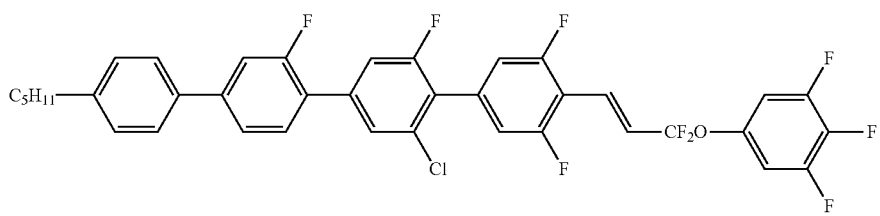 |

| No. | |
|---|---|
| 1-5-9 | 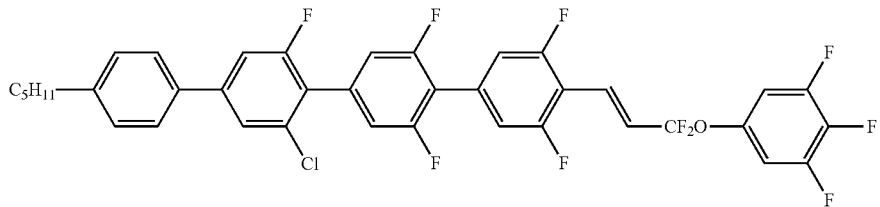 |
| 1-5-10 | 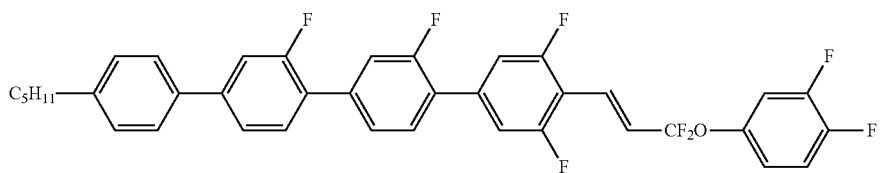 |
| 1-5-11 | 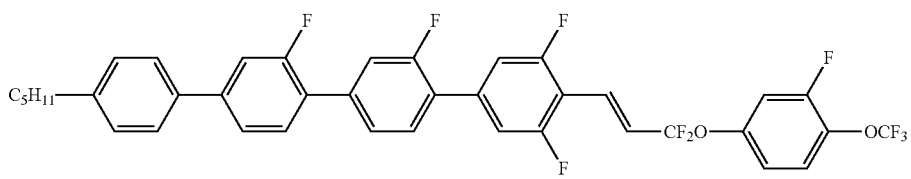 |
| 1-5-12 | 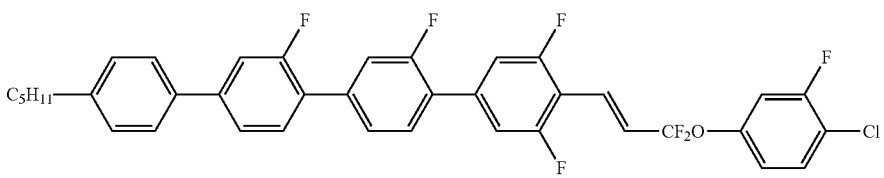 |
| 1-5-13 | 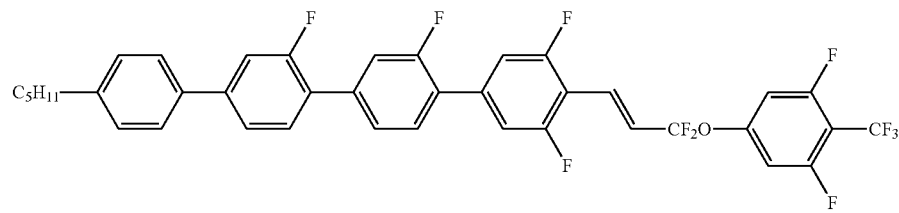 |
| 1-5-14 | 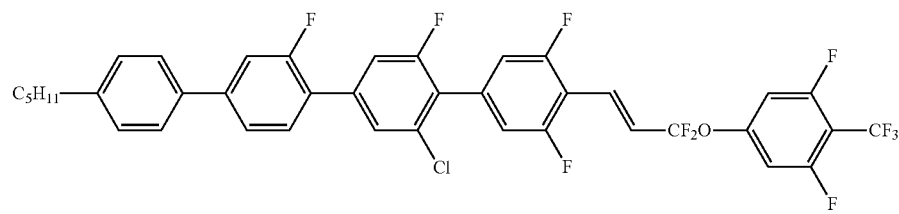 |
| 1-5-15 | 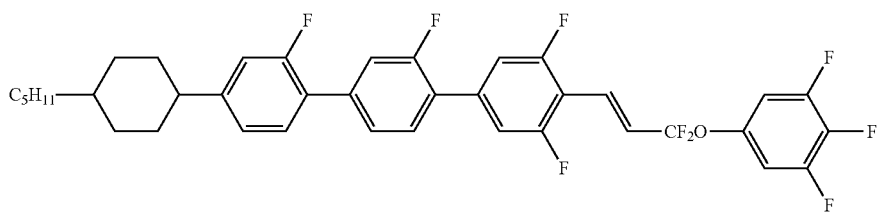 |

| No. |
|---|
| 1-5-16 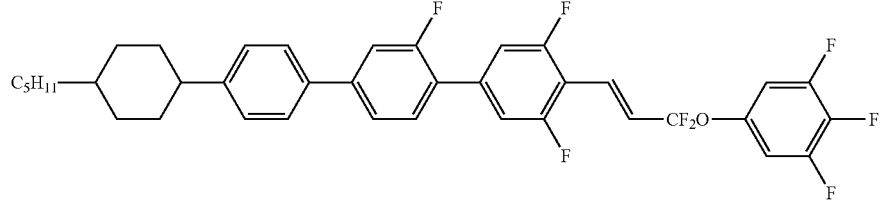 |
| 1-5-17 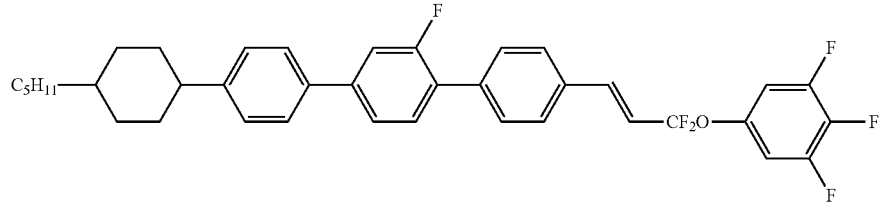 |
| 1-5-18 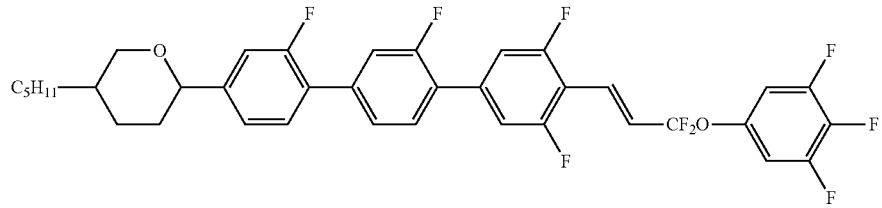 |
| 1-5-19 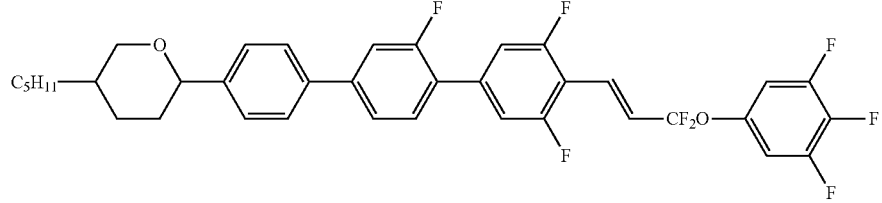 |
| 1-5-20 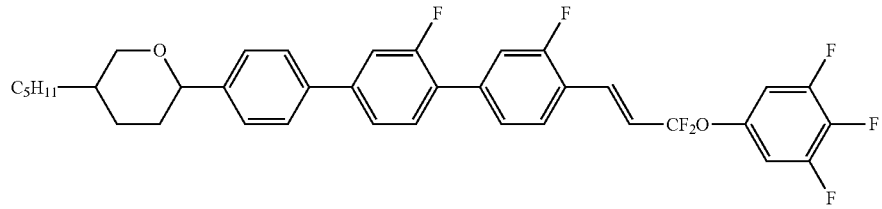 |
| 1-5-21 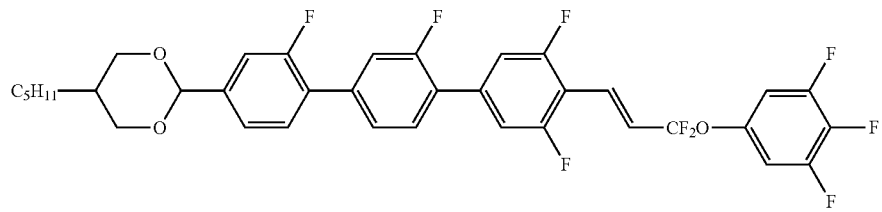 |
| 1-5-22 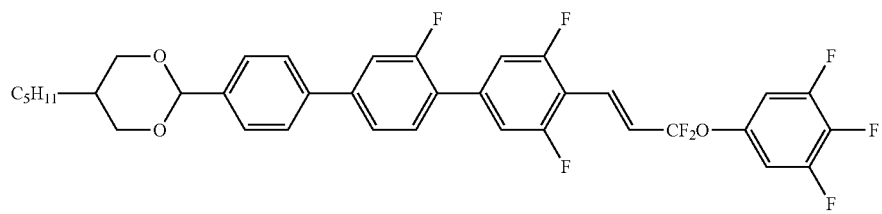 |

| No. | |
|---|---|
| 1-5-23 | 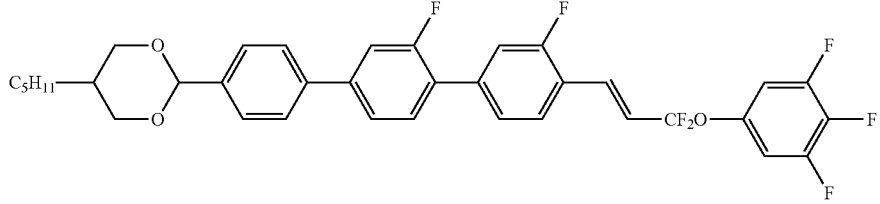 |
| 1-5-24 | 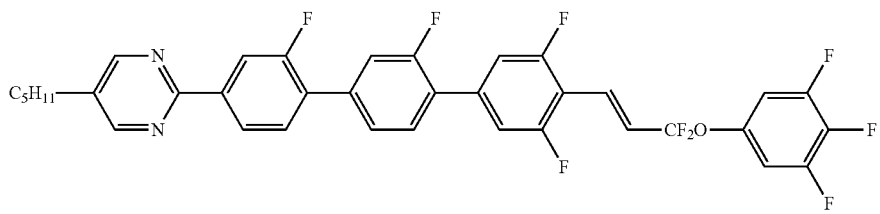 |
| 1-5-25 | 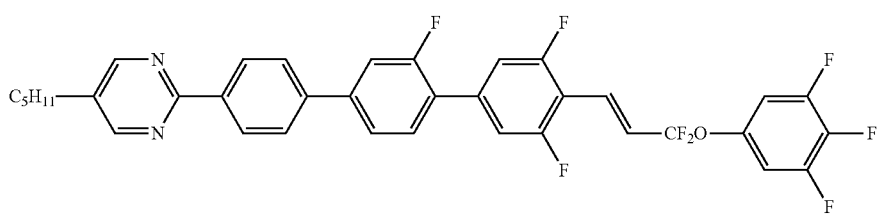 |
| 1-5-26 | 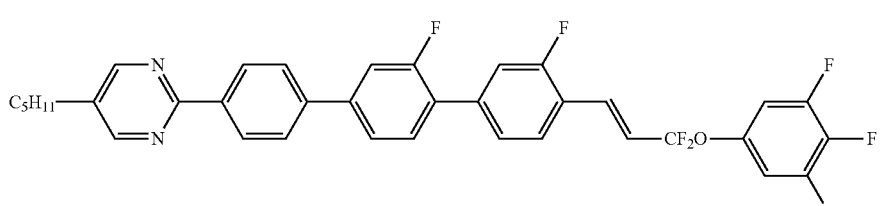 |
| 1-5-27 | 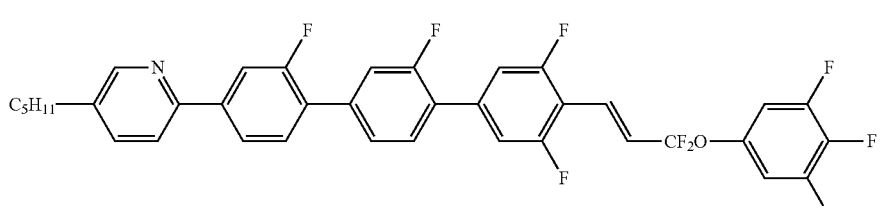 |
| 1-5-28 | 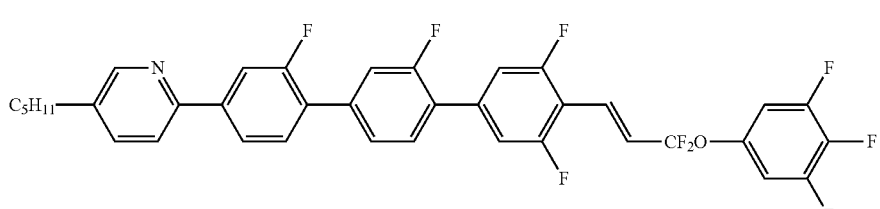 |
| 1-5-29 | 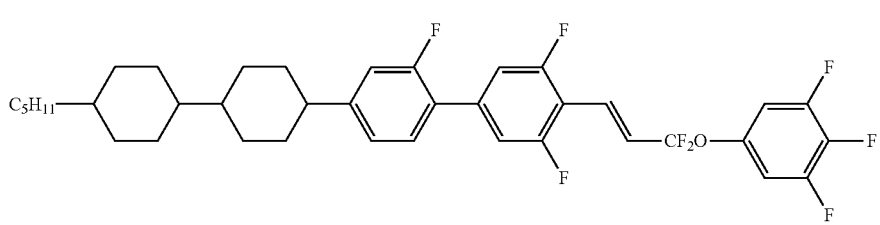 |

| No. | |
|---|---|
| 1-5-30 | 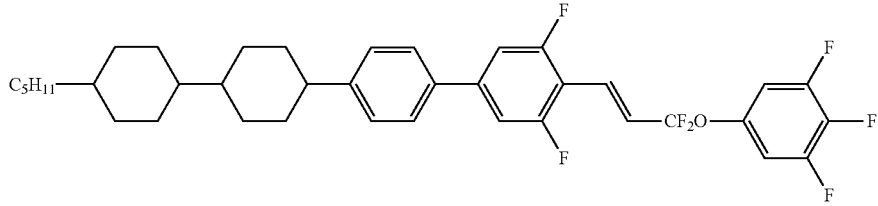 |
| 1-5-31 | 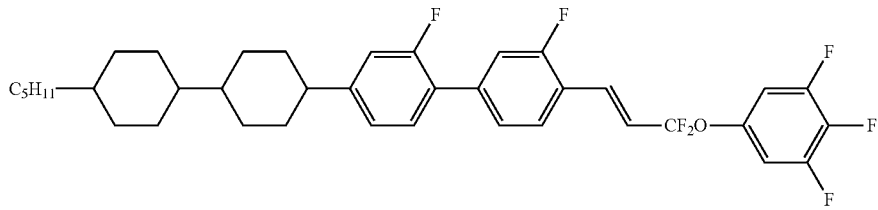 |
| 1-5-32 | 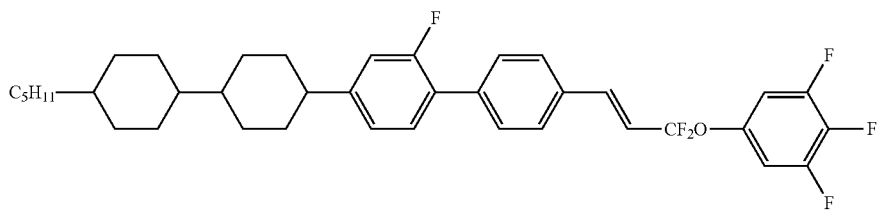 |
| 1-5-33 | 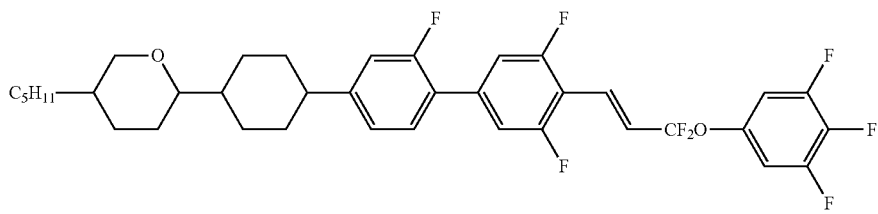 |
| 1-5-34 | 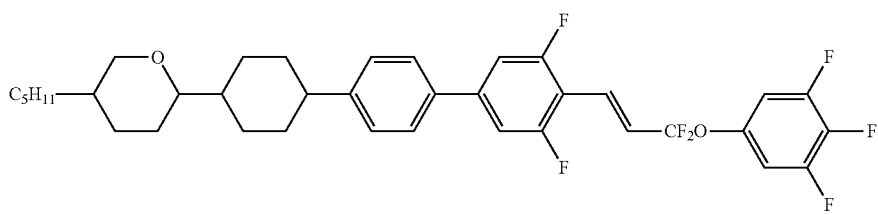 |
| 1-5-35 | 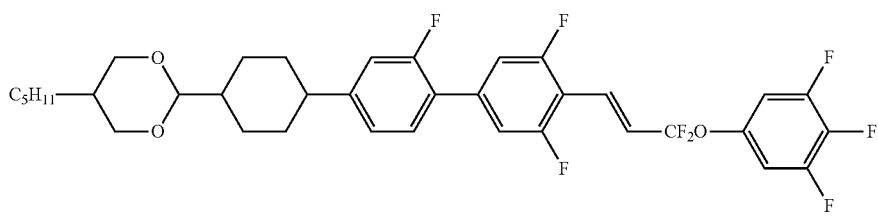 |
| 1-5-36 | 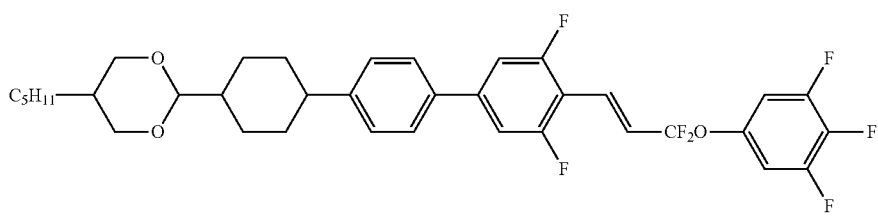 |

-continued
| No. | |
|---|---|
| 1-5-37 | 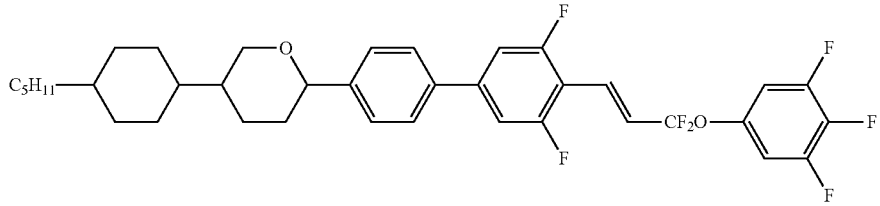 |
| 1-5-38 | 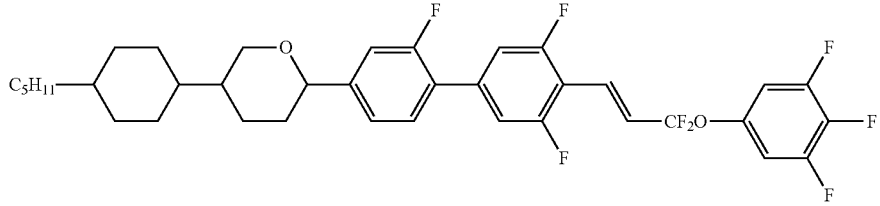 |
| 1-5-39 | 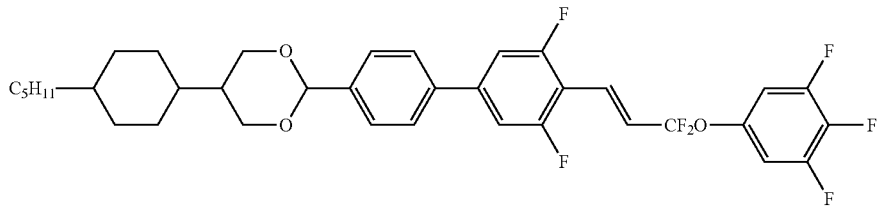 |
| 1-5-40 | 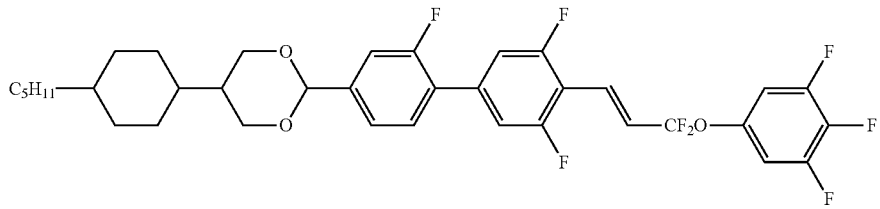 |
| 1-5-41 | 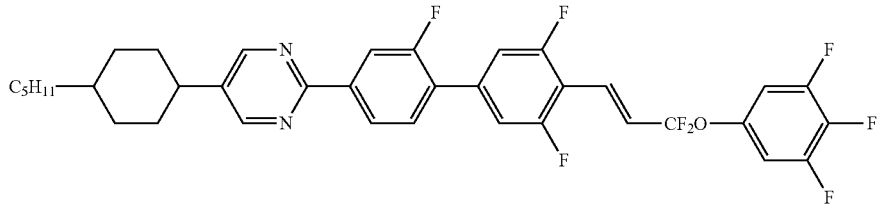 |
| 1-5-42 | 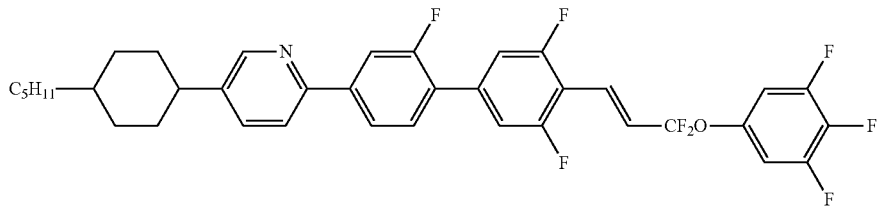 |
Comparative Example 1
As a comparative example, 4-[difluoro(3,4,5-trifluorophenoxy)methyl]-3,5-difluoro-4'-propylbiphenyl (S-1) being three-ring liquid crystal compounds having a $CF_2O$ bonding group as described in WO 96/11897 A1 was prepared.
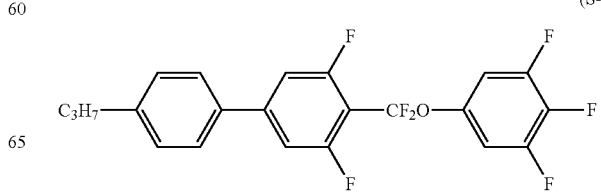
(S-1)

A chemical shift in $^1$H-NMR analysis was as described below, and the compound obtained could be identified as 4-[difluoro(3,4,5-trifluorophenoxy)methyl]-3,5-difluoro-4'-propylbiphenyl.

Chemical shift δ (ppm; CDCl$_3$): 7.49 (d, J=8.00 Hz, 2H), 7.29 (d, J=8.00 Hz, 2H), 7.21 (d, J=10.5 Hz, 2H), 7.03-6.94 (m, 2H), 2.65 (t, J=7.50 Hz, 2H), 1.75-1.64 (m, 2H), 0.97 (t, J=7.50 Hz, 3H).

A phase transition temperature of comparative compound (S-1) obtained was as described below.

Phase transition temperature: C 46.1 I.

Composition E including 85% of mother liquid crystals A and 15% of comparative compound (S-1) was prepared. Physical property values of composition E obtained were determined and physical property values of comparative compound (S-1) were calculated by extrapolating the measured values. The results were as described below.

Maximum temperature (T$_{NI}$)=−3.60° C.; optical anisotropy (Δn)=0.110; dielectric anisotropy (Δε)=27.7.

Comparative compound (S-1) and compound (1-1-2) of the invention shown in Example are compared. First, when phase transition temperatures between respective compounds are compared, compound (1-1-2) has a wider temperature range of a liquid crystal phase. In particular, compound (1-1-2) has a nematic phase while comparative compound (S-1) shows no liquid crystal phase.

Next, when extrapolated values of physical property values between comparative compound (S-1) and compound (1-1-2) are compared, compound (1-1-2) has a higher clearing point and a larger optical anisotropy. Therefore, compound (1-1-2) can be described to be usable in a wider temperature range and to be an excellent liquid crystal compound having a large optical anisotropy.

Comparative Example 2

Furthermore, as a comparative example, 4-[difluoro(3,4,5-trifluorophenoxy)methyl]-4''-propyl-2',3,5-trifluoro-1,1',4',1''-terphenyl (S-2) being a four-ring liquid crystal compound having a CF$_2$O bonding group described in WO 96/11897 A1 was prepared.

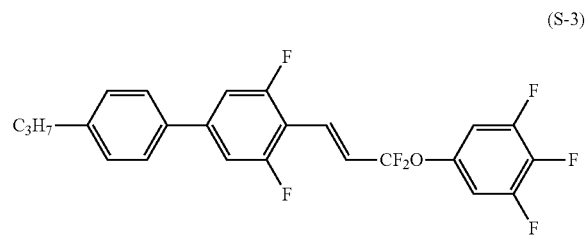

(S-2)

A chemical shift in $^1$H-NMR analysis was as described below, and the compound obtained could be identified as 4-[difluoro(3,4,5-trifluorophenoxy)methyl]-4''-propyl-2',3,5-trifluoro-1,1',4',1''-terphenyl.

Chemical shift δ (ppm; CDCl$_3$): 7.54 (d, J=8.10 Hz, 2H), 7.52-7.46 (m, 2H), 7.42 (d, J=12.2 Hz, 2H), 7.34-7.25 (m, 3H), 7.04-6.95 (m, 2H), 2.65 (t, J=7.45 Hz, 2H), 1.77-1.64 (m, 2H), 0.98 (t, J=7.35 Hz, 3H).

A phase transition temperature of comparative compound (S-2) obtained was as described below.

Phase transition temperature: C 79.4 S$_A$ 82.3 N 128 I.

Composition F including 85% of mother liquid crystals A and 15% of comparative compound (S-2) was prepared. Physical property values of composition F obtained were determined and physical property values of comparative compound (S-2) were calculated by extrapolating the measured values. The results were as described below.

Maximum temperature (T$_{NI}$)=96.4° C.; dielectric anisotropy (Δε)=34.0; optical anisotropy (Δn)=0.210.

Comparative compound (S-2) and compound (1-2-5) of the invention shown in Example are compared. First, when phase transition temperatures between respective compounds are compared, compound (1-2-5) has a wider temperature range of a phase.

Next, when extrapolated values of physical properties between comparative compound (S-2) and compound (1-2-5) of the invention are compared, compound (1-2-5) has a higher clearing point, a larger dielectric anisotropy and a larger optical anisotropy. Therefore, compound (1-2-5) can be described to be usable in a wider temperature range and to be an excellent liquid crystal compound having a large dielectric anisotropy and a large optical anisotropy.

Comparative Example 3

Furthermore, as a comparative example, (E)-4-[3,3-difluoro-3-(3,4,5-trifluorophenoxy)-1-propenyl]-3,5-difluoro-4'-propylbiphenyl (S-3) being a three-ring liquid crystal compound having a —CH=CH—CF$_2$O— bonding group described in JP 2002/53513 A was prepared.

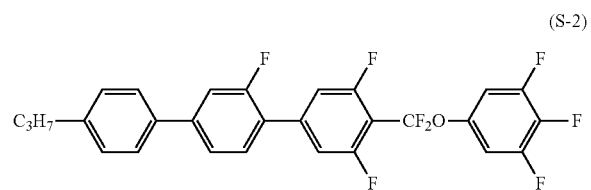

(S-3)

A chemical shift in $^1$H-NMR analysis was as described below, and the compound obtained could be identified as (E)-4-[3,3-difluoro-3-(3,4,5-trifluorophenoxy)-1-propenyl]-3,5-difluoro-4'-propylbiphenyl.

Chemical shift δ (ppm; CDCl$_3$): 7.49 (d, J=8.10 Hz, 2H), 7.32-7.24 (m, 3H), 7.18 (d, J=10.1 Hz, 2H), 6.98-6.90 (m, 2H), 6.65 (dt, J=16.5 Hz, J=6.80 Hz, 1H), 2.64 (t, J=7.40 Hz, 2H), 1.73-1.61 (m, 2H), 0.97 (t, 7.40 Hz, 3H).

A phase transition temperature of comparative compound (S-3) obtained was as described below.

Phase transition temperature: C 47.4 N 51.5 I.

Composition G including 85% of mother liquid crystals A and 15% of comparative compound (S-3) was prepared. Physical property values of composition G obtained were determined and physical property values of compound (S-3) were calculated by extrapolating the measured values. The results were as described below.

Maximum temperature (T$_{NI}$)=50.4° C.; dielectric anisotropy (Δε)=31.6; optical anisotropy (Δn)=0.184.

Comparative compound (S-3) and compound (1-1-2) of the invention shown in Example are compared. First, when phase transition temperatures between respective compounds are compared, compound (1-1-2) has a wider temperature range of a liquid crystal phase and a higher clearing point.

Next, when extrapolated values of physical properties between comparative compound (S-3) and the compound of the invention are compared, compound (1-1-2) has a higher clearing point. Therefore, compound (1-1-2) can be described to be an excellent liquid crystal compound usable in a wider temperature range.

INDUSTRIAL APPLICABILITY

The invention allows to provide a liquid crystal compound having general physical properties necessary for the compound, namely, stability to heat, light and so forth, a wide temperature range of a liquid crystal phase, a high clearing point, a good compatibility with other compounds, a large optical anisotropy and a large dielectric anisotropy, and when used for a liquid crystal display device, being usable in a wide temperature range, drivable at a low voltage, and capable of obtaining steep electrooptical characteristics. Hence, the compound can be widely used for a display for a watch, a calculator, a word processor and so forth.

What is claimed is:

1. A compound represented by formula (1):

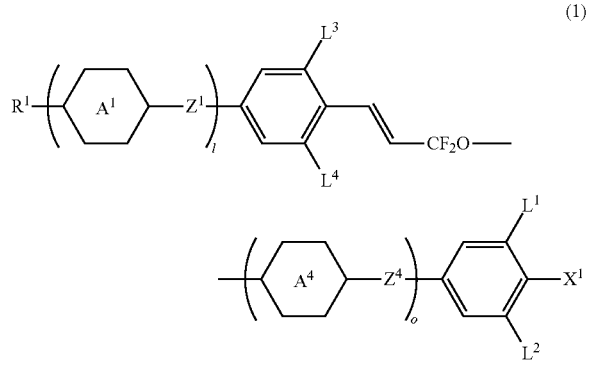

wherein, in formula (1), $R^1$ is alkyl having 1 to 20 carbons, and in the alkyl, arbitrary —$CH_2$— may be replaced by —O—, —S— or —CH=CH—; ring $A^1$ and ring $A^4$ are independently 1,4-cyclohexylene, 1,3-dioxane-2,5-diyl, pyrimidine-2,5-diyl, pyridine-2,5-diyl, tetrahydropyran-2,5-diyl, 1,4-phenylene, or 1,4-phenylene in which arbitrary hydrogen is replaced by halogen; $Z^1$ and $Z^4$ are independently a single bond, —$CH_2CH_2$—, —CH=CH—, —C≡C—, —COO—, —OCO—, —$CF_2O$—, —$OCF_2$—, —$CH_2O$—, —$OCH_2$—, —CF=CF—, —$(CH_2)_4$—, —$(CH_2)_2CF_2O$—, —$(CH_2)_2OCF_2$—, —$CF_2$—O—$(CH_2)_2$—, —$CF_2(CH_2)_2$—, —CH=CH—$(CH_2)_2$— or —$(CH_2)_2$—CH=CH—; $L^1$, $L^2$, $L^3$ and $L^4$ are independently hydrogen, fluorine or chlorine; $X^1$ is hydrogen, halogen, —C≡N, —N=C=S, —$SF_5$ or alkyl having 1 to 10 carbons, and in the alkyl, arbitrary —$CH_2$— may be replaced by —O—, —S— or —CH=CH—, and arbitrary hydrogen may be replaced by halogen; l and o are independently an integer from 0 to 3, and a sum of l and o is 3 or less; and when l is 1, o is 0, ring $A^1$ is 1,4-phenylene and $X^1$ is fluorine, at least one of $L^1$, $L^2$, $L^3$ and $L^4$ is hydrogen.

2. The compound according to claim 1, wherein, in formula (1), $R^1$ is alkyl having 1 to 20 carbons, alkenyl having 2 to 21 carbons, alkoxy having 1 to 19 carbons, alkenyloxy having 2 to 20 carbons or alkylthio having 1 to 19 carbons; $X^1$ is hydrogen, halogen, —C≡N, —N=C=S, —$SF_5$, alkyl having 1 to 10 carbons, alkenyl having 2 to 11 carbons, alkoxy having 1 to 9 carbons, alkenyloxy having 2 to 10 carbons, thioalkyl having 1 to 9 carbons, —$CH_2F$, —$CHF_2$, —$CF_3$, —$(CH_2)_2$—F, —$CF_2CH_2F$, —$CF_2CHF_2$, —$CH_2CF_3$, —$CF_2CF_3$, —$(CH_2)_3$—F, —$(CF_2)_3$—F, —$CF_2CHFCF_3$, —$CHFCF_2CF_3$, —$(CH_2)_4$—F, —$(CF_2)_4$—F, —$(CH_2)_5$—F, —$(CF_2)_5$—F, —$OCH_2F$, —$OCHF_2$, —$OCF_3$, —O—$(CH_2)_2$—F, —$OCF_2CH_2F$, —$OCF_2CHF_2$, —$OCH_2CF_3$, —O—$(CH_2)_3$—F, —O—$(CF_2)_3$—F, —$OCF_2CHFCF_3$, —$OCHFCF_2CF_3$, —O$(CH_2)_4$—F, —O—$(CF_2)_4$—F, —O—$(CH_2)_5$—F, —O—$(CF_2)_5$—F, —CH=CHF, —CH=$CF_2$, —CF=CHF, —CH=$CHCH_2F$, —CH=$CHCF_3$, —$(CH_2)_2$—CH=$CF_2$, —$CH_2CH$=$CHCF_3$ or —CH=$CHCF_2CF_3$.

3. The compound according to claim 1, wherein, in formula (1), $R^1$ is alkyl having 1 to 12 carbons, alkenyl having 2 to 12 carbons, alkoxy having 1 to 12 carbons or alkenyloxy having 2 to 12 carbons; $Z^1$ and $Z^4$ are independently a single bond, —$CH_2CH_2$—, —CH=CH—, —C≡C—, —COO—, —$CF_2O$—, —$CH_2O$— or —$OCH_2$—; and $X^1$ is fluorine, chlorine, —C≡N, —$CF_3$, —$CHF_2$, —$CH_2F$, —$OCF_3$, —$OCHF_2$ or —$OCH_2F$.

4. The compound according to claim 1, wherein, in formula (1), $R^1$ is alkyl having 1 to 12 carbons, alkenyl having 2 to 12 carbons or alkoxy having 1 to 12 carbons; $Z^1$ and $Z^4$ are independently a single bond, —$CH_2CH_2$— or —CH=CH—; and $X^1$ is fluorine, chlorine, —$CF_3$ or —$OCF_3$.

5. The compound according to claim 1, wherein the compound is represented by any one of formula (1-1) to formula (1-5):

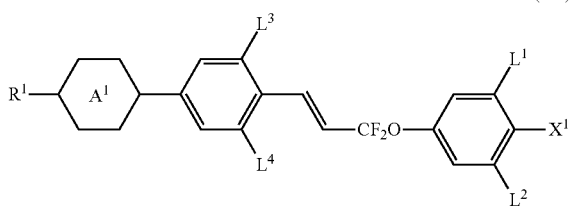

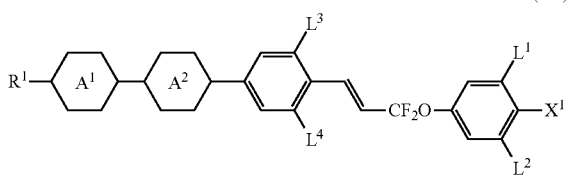

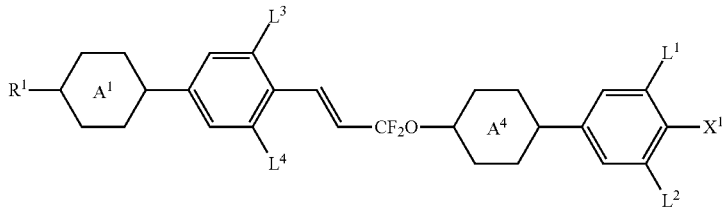

-continued (1-4)
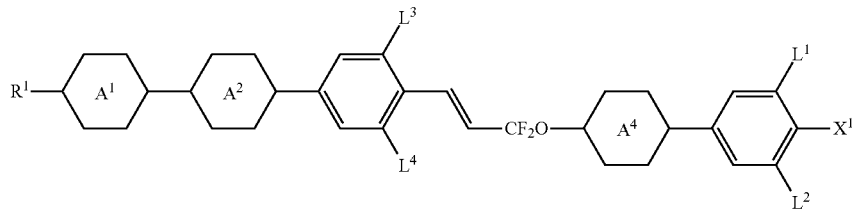

(1-5)
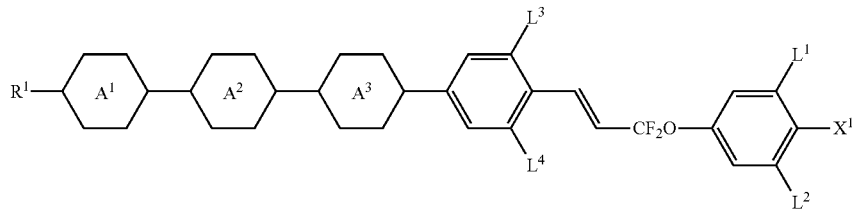

wherein, in the formulas, $R^1$ is alkyl having 1 to 12 carbons or alkenyl having 2 to 12 carbons; ring $A^1$, ring $A^2$, ring $A^3$ and ring $A^4$ are independently 1,4-cyclohexylene, 1,3-dioxane-2,5-diyl, pyrimidine-2,5-diyl, pyridine-2,5-diyl, tetrahydropyran-2,5-diyl, 1,4-phenylene, or 1,4-phenylene in which arbitrary hydrogen is replaced by halogen; $L^1$, $L^2$, $L^3$ and $L^4$ are independently hydrogen, chlorine or fluorine; $X^1$ is fluorine, chlorine, $-CF_3$ or $-OCF_3$; and then, when ring $A^1$ is 1,4-phenylene and $X^1$ is fluorine in formula (1-1), at least one of $L^1$, $L^2$, $L^3$ and $L^4$ is hydrogen.

6. The compound according to claim 1, wherein the compound is represented by any one of formula (1-6) to formula (1-38):

(1-6)
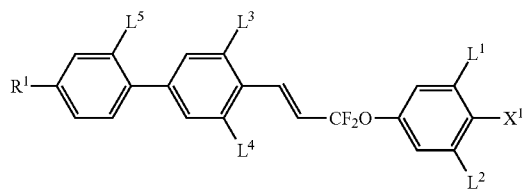

(1-7)
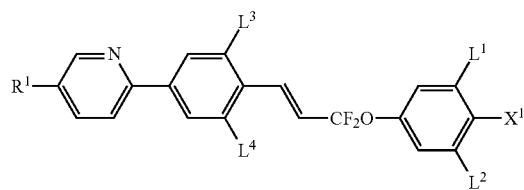

(1-8)
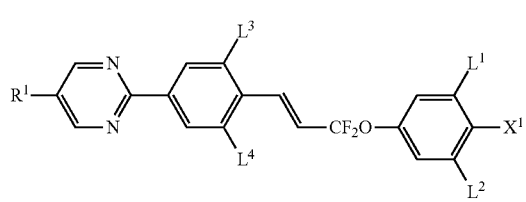

(1-9)
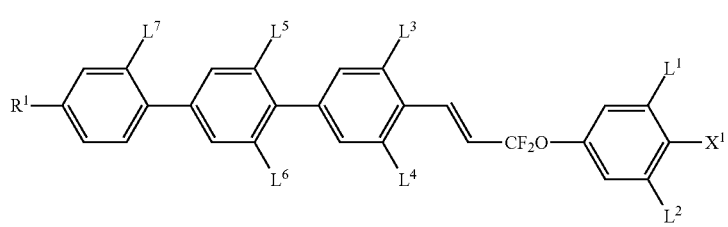

(1-10)
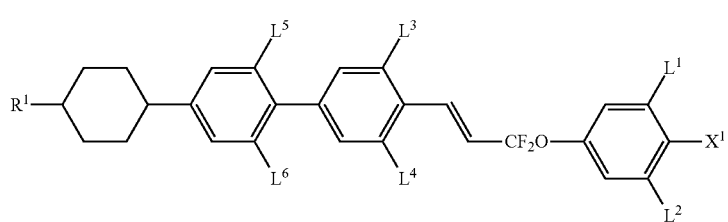

-continued
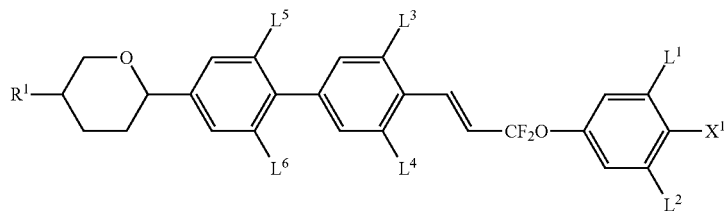
(1-11)
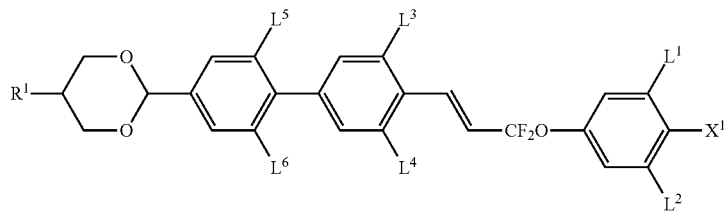
(1-12)
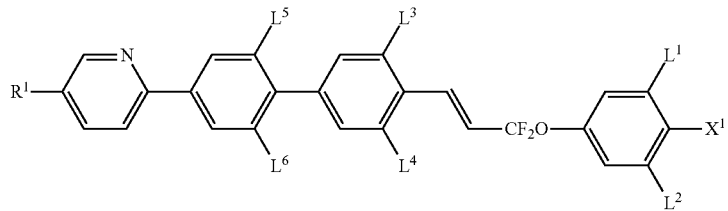
(1-13)
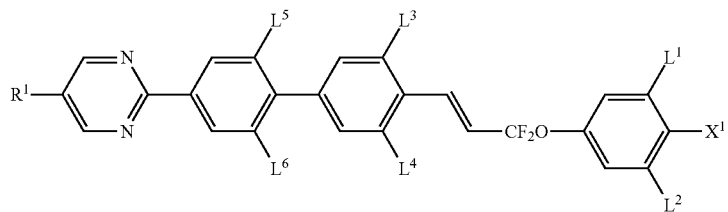
(1-14)
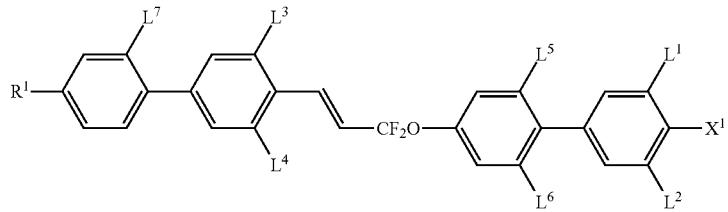
(1-15)
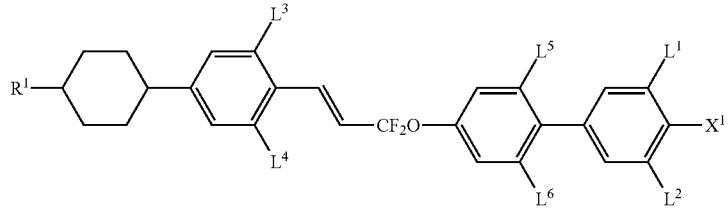
(1-16)
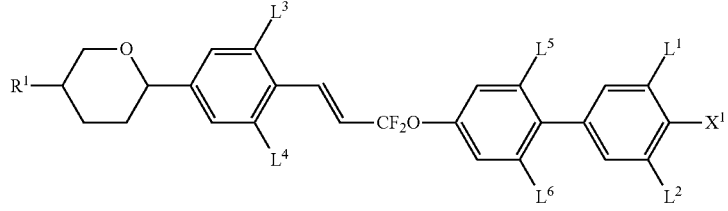
(1-17)

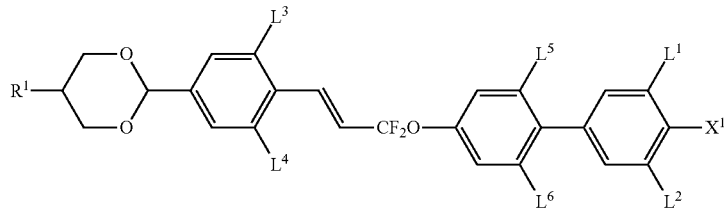
(1-18)
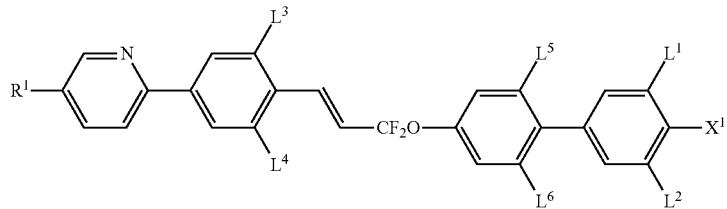
(1-19)
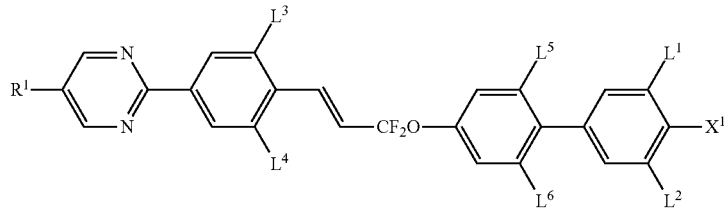
(1-20)
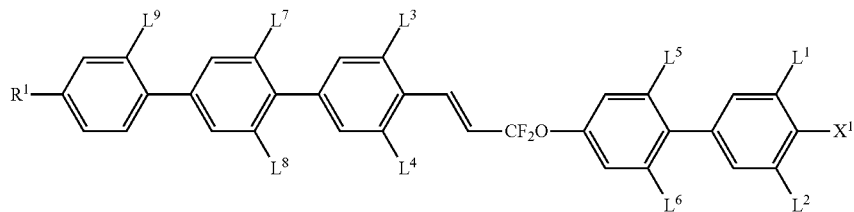
(1-21)
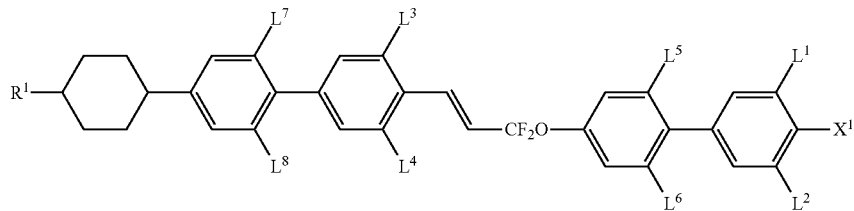
(1-22)
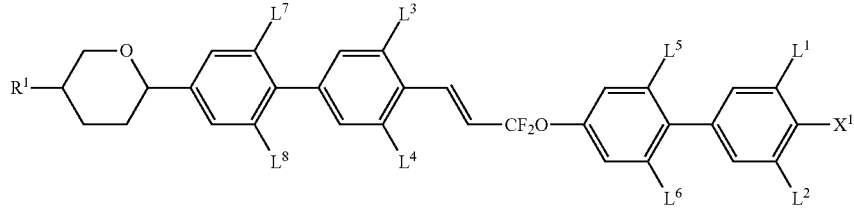
(1-23)
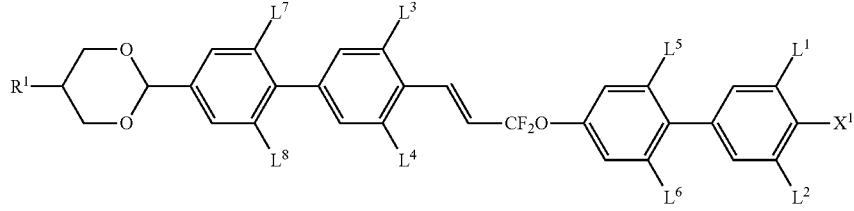
(1-24)

-continued
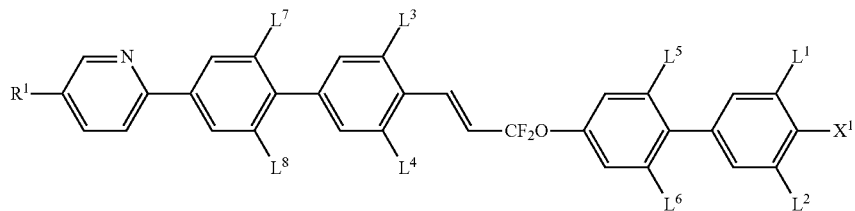
(1-25)
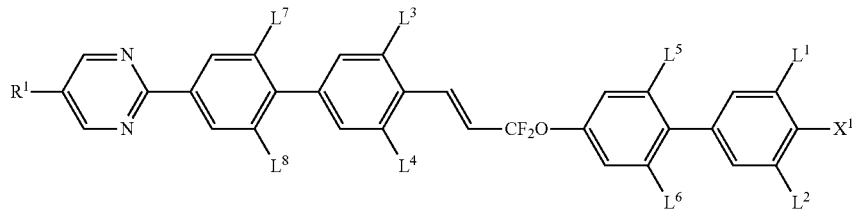
(1-26)
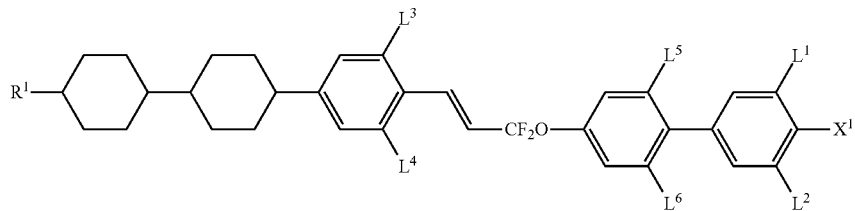
(1-27)
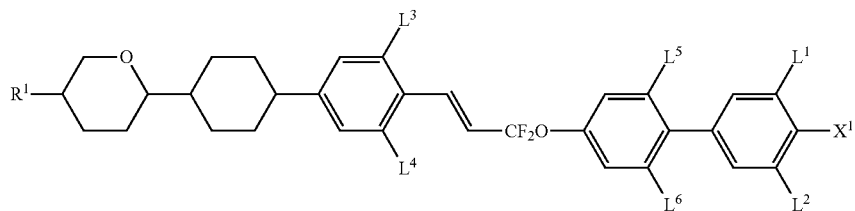
(1-28)
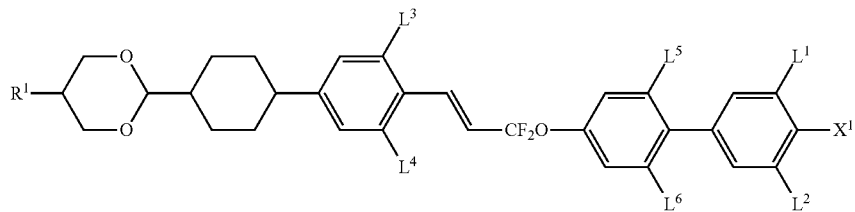
(1-29)
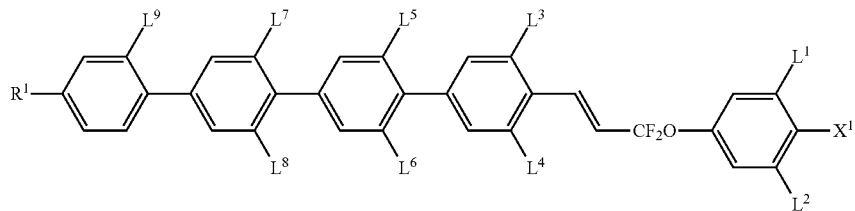
(1-30)
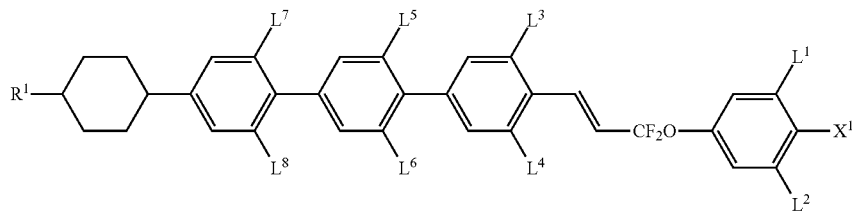
(1-31)

(1-32)
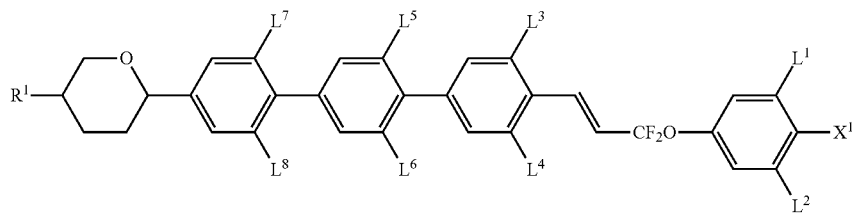
(1-33)
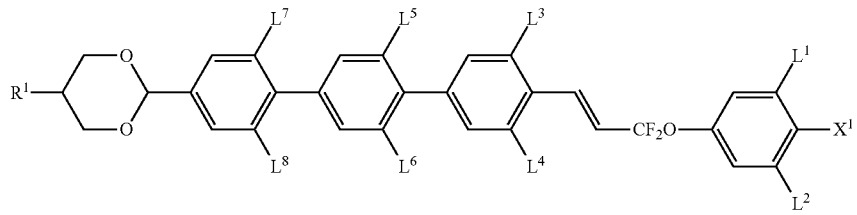
(1-34)
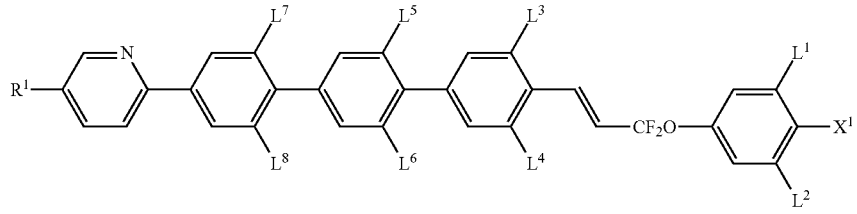
(1-35)
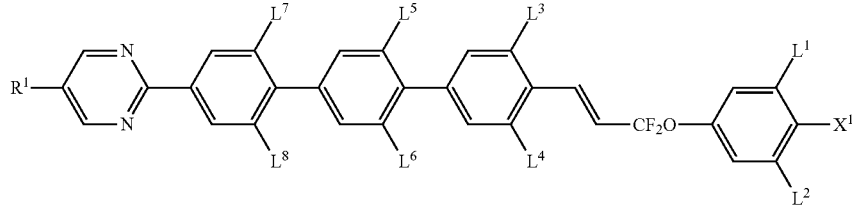
(1-36)
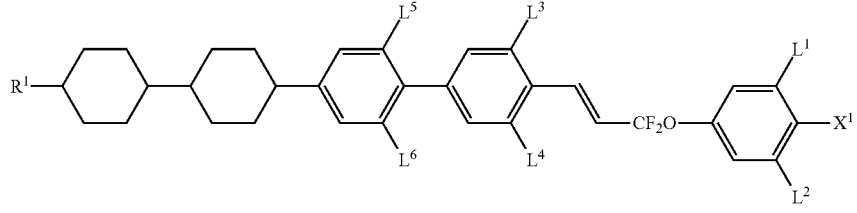
(1-37)
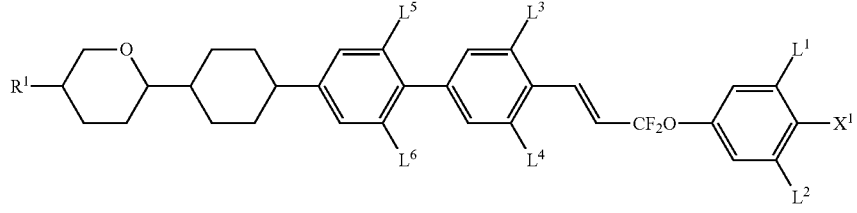
(1-38)
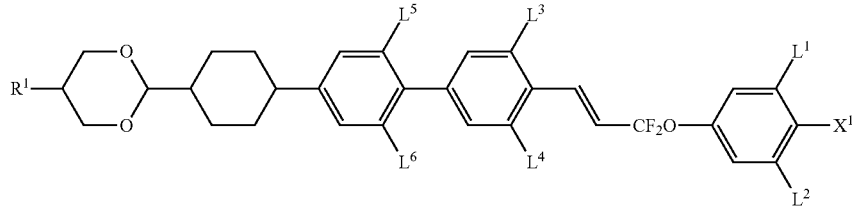

wherein, in the formulas, $R^1$ is alkyl having 1 to 12 carbons; $L^1$, $L^2$, $L^3$, $L^4$, $L^5$, $L^6$, $L^7$, $L^8$ and $L^9$ are independently hydrogen, chlorine or fluorine; $X^1$ is fluorine, chlorine, —$CF_3$ or —$OCF_3$; and then, when $X^1$ is fluorine in formula (1-6), at least one of $L^1$, $L^2$, $L^3$ and $L^4$ is hydrogen.

7. The compound according to claim 1, wherein the compound is represented by any one of formula (1-39) to formula (1-49):

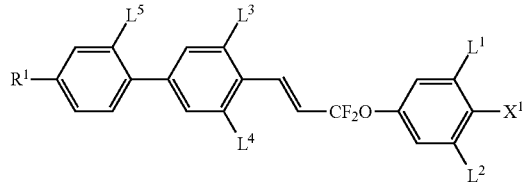
(1-39)

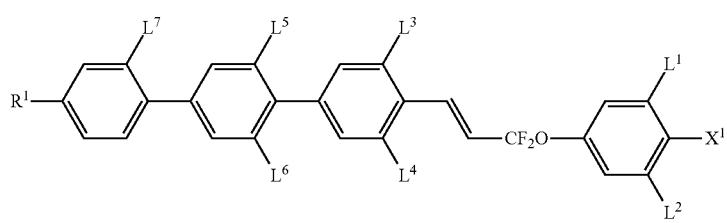
(1-40)

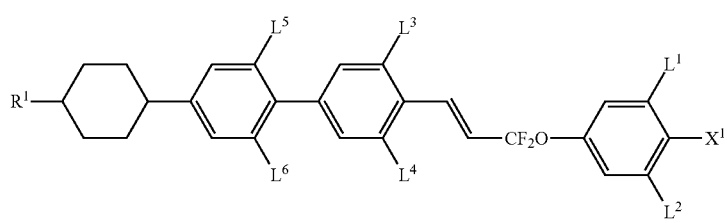
(1-41)

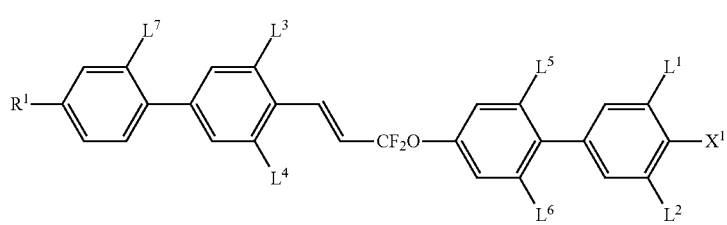
(1-42)

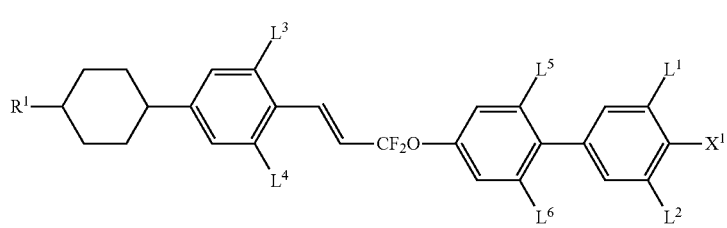
(1-43)

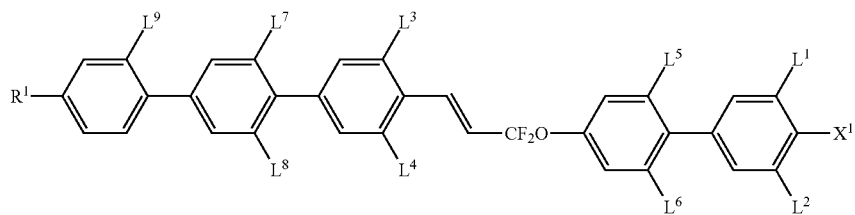
(1-44)

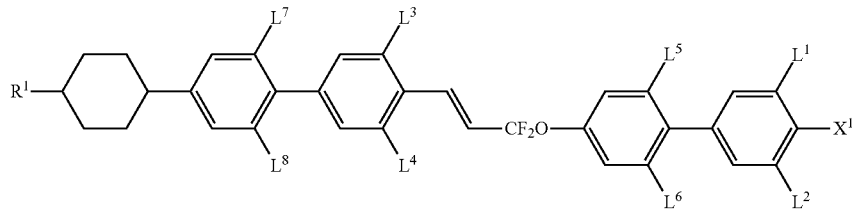
(1-45)
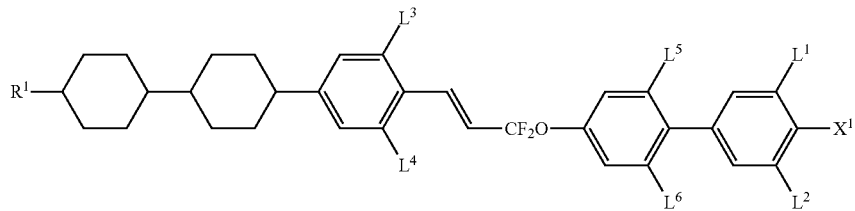
(1-46)
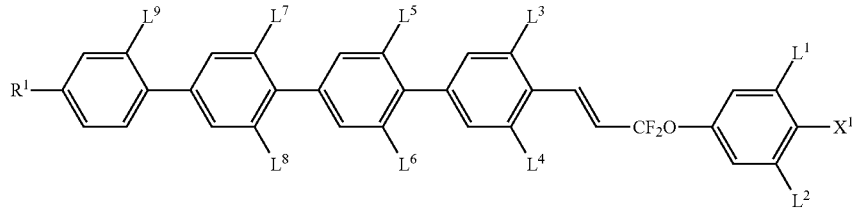
(1-47)
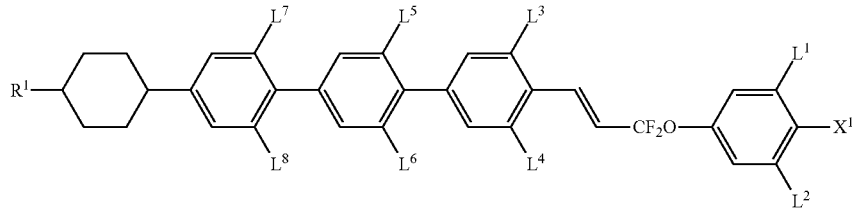
(1-48)
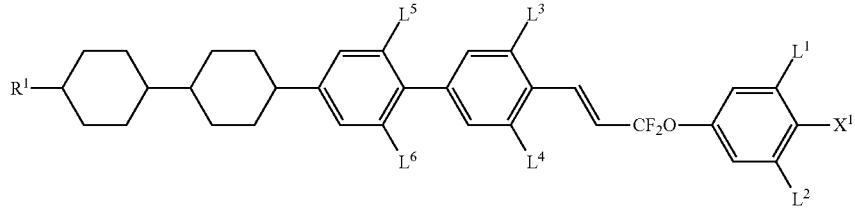
(1-49)
wherein, in the formulas, $R^1$ is alkyl having 1 to 12 carbons; $L^1$, $L^2$, $L^3$, $L^4$, $L^5$, $L^6$, $L^7$, $L^8$ and $L^9$ are independently hydrogen or fluorine; $X^1$ is fluorine, chlorine, —$CF_3$ or —$OCF_3$; and then, when $X^1$ is fluorine in formula (1-39), at least one of $L^1$, $L^2$, $L^3$ and $L^4$ is hydrogen.
* * * * *